United States Patent [19]

Pandeya

[11] 4,310,879
[45] Jan. 12, 1982

[54] PARALLEL PROCESSOR HAVING CENTRAL PROCESSOR MEMORY EXTENSION

[76] Inventor: Arun K. Pandeya, 1620 Worcester Rd., Framingham, Mass. 01701

[21] Appl. No.: 18,476

[22] Filed: Mar. 8, 1979

[51] Int. Cl.³ .......................... G06F 7/42; G06F 7/44; G06F 9/28; G06F 13/00
[52] U.S. Cl. .................................................. 364/200
[58] Field of Search ... 364/200 MS File, 900 MS File, 364/704, 748

[56] References Cited

U.S. PATENT DOCUMENTS

| | | | |
|---|---|---|---|
| 3,573,741 | 4/1971 | Gavril | 364/200 |
| 3,587,058 | 6/1971 | Butler et al. | 364/200 |
| 3,713,107 | 1/1973 | Barsamian | 364/200 |
| 3,793,631 | 2/1974 | Silverstein et al. | 364/200 |
| 3,916,383 | 10/1975 | Malcolm | 364/200 |
| 3,943,494 | 3/1976 | Holmes, Jr. et al. | 364/200 |
| 4,030,076 | 6/1977 | Blum et al. | 364/200 |
| 4,071,890 | 1/1978 | Pandeya | 364/200 |
| 4,077,060 | 2/1978 | Bodner et al. | 364/200 |
| 4,079,455 | 3/1978 | Ozga | 364/200 |
| 4,099,236 | 7/1978 | Goodman et al. | 364/200 |
| 4,107,773 | 8/1978 | Gilbreath | 364/200 |
| 4,128,876 | 12/1978 | Ames et al. | 364/200 |
| 4,130,866 | 12/1978 | Ono | 364/200 |
| 4,152,763 | 5/1979 | Shimoi | 364/200 |
| 4,161,784 | 7/1979 | Cushing et al. | 364/200 |
| 4,171,537 | 10/1979 | Weissberger et al. | 364/200 X |

Primary Examiner—Harvey E. Springborn

[57] ABSTRACT

An array processor which is an integral part of a central processing unit (CPU) has a local memory which is part of main memory address space. Furthermore, the array procesor has its own port into the local memory, leaving a system bus free while the array processor is working. The array processor is controlled so that data can be transferred between the main memory and the local memory either before, during, or after operation of data manipulation hardware which is part of the array processor. This data manipulation hardware utilizes a fast multiplier, and fast add, subtract, & compare circuitry. The array processor is controlled by a 76 bit microcode extension to one sector of a number of sectors of a control store in the CPU. The microcode extension can be overriden by interrupt and other control signals generated by the CPU.

19 Claims, 17 Drawing Figures

FSA 672

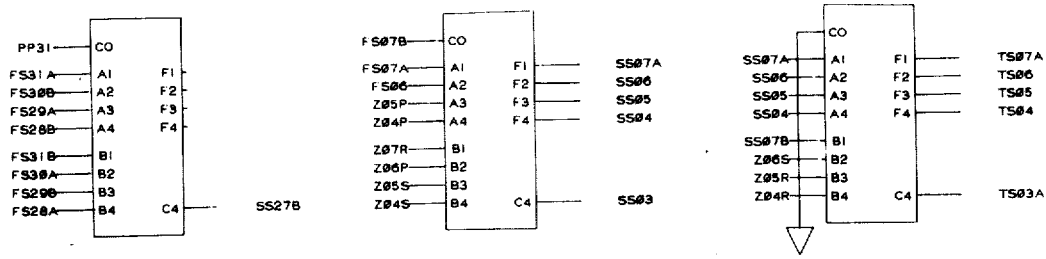
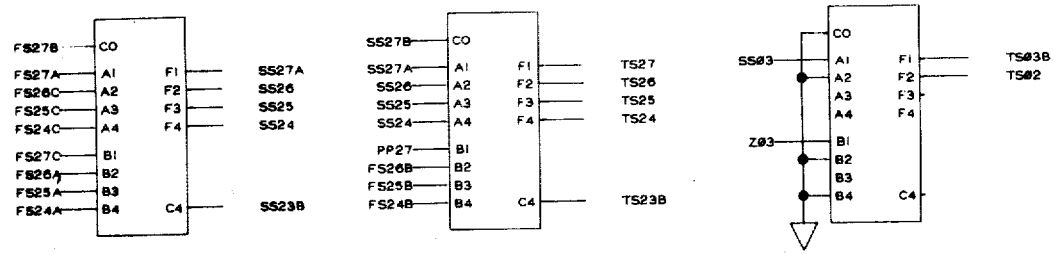
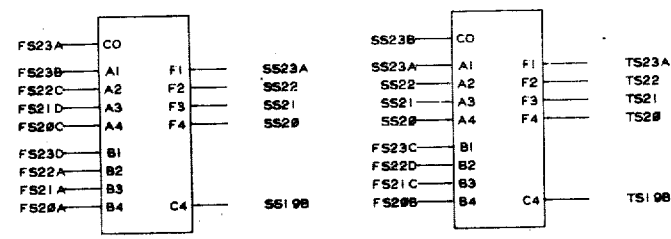
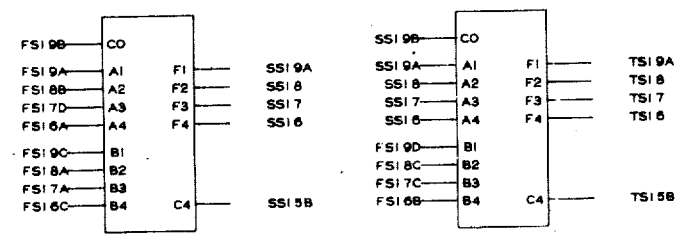
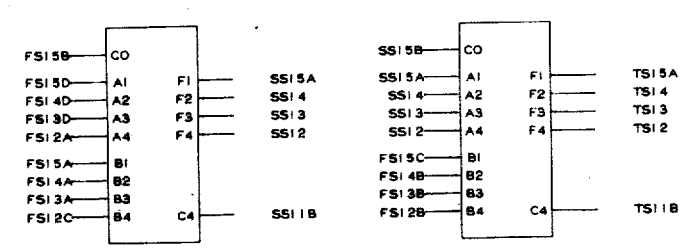
SSA 674 AND TSA 676
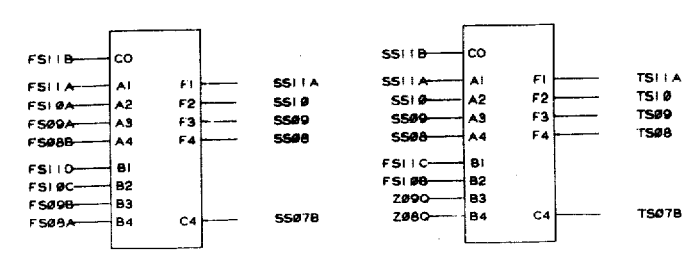
FIG. 6G

28 BIT FAST ADDER 678

PARALLEL PROCESSOR HAVING CENTRAL PROCESSOR MEMORY EXTENSION

CROSS REFERENCE TO RELATED APPLICATIONS

The present invention is related to A. K. Pandeya patent application Ser. No. 745,910 filed Nov. 29, 1976 and issued Jan. 31, 1978 bearing Pat. No. 4,071,890, and related to R. H. Gruner patent application Ser. No. 745,898 filed Nov. 29, 1976 and issued Aug. 1, 1978 bearing U.S. Pat. No. 4,104,720. The present application is also related to D. L. Whipple patent application Ser. No. 968,227 filed Dec. 11, 1978 and issued Oct. 21, 1980 as U.S. Pat. No. 4,229,801. The disclosures of these three related patents and this related patents are incorporated herein by reference.

BACKGROUND OF THE INVENTION

1. Field of the Invention

The present invention relates generally to digital data processing systems and more particularly to a parallel processor employed as an array processor or floating point processor for use in data processing systems.

2. Description of Prior Art

Parallel processors have been employed in data processing systems for some time. Examples of parallel processors are floating point processors, such as those disclosed in the above noted incorporated-by-reference patents. Other examples of parallel processors include what are termed array processors, as for example illustrated in the above-identified incorporated-by-reference patents. Parallel processors are employed when additional speed is required or when special kinds of computations are to be repetitively made where a dedicated piece of hardware is called for.

For example, there seems to have always been a need in computer applications for repetitive calculations to be made on large sets of data. The traditional approach of processing arrays of data with a general purpose computer has a severe disadvantage, because many instructions must be repeatedly fetched and decoded for each element of such an array. One way to improve efficiency is to implement the array processing functions at the hardware or firmware level, rather than the software level. This approach has been recognized by the computer industry and up to the present time, as far as is known, there were three basic approaches to the problem: (1) large, fast general purpose computers; (2) peripheral processing units which require a host computer; and, (3) custom special-purpose hardware.

The large general purpose machines do meet the requirements of array processing applications, but their prices make them usually too expensive for the majority of computer applications. Also, an experienced programmer (or many programmers) may be needed to successfully run such an application, and this can be very costly. Further, considerations such as the system's physical size also increase the cost and complexity of such a system.

Peripheral units provide considerable power at much lower cost, but they also have their disadvantages. Though they are commonly designed to interface with minicomputers, these devices often cost several times as much as the systems to which they are connected. The units often have little software support, and the available software may have been compromised by the necessity of interfacing to a variety of host computers. Another problem with peripheral array processors is that they generally move data by way of the system I/O (input/output) or DMA (direct memory access) bus, which means that they must complete with other system devices for use of these busses. And last but not least is the fact that the user must deal with two different vendors to obtain a complete system, with all the problems and incompatibilities that usually result. The only other solution (up to the present solution provided by the present invention) has been custom hardware, which is expensive to obtain and often lacks versatility because of its dedicated nature.

The foregoing problems and shortcomings of prior art developments have been overcome by the present invention. The present invention relates to a parallel processor (array processor or floating point processor) which integrates its hardware into the system architecture in order to provide an unprecedented price/performance ratio, and preserves compatibility with existing software. The present invention therefore can bring the power of array processing to a far wider range of applications than previously was available.

SUMMARY OF THE INVENTION

The present invention relates to a parallel processor for use in a digital data processing system. The system includes a central processing unit and a main memory consisting of a first memory portion and a second memory portion. The parallel processor includes the second memory portion connected by first but apparatus to the first memory portion, and transferring apparatus for transferring data between the first and second memory portions over the first bus apparatus.

The parallel processor also includes circuitry for arithmetically manipulating the data stored in the second memory portion. For this purpose second bus apparatus is provided between this circuitry and the second memory portion for transferring data therebetween. Data stored in the second memory portion is transferred to the circuitry for arithmetically manipulating the data, and manipulated data is transferred back to the second memory portion. Arithmetically manipulated data is also transferred from the second memory portion over the first bus apparatus to the first memory portion.

In a further feature of the present invention the CPU includes control circuitry for generating system control signals, and a first control store memory having microinstructions stored therein employed in controlling the operation of the CPU. An interface between the CPU and the parallel processor includes a second control store memory being an extension of a sector of the first control store memory, and having other microinstructions stored therein employed in controlling the operation of parallel processor. The parallel processor operates simultaneously and synchronously with operation of the CPU.

In yet a further feature of the present invention, parallel processor control circuitry includes first circuitry arranged to receive these other microinstructions and second circuitry arranged to receive system control signals for controlling the operation of the parallel processor by these other microinstructions in the absence of receiving certain of the system control signals by the second circuitry. The control circuitry also ignores the other microinstructions and inhibits operation of the parallel processor when the second circuitry receives these certain system control signals, as for example an interrupt signal.

In yet a further feature of the present invention, the control circuitry or apparatus further includes capability for controlling the transfer of data between the first memory portion and the second memory portion to operate before, during, and after operation of the data manipulating circuitry.

And, in yet another feature of the present invention, the data manipulation circuitry includes a multiplier circuit having the capability of multiplying a multiplier mantissa component with a portion of a multiplicand mantissa component, thereafter multiplying the multiplier mantissa component with the remaining portion of the multiplicand mantissa component, and thereafter adding the first and second results of the two operations and storing it as a total product; additionally, the multiplier circuit operates upon multiplier sign and multiplicand sign components to produce a sign result, and operates upon a multiplier exponent component and a multiplicand exponent component to produce an exponent result. The exponent result, sign result, and total product are conducted to normalization circuitry to provide a normalized multiplication result.

It is thus advantageous to employ the present invention in data processing applications which require repetitive calculations on large sets of data at an extremely high throughput rate. Scientific computations normally are characterized by this set of constraints. Therefore the present invention, which is a general purpose parallel processor (array processor or floating point processor) is used to great advantage in digital signal processing or array processing applications in a real time or other high-throughput environment.

It is thus an object of the present invention to provide an improved data processing system.

It is another object of the present invention to provide an improved parallel processor for use in a data processing system.

It is an additional object of the present invention to provide a unique multiplier circuit employed within the parallel processor of the improved data processing system.

It is yet another object of the present invention to provide a unique add, subtract, and compare circuit within the parallel processor for use in the improved data processing system.

Other objects and advantages of the present invention will become apparent to those skilled in the art after referring to the detailed description fo the appended drawings, wherein:

BRIEF DESCRIPTION OF THE DRAWINGS

FIGS. 3 and 3A are schematic representations of parameter blocks employed by the present invention;

FIG. 6G is a schematic diagram showing interconnection of components of Second Stage Adder 674 and Third Stage Adder 676 of FIG. 6C;

DESCRIPTION OF THE PREFERRED EMBODIMENTS

1. Introduction

Figure 3:
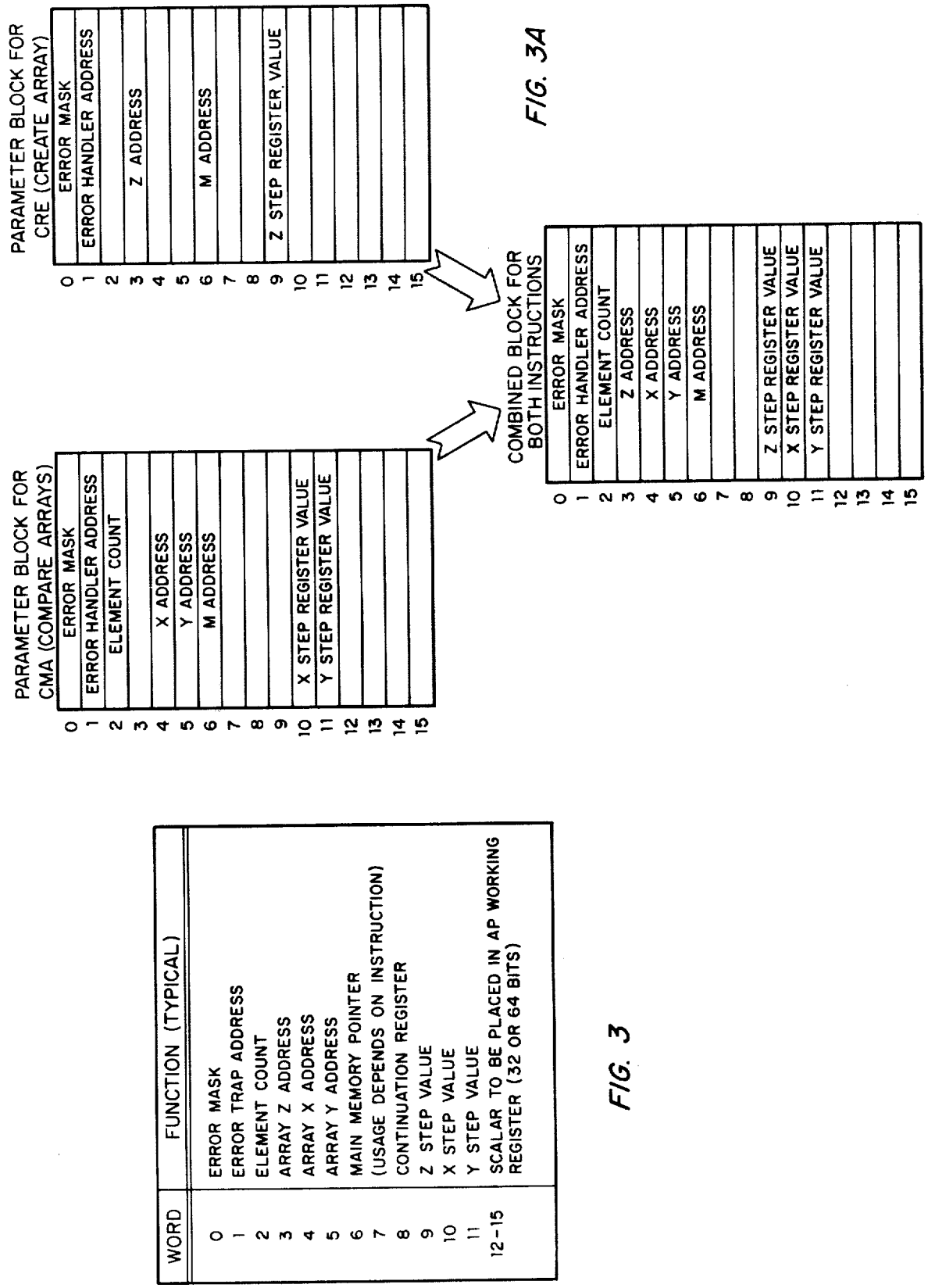
Figure 4:
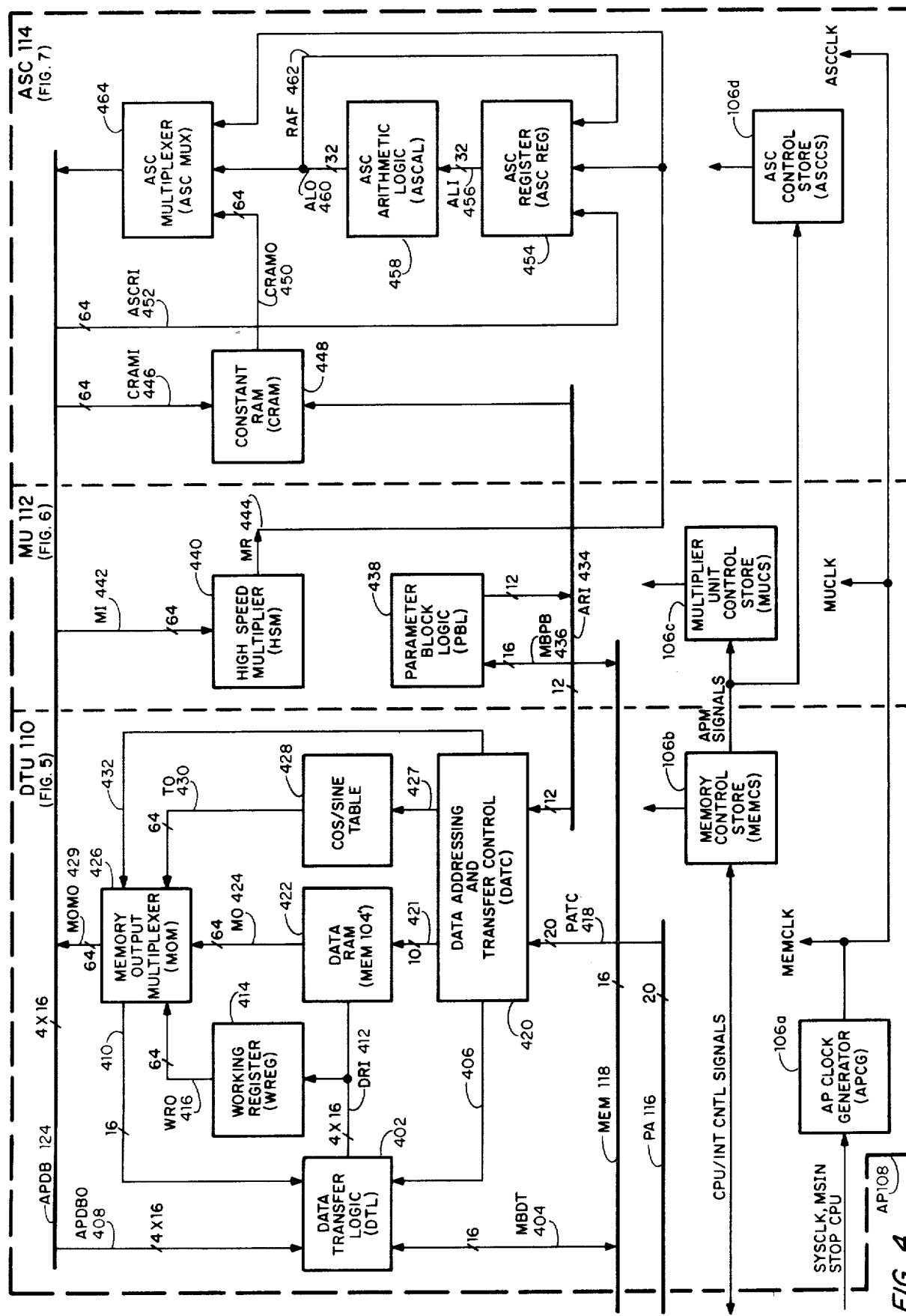
FIG. 4 is a functional block diagram of the parallel processor or array processor employed within the system of FIG. 1, and showing three sections: DTU, MU, and ASC.

The present invention is a parallel processor which can be used as a floating point processor intended for digital signal processing and/or array processing in a real time or other high-throughput environment. Major features of the present invention which will be discussed in further detail here and below include: A set of array processing instructions including array add, subtract, compare, inner product, etc.; a set of signal processing instructions including FFT (Fast Fourier Transform), Recursive Filter, Convolution, etc.; a 1,024 by 64 bit bipolar dual-ported memory, which is part of the system physical address space, eliminating unnecessary I/O transfers; a 32 bit floating point arithmetic unit;

a trignometric table memory; a 64 bit internal data path capable of transferring an entire real or complex number in one microinstruction; and, the functional integration of the parallel processor into the CPU of the data processing system. Discussion of these features and others will be made in conjunction with FIGS. 1-7A inclusive, discussion of the preferred embodiments being organized into two main areas: interconnection and identification of components of the preferred embodiment, and operation of and cooperation between elements or components of the present invention and problems solved thereby. It should be observed that the figure number and the components within that figure are related as for example, FIG. 1 has 100 series components; FIG. 4 has 400 series components, etc. Accordingly, one can readily refer to a detailed figure and relate the components depicted therein to other diagrams in the Application. Finally, bus capabilities are denoted by short intersecting lines with appropriate number of parallel conductors; and, although standard commercial parts are used, part numbers are provided in instances where clarity of presentation may be enhanced.

2. Interconnection of the Preferred Embodiment (FIGS. 1, 4, 5, 6, 6C, 6F, 6G, 6H, 7 and 7A)

FIG. 1

Figure 1:
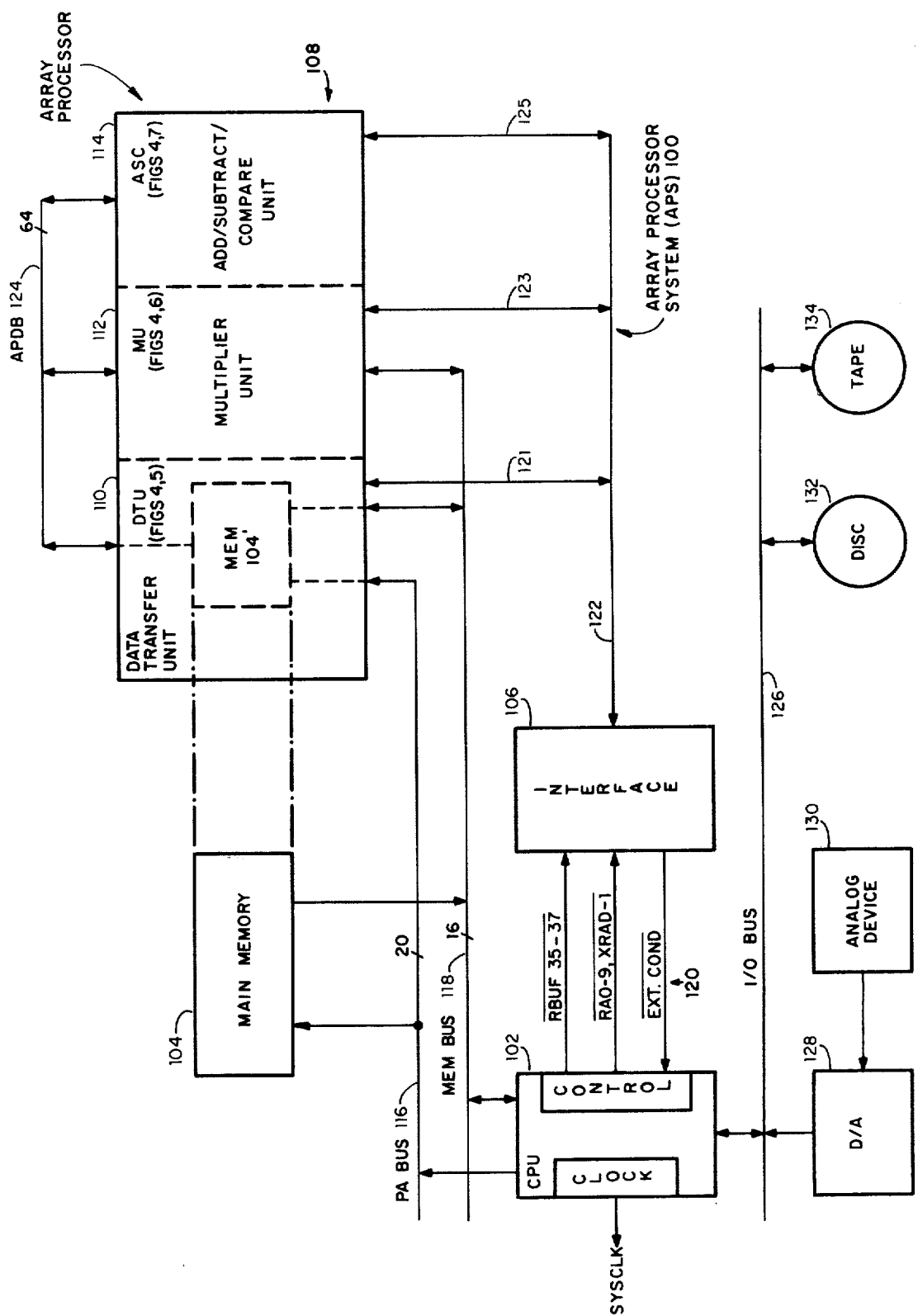
FIG. 1 depicts a functional block diagram of a data processing system in which an illustrative embodiment of the present invention is employed.

Referring then to FIG. 1, CPU 102 is interconnected by MEM BUS 118 and Physical Address Bus 116 to Main Memory 104. CPU 102 is also interconnected by way of I/O BUS 126 to peripheral devices, such as D/A Converter 128 connected to Analog Device 130, and Disc 132 and Tape 134. CPU 102 provides a SYCLK signal from its clock circuitry for timing of the entire system and provides control signals $\overline{RBUF\ 35\text{-}37}$, and $\overline{RAO\text{-}9}$, $\overline{XRAD\text{-}1}$ to Interface Block 106. These signals and $\overline{EXT\ COND}$ by way of Interface 106 on bus 120 are used to control operation of Array Processor 108, which operation description will be provided later. Interface 106 and Array Processor 108 are interconnected by way of Clock and Control BUS 122, which divides up into three separate busses 121, 123, and 125 each connected respectively to Data Transfer Unit 110, Multiplier Unit 112, and Add/Subtract/Compare Unit 114, all forming a part of Array Processor 108.

Figure 2:
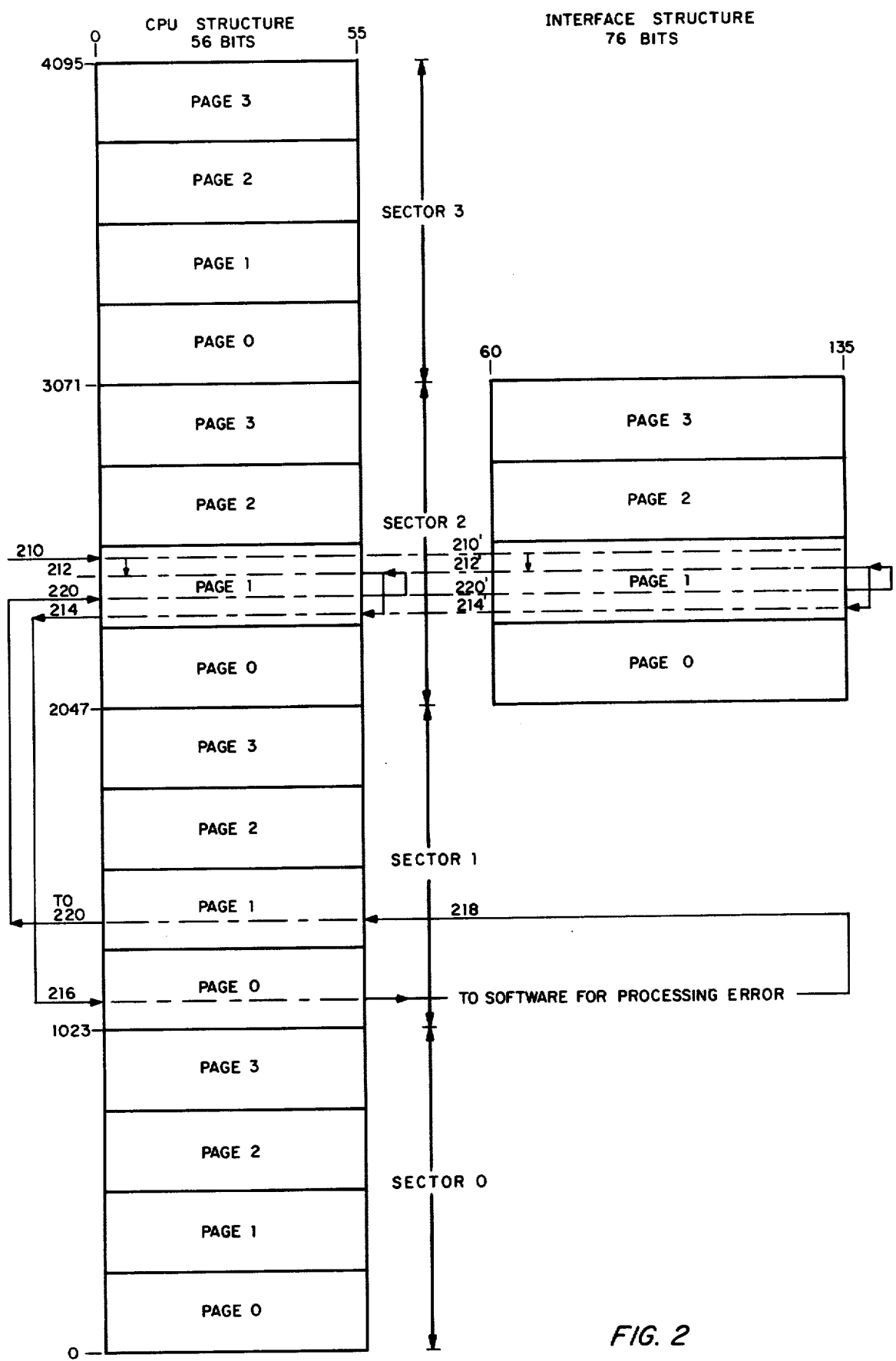
FIG. 2 is a schematic representation of control storage space as divided into four sectors, and four pages within a sector within a microstructure of the system of FIG. 1.

It is important to note that Main Memory 104 and MEM 104' contained within DTU 110 are portions of the same memory, as implied by the phantom line interconnect between Memory 104 and Memory 104'. As can be seen, PA BUS 116 interconnects both portions of this memory, and MEM BUS 118 likewise interconnects first Memory 104 with second Memory 104'. An important distinction, however, is that Memory 104' has a separate data bus, APDB 124, which interconnects Memory 104' and Multiplier Unit 112 and A/S/C 114. MEM BUS 118 also has interconnection to Multiplier Unit 112 as shown. Interface 106 comprises four pages of 76 bit/Sector 2 Control Store Memory as illustrated in FIG. 2, the four sectors of 56 bit control store being located within the control portion of CPU 102.

FIG. 4

Referring next to FIG. 4, AP 108 is depicted as having three basic functional blocks of Data Transfer Unit 110, Multiplier Unit 112, and Add/Subtract/Compare Logic 114.

Referring to the left hand portion of the figure, Data Transfer Unit 110 receives inputs on a first bus apparatus comprising MEM BUS 118 and PA 116, having 16 and 20 bits, respectively. A 20 bit input is provided to Data Addressing and Transfer Control (DATC) 420 by way of PATC BUS 418. Data Transfer Logic (DTL) 402 receives a 16 bit input by way of MBDT BUS 404. DATC 420 provides an input to DTL 402 by way of BUS 406, and provides inputs to DATA RAM 422 by way of 10 bit BUS 421 and to TABLE 428 by way of BUS 427. DATA RAM 422 and TABLE 428 provide inputs to Memory Output Multiplexer 426 by way of 64 bit MO BUS 424 and 64 bit TO BUS 430, respectively. Similarly, DATA RAM 422 and DTL 402 provide an input to Working Register 414 by way of DRI BUS 412, which Register in turn provides an input by way of 64 bit WRO BUS 416 to Memory Output Multiplexer 426. This Multiplexer in turn provides inputs back to DTL 402 by way of BUS 410 and provides a significant output by way of 64 bit MOMO BUS 429 to a second bus apparatus APDB 124. APDB 124 provides an input to DTL 402 by way of APDBO 408, and DTL 402 provides an output onto MEM 118 by way of bidirectional BUS MBDT 404.

Considering next MU 112 in the central portion of FIG. 4, its inputs are received by way of MEM BUS 118 and by way of APDB 124. APDB 124 provides an input to High Speed Multiplier (HSM) 440 by way of 64 bit MI BUS 442. HSM 440 provides an output on MR 444 BUS into the A/S/C diagram, to be discussed momentarily. The other input to MU 112 is by way of MBPB 436 BUS derived from MEM 118, going to Parameter Block Logic (PBL) 438. PBL 438 provides an output onto third bus apparatus ARI 434 BUS which is returned to DATC 420 by 12 bit ARI BUS 434 and into A/S/C architecture to be discussed momentarily.

Considering A/S/C 114, at the far right portion of FIG. 4, as noted its inputs are derived from ARI 434 BUS into Constant RAM (CRAM) 448, which also receives an input by way of 64 bit CRAMI 446 BUS derived from APDB 124. APDB 124 also provides an input by way of ASCRI BUS 452 directly into ASC Register 454. Another input to ASC Register 454 is derived from HSM 440 by way of MR 444 earlier noted. The output from ASC Register 454 is directed to ASC Arithmetic Logic (ASCAL) 458 by way of 32 bit ALI BUS 456. The output from ASCAL is provided on 32 bit ALO BUS 460 to an input of ASC Register 454 over RAF bus 462 as well as to ASC MUX 464. Two other inputs to ASC MUX 464 are taken from CRAM 448 by way of CRAMO 450, and from HSM 440 by way of MR 444 BUS. An output from ASC MUX is provided directly to APDB 124.

Referring generally to the lower portion of FIG. 4, certain signals derived from the CPU (SYSCLK, MSIN, STOP CPU) are provided to AP Clock Generator (APCG) 106A which provides three clock signals: MEMCLK to DTU 110, MUCLK to MU 112, and ASCCLK to ASC 114. These clocks provide necessary timing which will be discussed in more detail in the Operation Section of this Specification. Memory Control Store (MEMCS) 106B receives other CPU and interface control signals from FIG. 1, and provides a 76 bit microinstruction control word output to DTU 110, as well as inputs to Multiplier Unit Control Store (MUCS) 106C and ASC Control Store (ASCCS) 106D. Outputs from these latter two control stores provide 76 bit microinstruction control words to control operation of MU 112 and ASC 114, respectively. Discussion of the microinstruction control words controlling operation of DTU 110, MU 112, and ASC 114 is deferred until the operational description portion of this specification.

FIG. 5

Figure 5:
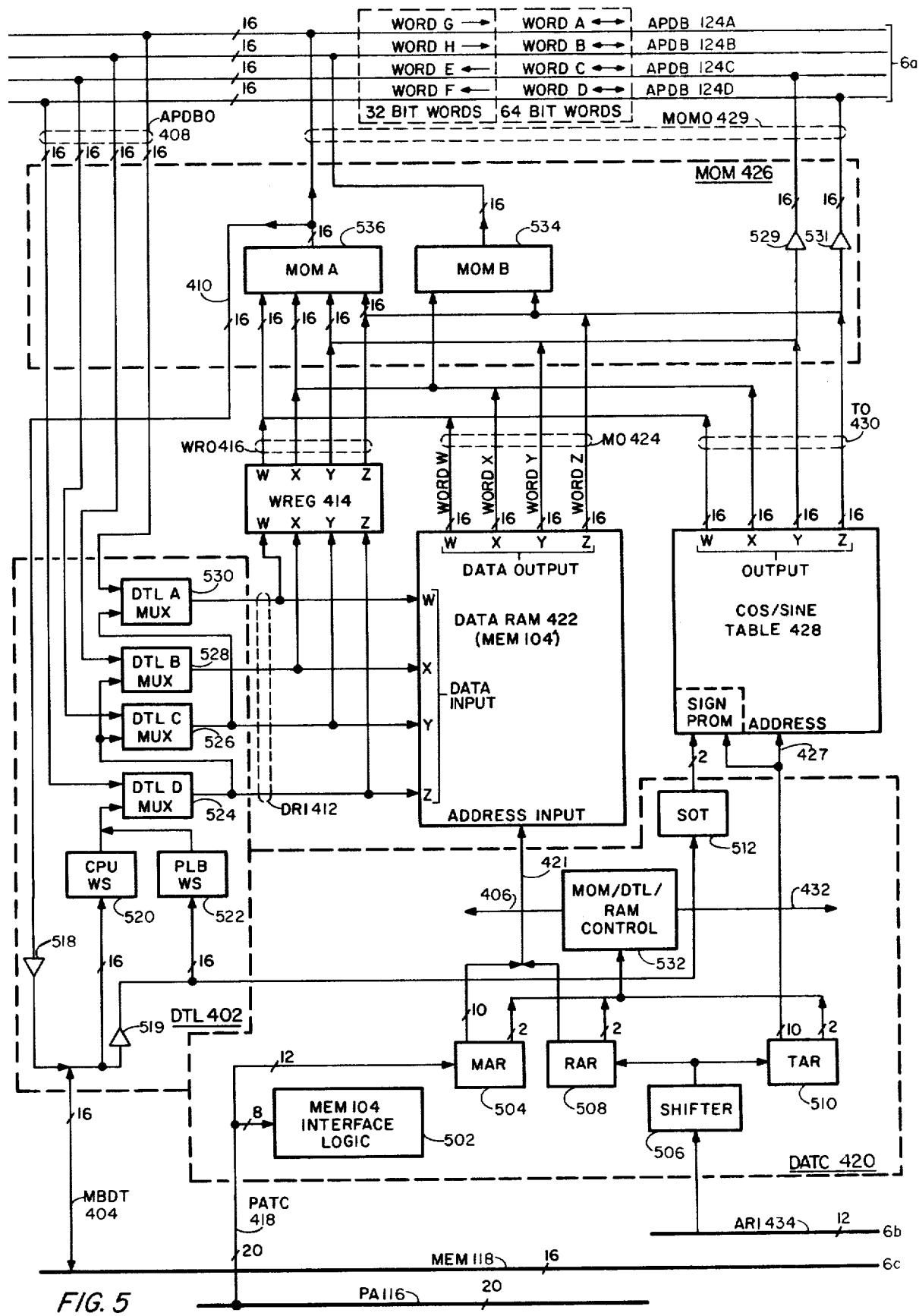
FIG. 5 is a functional block diagram of the DTU (data transfer unit) section of FIG. 4.

Referring next to FIG. 5, which is a more detailed presentation of DTU 110, DATC 420 includes MEM 104 Interface Logic 502, MAR 504, RAR 508, Shifter 506, TAR 510, MOM/DTL/RAM Control 532, and SOT 512. DTL 402 includes DTL A-D MUX's 530, 528, 526 and 524, CPUWS 520, PLB WS 522, and Drivers 518 and 519. MOM 426 includes MOMA 536 and MOMB 534, along with Drivers 529, 531.

Beginning with the lower portion of the diagram, MEM 118 and PA 116 are busses which provide an input to DTL 402 and to DATC 420 by way of MBDT BUS 404 and PATC BUS 418, respectively. In DTL 402, the input is conducted by way of 16 bit busses to CPUWS 520 and PLBWS 522 and from there to DTL A-D MUXs 530, 528, 526 and 524 inclusively. Output from these MUXs go by way of BUS DRI 412 to W-Z inputs respectively of DATA RAM 422 and to W-Z inputs respectively of WREG (Working Register) 414.

Referring to DATC 420, the input from PA 116 is 20 bits, 8 bits of which go to MEM 104 Interface Logic 502 and 12 bits go to Memory Address Register (MAR) 504. Another input to DATC 420 is derived from the ARI 434 BUS and received by Shifter 506. Outputs of Shifter 506 go to both Ram Address Register (RAR) 508 and Table Address Register (TAR) 510. Outputs of MAR 504, RAR 510 are also combined and provided to RAM Control 532. An output of TAR is also provided by a 10 bit BUS 427 to the input of Cosine/Sine Table 428. Finally, an input to DTL 402 is routed by way of Driver 519 to the input of Sine of Table (SOT) 512 in DATC 420, the output of which is directed to the Sign PROM of Table 428.

The output of Table 428 is conducted by way of TO BUS 430, while the output of DATA RAM 422 is conducted by way of MO BUS 424, and the output of Working Register 414 is conducted by way of WRO BUS 416, all busses being conducted into MOM 426 and into Memory Output Multiplexers A and D as shown. Outputs from these Multiplexers are conducted by way of 16 bit busses to either APDB 124A and 124B or by way of BUS 410 and Driver 518 back to MBDT (MEM BUS Data Transfer) 404 back to MEM BUS 118.

The circuitry of FIG. 5 is constructed from commercial integrated circuit products. For example, Registers MAR 504, RAR 508, TAR 510, CPUWS 520, and PLBWS 522, as well as WREG 414, are all constructed from Standard Part SN74S374. Table 428 is a 4069 bit programmable read only memory organized as 512 words by 8 bits with a chip enable input, and is a bipolar PROM. MEM 104' is constructed from standard parts such as Fairchild 93425A or Signetics 82S11. Multiplexers 524, 526, 528, and 530 are constructed from Standard Parts 74S157. Multiplexers 534 and 536 are each constructed from Standard Parts 74S153 and 74S157 and various Drivers used throughout the circuitry of FIG. 5 are constructed from Standard Parts SN74LS241N.

FIG. 6

Figure 6:
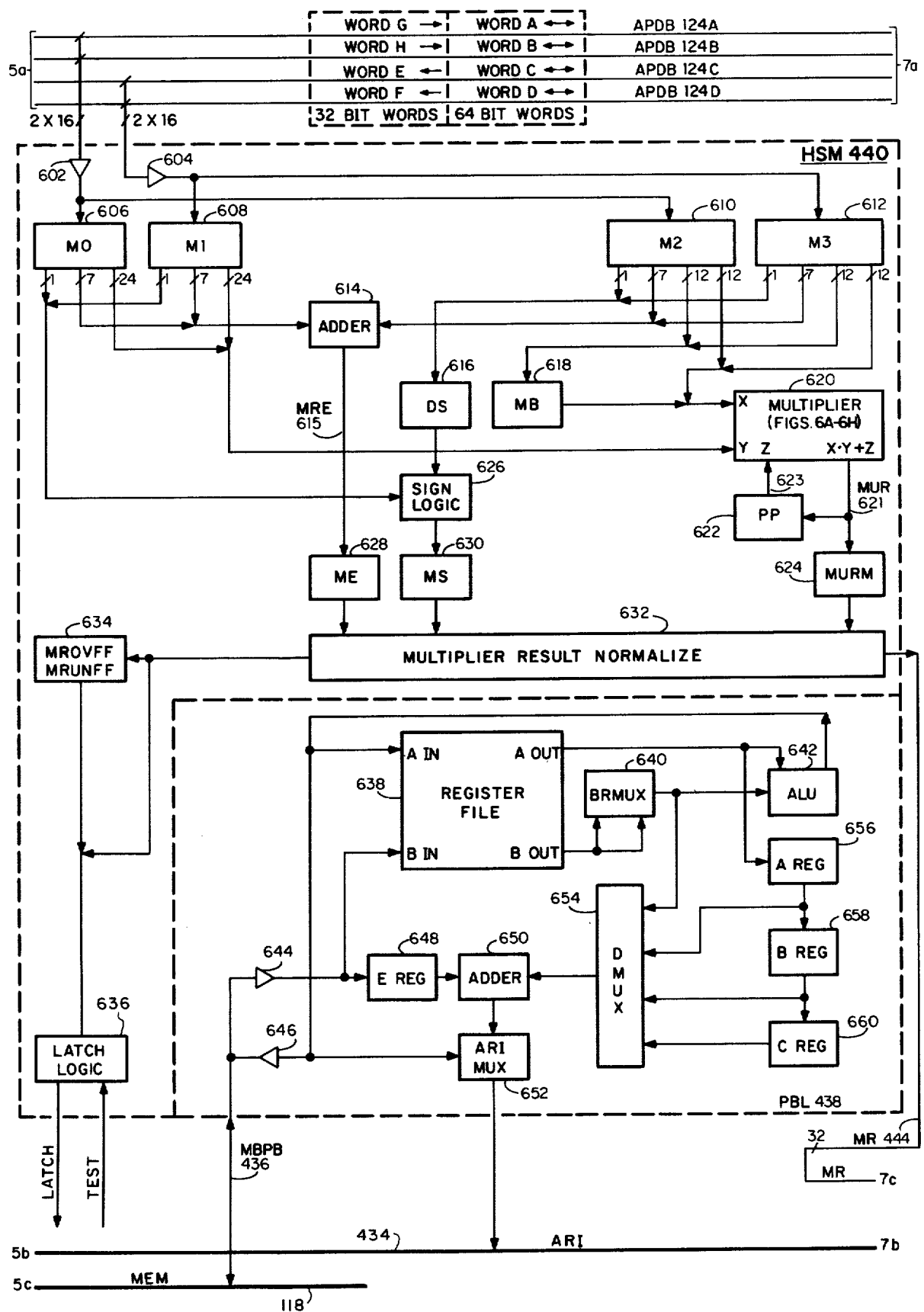
FIG. 6 is a functional block diagram of the MU (multiply unit) shown in FIG. 4.

Referring next to FIG. 6, HSM 440 is shown generally in the upper portion of the diagram and PBL (Parameter Block Logic) 438 is shown in the lower right hand portion of the diagram. PBL 438 receives its input by way of MBPB 436 BUS (Memory BUS Parameter Block) which input is received by E Register 648 and the B Input of Register File 638 by way of driver 644. The A OUT output of Register File 638 is provided to ALU 642 and A Register 656. The B OUT output of Register File 638 is provided to BR MUX 640, the output of which is fed to both DMUX 654 and to ALU 642. The output of ALU 642 is provided back to A Input of Register File 638 as well as by way of Driver 646 to MEM BUS 118, and is provided to ARI MUX 652.

The Output of A Register 656 is provided to B Register 658, the output of which is provided to C Register 660. The output of B Register and C Register and A Register as well as BR MUX (noted earlier) is provided to DMUX 654. The output of DMUX 654 as well as the output of E Register 648 are provided to Adder 650, the output of which is conducted to Address Register Input (ARI) MUX 652, the output of which is conducted to ARI BUS 434. This PBL circuitry relates to the Parameter Block control words stored in Memory, the operation of which will be presented in detail later. As before, this circuitry is constructed from standard electronic parts, Register File 638 being constructed from Standard Part 74S172; ALU 642 being constructed from Standard Part 74S181 and 74S157; Registers A, B, and C being constructed from Standard Part 74S174; Multiplexer DMUX 654 being constructed from Standard Part 74S153; Adder 650 being constructed from Standard Part 74S283J; E Register 648 being constructed from Standard Part 74S374; and ARI MUX 652 being constructed from 74S157.

Referring to the upper portion of the diagram, High Speed Multiplier 440 comprises four Registers, M0–M3, or 606, 608, 610 and 612, respectively, receiving inputs from APDB BUS, and combining those inputs in Multiplier 620 to provide the multiplication result. More specifically, Registers 606 and 608 receive data from APDB BUS A/B and C/D, respectively, by way of Drivers 602 and 604, respectively. Likewise, Registers M2 and M3, respectively, receive such data. Registers M0 and M1 can be referred to as Multiplier Registers and M2 and M3 can be referred to as Multiplicand Registers. Output of Registers M0 and M1 are divided into a single bit for sign logic conducted to Sign Logic 626, 7 bits for exponent information conducted to Adder 614, and 24 bits for mantissa operation and conducted to the Y Input of Multiplier 620. Registers M2 and M3 have a single bit output containing sign information conducted by way of DS (Delay Sign) 616 to Sign Logic 626, 7 bit outputs conducted to Adder 614 for exponent operation, and two 12 bit mantissa outputs per register conducted by way of the register MB 618 ultimately to the X input of Multiplier 620. The output of Multiplier 620 is directed to Partial Product Register (PP) 623. An output of Multiplier 620 is also fed overline 612 to MURM Register (Multiplier Unnormalized Result Mantissa) 624, the output of which is directed to Multiplier Result Normalize 632. The output of Sign Logic 626 is directed by way of MS (Multiplier Sign) Register 630, and the output of Adder 614 is conducted over MER BUS 615 by way of (Multiplier Exponent) ME 628 Register to Multiplier Result Normalize 632. An output of Normalize Block 632 is conducted by way of 32 bit MR BUS 444 to the F 167 input of ASC 454 and ASC Multiplexer 464. An output of Multiplier Result Normalize 632 is also conducted to Multiplier Result Overflow and Underflow (MROVFF and MRUNFF) 634, an output of which is conducted to Latch Logic as shown. Registers M0, M1, M2, and M3 as well as Register MB are constructed from Standard Part SN74374. The Partial Product Register 622 is constructed from Standard Part 74S174; ME Register 628 and MURM 624 are constructed from Standard Part 74S374; Normalize 632 is constructed from SN74LS157N and SN74S283J. Detail of Multiplier 620 will be discussed below in connection with FIG. 6C.

FIG. 6C

Figure 6A:
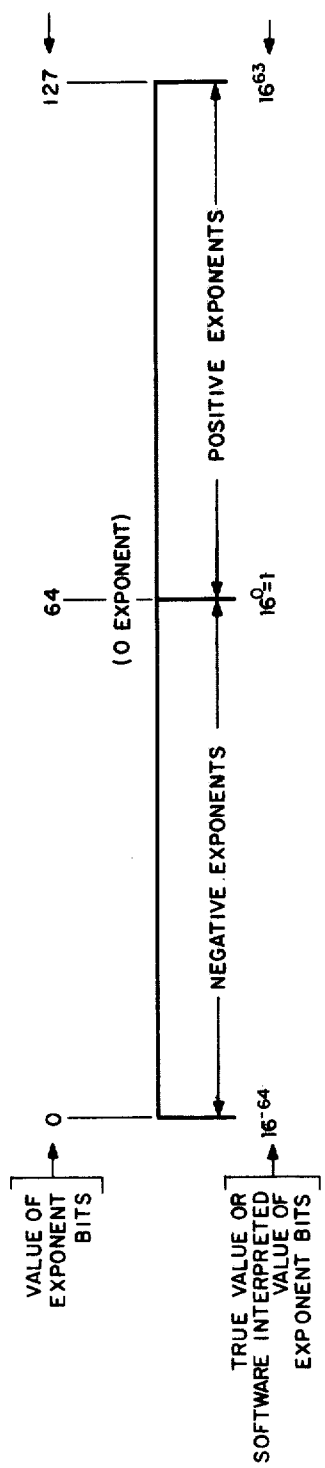
FIG. 6A is a schematic representation of excess 64 notation employed in manipulations by the exponent function within the multiplier unit.
Figure 6B:
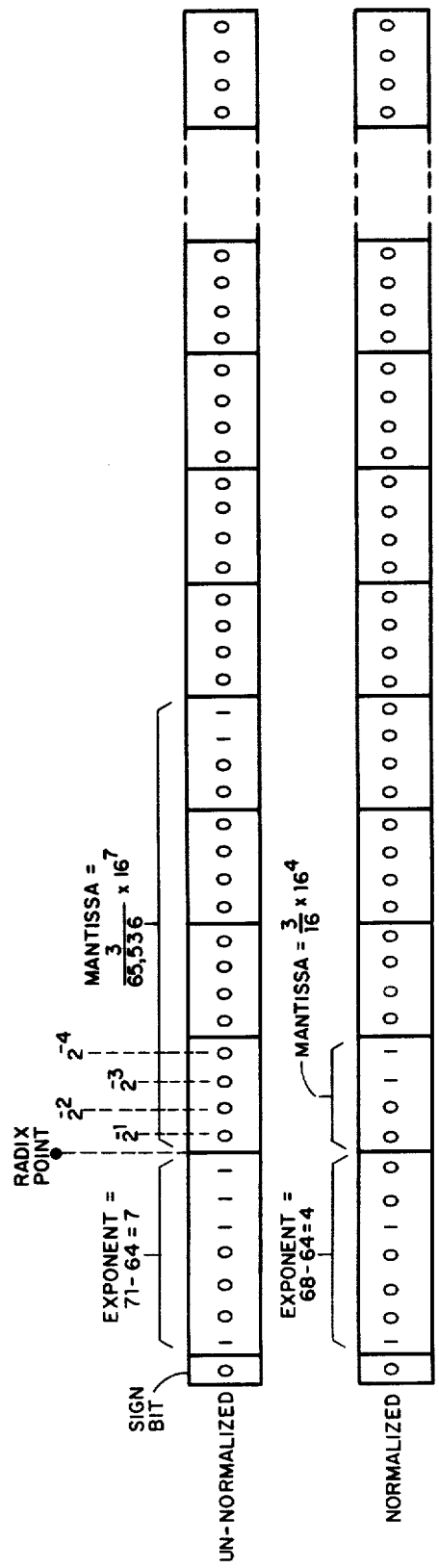
FIG. 6B is a schematic representation of an un-normalized and its corresponding normalized floating point word resulting from operation of the multiplier unit of FIG. 6.
Figure 6C:
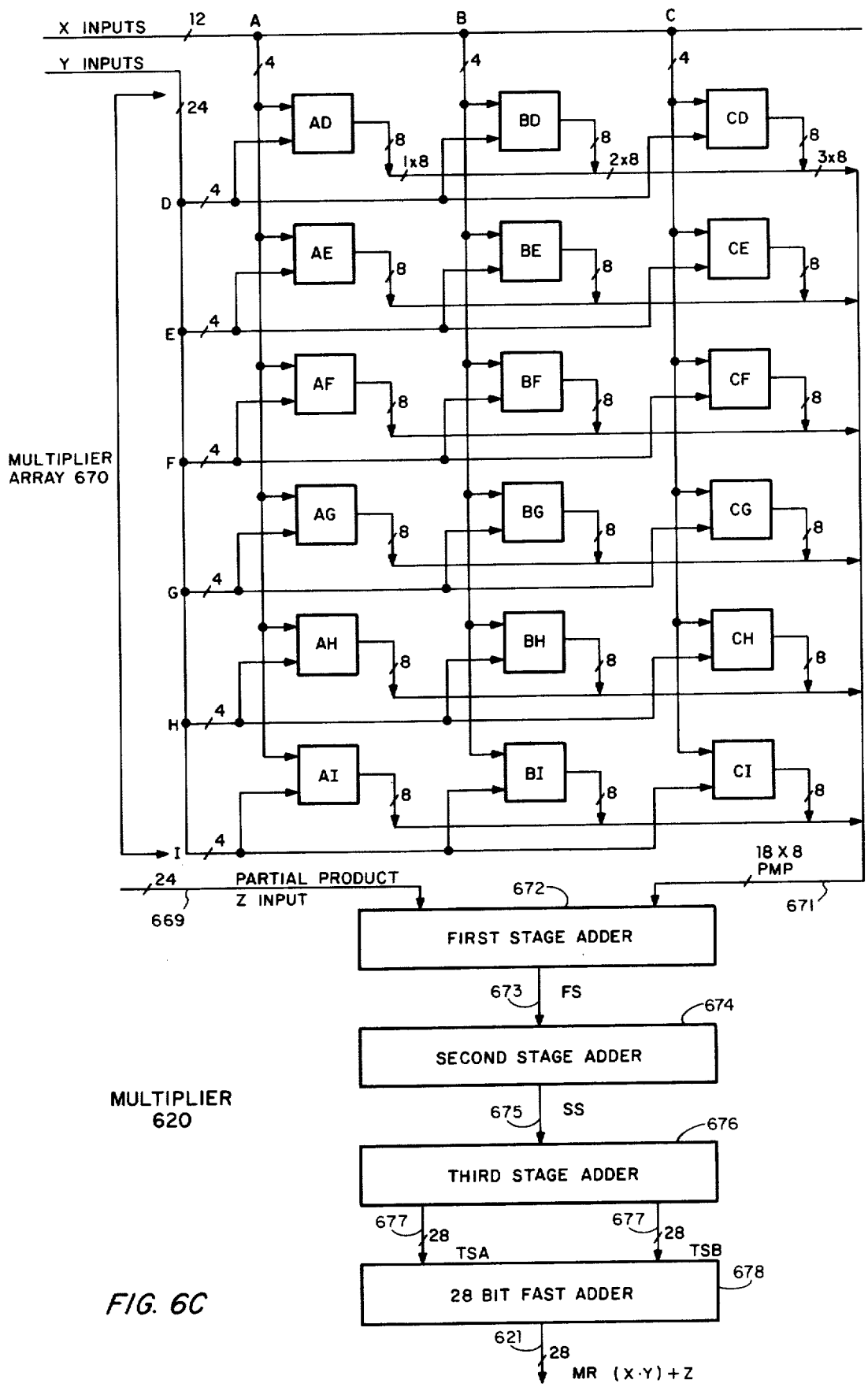
FIG. 6C is a block diagram of circuitry employed within multiplier 620 of FIG. 6.

Referring next to FIG. 6C, Multiplier 620 of FIG. 6 is shown in greater detail. X Inputs to Multiplier 620 are shown along the top of the diagram and Y Inputs are shown along the left hand side of the diagram. The 12 bit X Inputs are divided into three 4 bit Inputs A, B, and C, respectively, and the 24 bit Y Inputs are divided into six 4 bit Inputs D, E, F, G, H, and I. Product Array 670 is therefore comprised of eighteen separate 4 by 4 bit multiplier components, each having two input ports of 4 bits per port and having one output port of 8 bits. For example, individual Multiplier Designated AD multiplies the 4 bit A Input with the 4 bit D Input and provides 8 bit output. The 8 bits out of AD is not added with the 8 bit output of BD which is not added with the 8 bit output of CD, but a 24 bit output is provided by those three individual multipliers.

First stage Adder 672 thus receives 8 times 18 bits on the PMP BUS, or a total of 144 bits by way of this bus. First stage adder 674 also receives a 24 bit Partial Product Z Input. The output of first stage Adder 672 is designated FS on BUS 673, which is the input for second stage Adder 674. Output 675 of SSA674 is designated SS and is the input to third stage Adder 676, whose outputs are two 28 bit busses designated 677. These busses are directed as inputs to 28 bit fast Adder 678 whose output is a 28 bit MR BUS 621 (shown in FIG. 6 as well). Multiplier Array 670 is constructed from Standard Part SN74S274J, and the various first, second and third stage Adders are constructed from Standard Parts SN74S283J, SN74S181, and SN74S182.

Figure 6D:
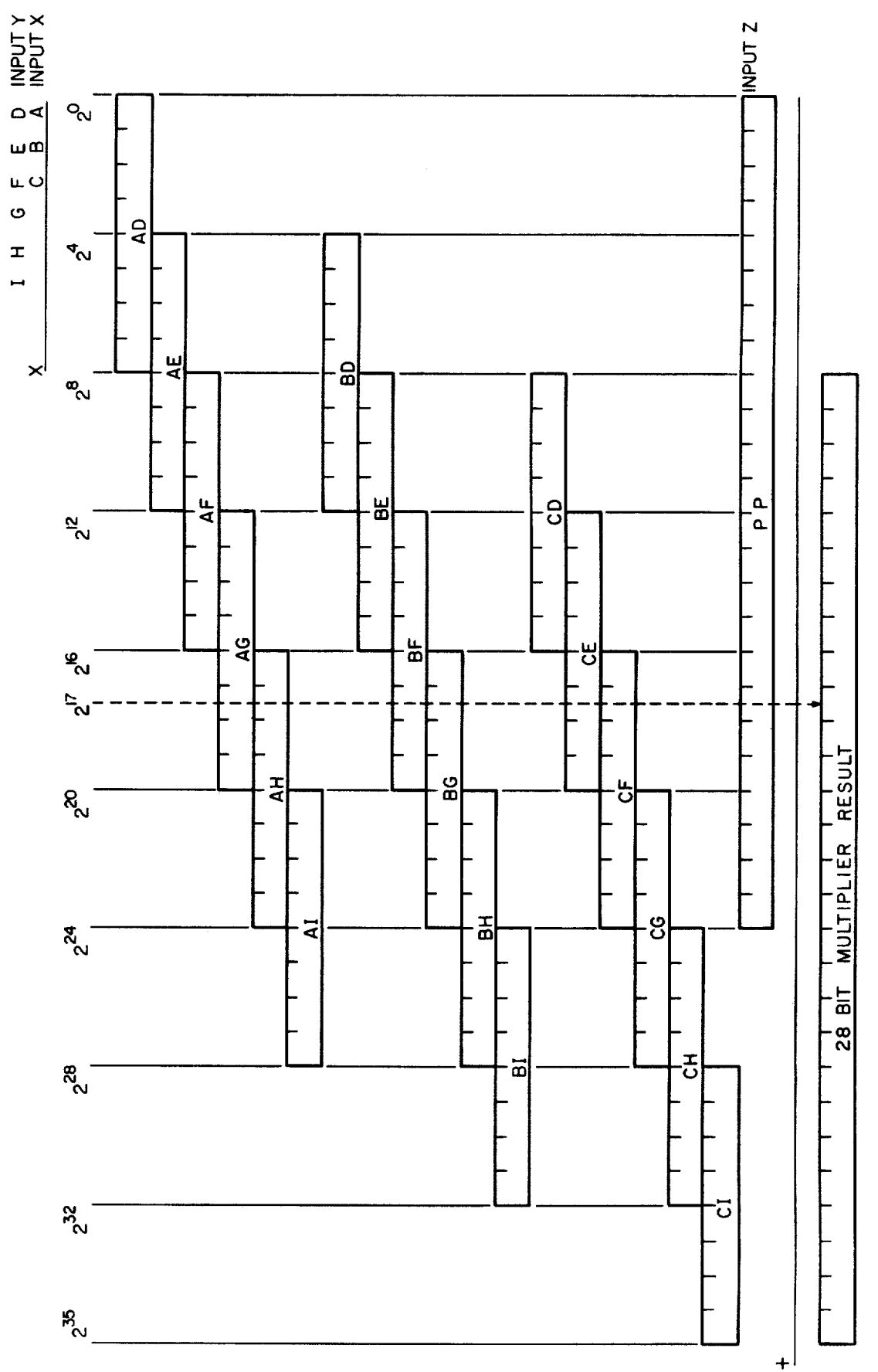
FIG. 6D is a schematic representation of operation of multiplier 620 of FIG. 6.
Figure 6E:
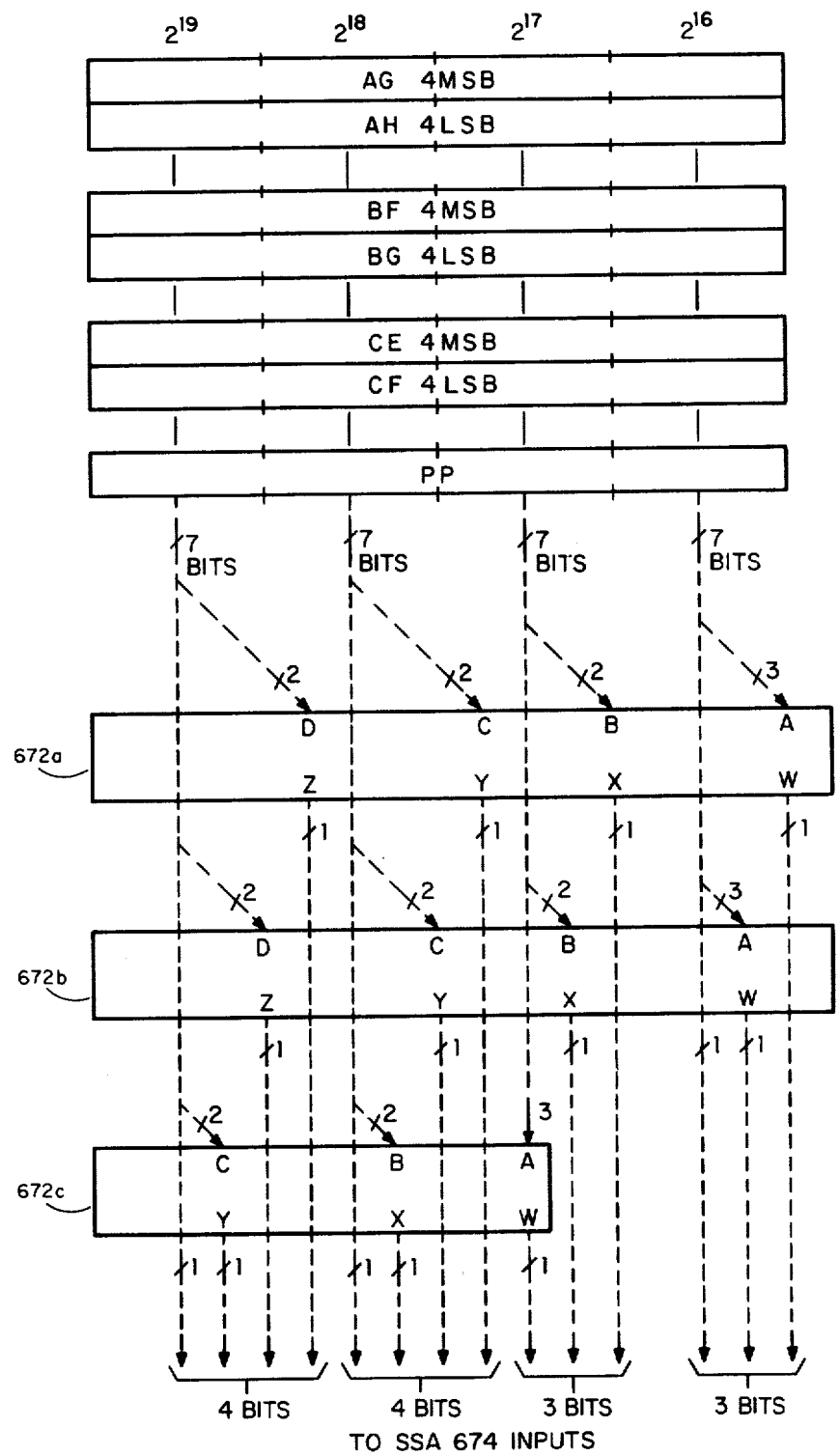
FIG. 6E is a schematic block diagram illustrating operation of each adder stage (e.g. 672) depicted in FIG. 6C.
Figure 6F:
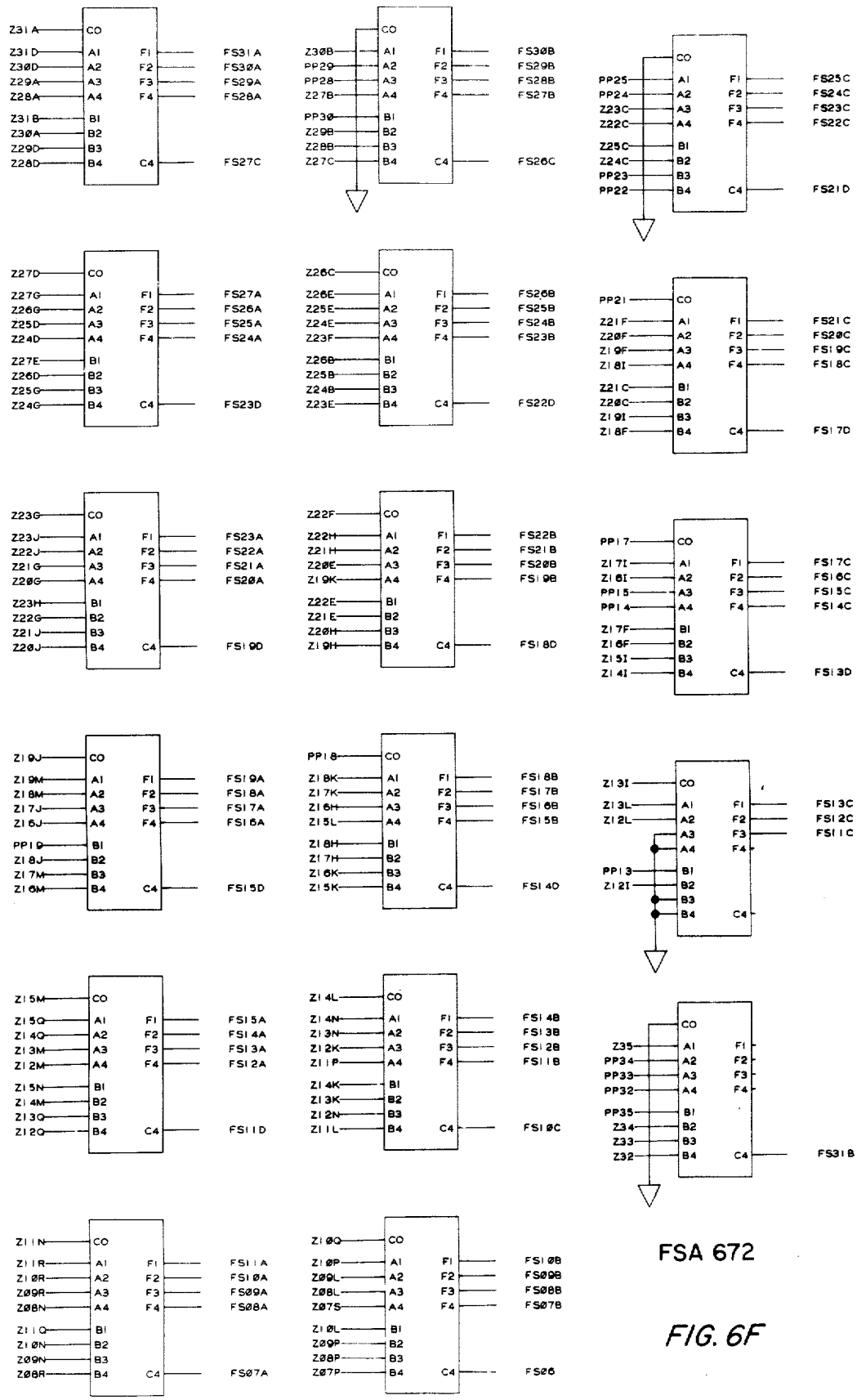
FIG. 6F is a schematic diagram showing interconnection of components of First Stage Adder 672 of FIG. 6C.

First Stage Adder (FSA) 672 is detailed in FIG. 6F, Second Stage Adder (SSA) 674 is detailed in FIG. 6G, Third Stage Adder (TSA) 676 is likewise detailed in FIG. 6G. Finally, 28 bit Fast Adder (FA) 678 is detailed in FIG. 6H. In each of these FIGS. 6F–6H, standard circuit symbology is employed. Input signals are generally designated as appearing on the left hand side of each component, and output signals are generally designated as appearing on the right hand side of respective components. Any signal output from one component which is used to designate a signal input on a succeeding component is intended to mean that there is a conductive connection between such output and such input.

FIG. 7

Figure 7:
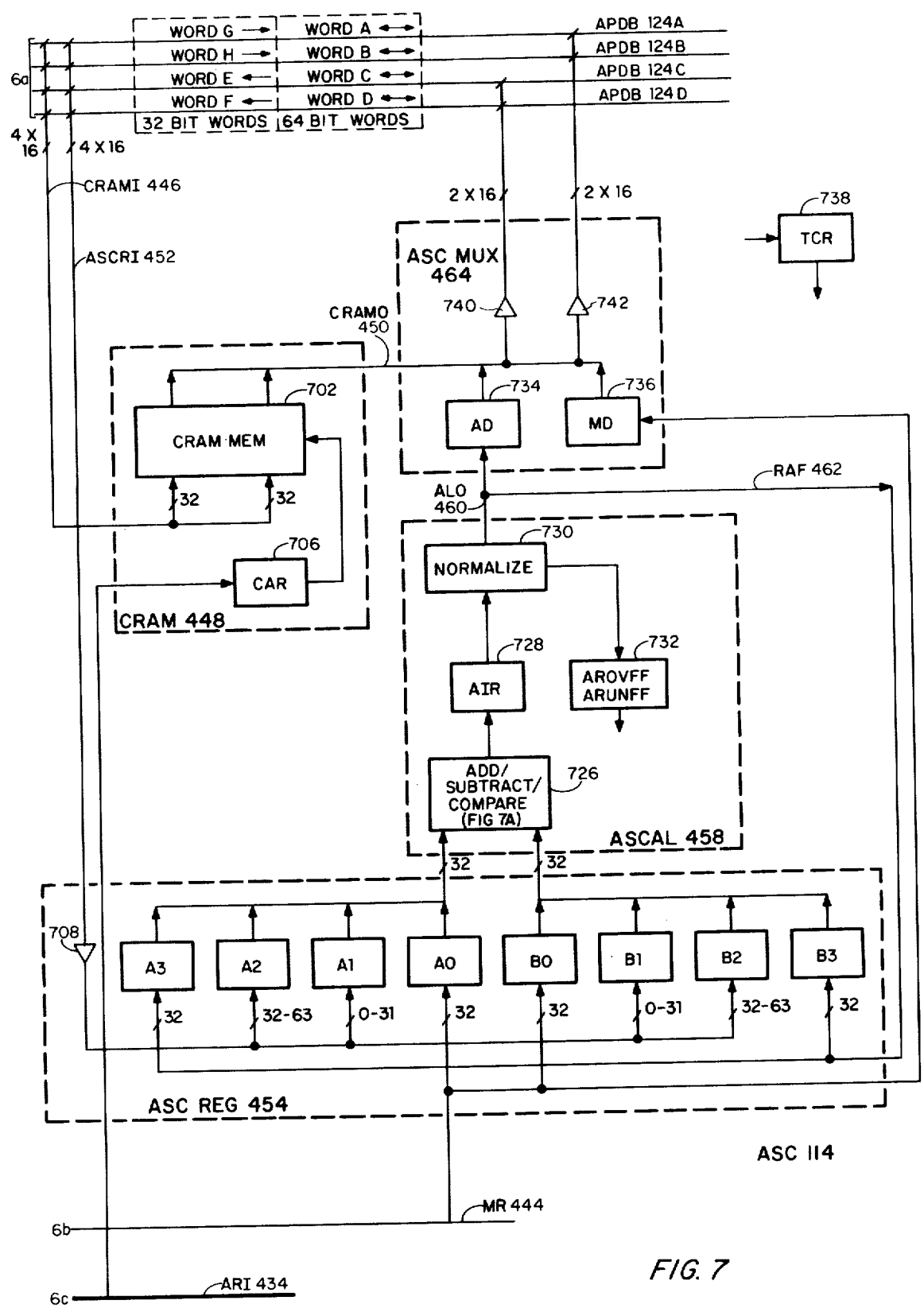
FIG. 7 is a block diagram of the ASC (add, subtract, compare) circuitry depicted in FIG. 4.

Referring to FIG. 7, ASC Register 454, ASCAL 458, CRAM 448, and ASC MUX 464 of FIG. 4 are shown in dotted line construction. ASC Register 454 contains 8 Registers, A0–A3 and B0–B3 inclusively; ASCAL 458 includes Add/Subtract/Compare Circuit 726, AIR 728, Normalize 730, and Overflow/Underflow Box 732; ASC MUX contains two Registers 734 and 736 and two Drivers; and CRAM 448 contains Scratch Pad Memory CRAM 702 and Address Register CAR 706.

As indicated, inputs to ASC 114 are derived from ARI BUS 434 and MR BUS 444 (not shown MEM BUS). ARI 434 BUS provides an input to CAR (CRAM Address Register) 706. Address Register 706 provides its output to Address CRAM Memory 702. Other inputs to CRAM Memory 702 are derived from APDB BUS 124 and outputs from this Scratch Pad Memory are conducted by way of CRAMO 450 BUS through two 32 bit busses back to APDB BUS.

The other input entering this block from MR 444 is conducted to A0 and B0 Registers as well as to MD Register 736. Inputs to A1, A2, B1, and B2 Registers are derived from APDB BUS by way of Driver 708. Inputs to A3 and B3 Registers are derived from output of the ASCAL 458 block by way of RAF 462 BUS. A0–A3 Registers provide one input to Add/Subtract/Compare 726, and B0–B3 outputs provide a second input to Add/Subtract/Compare 726. Details of ASC 726 are provided in FIG. 7A to be discussed below. The output of ASC 726 provides an input to AIR 728, an output of which provides an input to Normalize 730. An output of Normalize 730 is fed back to Registers A3 and B3 and provides an input to AD Register 734.

FIG. 7A

Figure 7A:
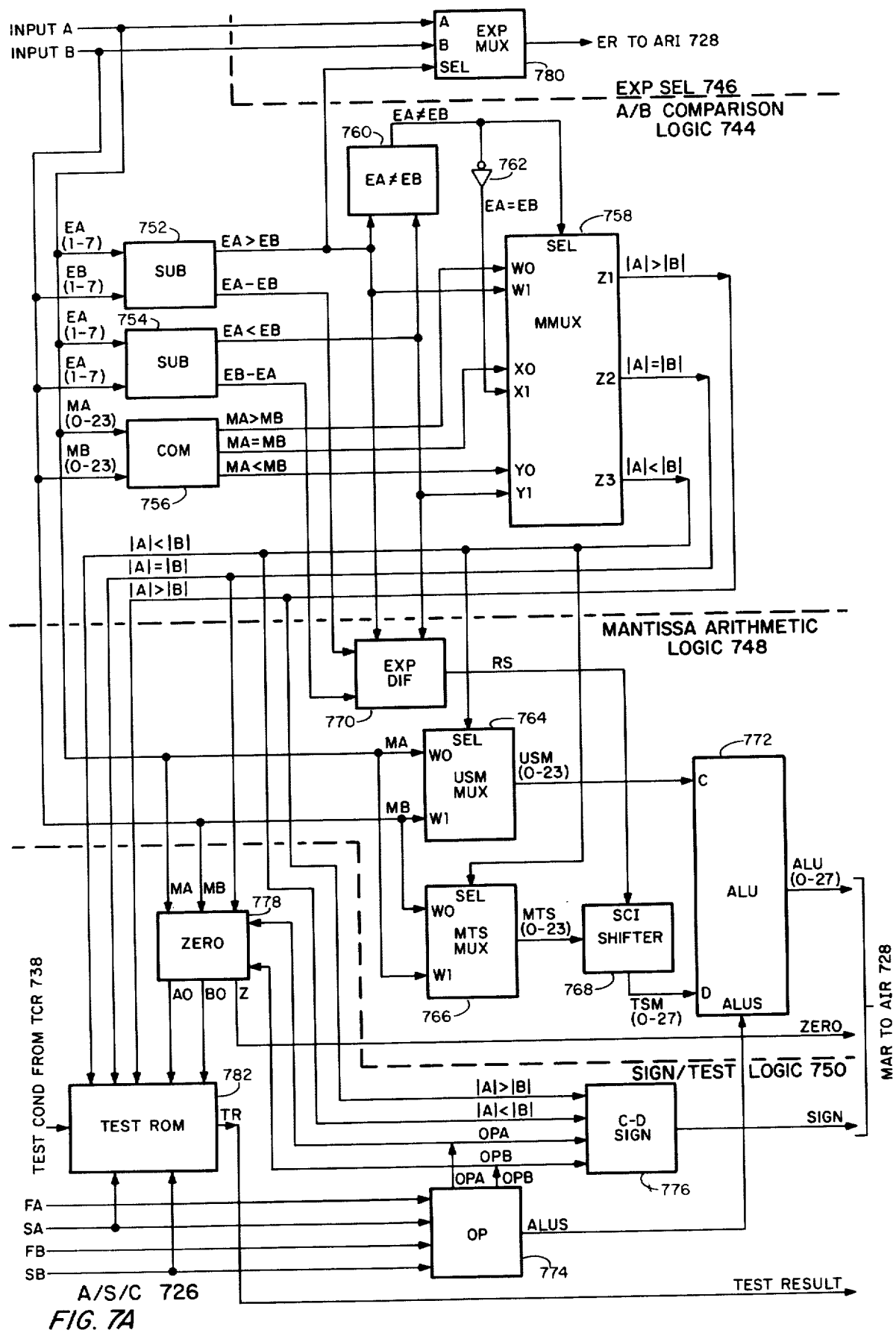
FIG. 7A is a detailed block diagram of the add, subtract, compare logic within block 726 of FIG. 7.

Referring next to FIG. 7A, Add/Subtract/Compare 726 of FIG. 7 is described in detail. Inputs from Registers A0–A3 and inputs from Registers B0–B3 are received as Input A and Input B, respectively, in the upper left hand corner of FIG. 7A. These inputs are conducted to Subtract Circuits 752 and 754 and to Compare Circuit 756. An output of Subtract Circuit 752 is conducted to EA not equal to EB Box 760 as well as select the input of exponent MUX 780 in the Exponent Select 746 portion of the circuitry. An output of Subtract Circuit 754 likewise goes to EA not equal to EB 760, an output of which is conducted to the select input of Multiplexer 758 as well as to one of the signal inputs of that Multiplexer. Other inputs to that Multiplexer are derived from the same source as the inputs to the 760 circuit just noted. Also, other inputs to Multiplexer 758 are derived from the output of Compare 756 circuitry. The Subtract Circuitry 752 and 754, the Compare Circuitry 756, the EA not equal to EB Circuitry 760, and the Multiplexer Circuitry 758 all comprise A/B Comparison Logic 744.

Moving to a lower portion of FIG. 7A, Mantissa Arithmetic Logic 748 is depicted as receiving the output of Multiplexer 758 as well as receiving Inputs A and B directly. The output from MAL 748 provides the output to AIR (Arithmetic Intermediate Result) Register 728 of FIG. 7. Considering MAL 748 in detail, outputs from Subtract Blocks 752 and 754 are conducted to Exponent Differential 770. The Z1 output of Multiplexer 758 is conducted to TEST ROM 782 and CD Sign 776. The Z2 output of Multiplexer 758 is conducted to TEST ROM 782 and ZERO 778. The Z3 output of Multiplexer 758 is conducted to TEST ROM 782, CD Sign 776, the select input of USM MUX 764, and the select input of MTS MUX 766.

Also, Inputs A and B are conducted directly into ZERO 778, USM MUX 764, and MTS MUX 766.

As can be seen, output from Exponent Differential 770 is conducted to SCI Shifter 768 whose output provides the D Input to ALU 772. The output of USM MUX 764 is the C Input to ALU 772. The output of MTS MUX 766 is the MTS input to SCI Shifter 768. The A0 and B0 outputs of ZERO 778 provide inputs to TEST ROM 782 along with the multiplex inputs earlier noted, the output of TEST ROM being Test Result (TR). Operator Block (OP) 774 receives control signals FA-SB from TCR 738 and provides outputs to ALU 772, CD Sign 776, and ZERO 778. Test Condition Register (TCR) 738 is an address register that provides the control signals in the form of addresses as discussed below. Signals ALU (0-27), ZERO, and SIGN are all conducted by way of an output bus from ASC 726 to AIR 728.

As before, this circuitry is constructed from standard integrated circuits and in the preferred embodiment are constructed from the following components: Subtract Circuits 1 and 2 are constructed from SN74S381J; Multiplexer 758 is constructed from 74S157; Multiplexer 764 is constructed from 74LS257; Multiplexer 766 is constructed from 74S157; Shifter 768 is constructed from AM25S10PC; ALU 772 is constructed from at least SN74S381J; SIGN 776 is constructed from 74S64; Operation 774 is constructed from 74S86; Test ROM 782 is constructed from 74LS151.

Recapitulating the interconnections, first bus apparatus 116 and 118 of FIG. 1 interconnects CPU102, First Memory 104 and second memory MEM 104'. Second bus apparatus 124 interconnects MEM 104' and arithmetic manipulator 112/114. In FIG. 4, third bus apparatus ARI 434 interconnects the output from control word addressing apparatus (PBL) 438 to input of DATC 420 and to input of CRAM 448. The first control store in the left hand portion of FIG. 2 is located internal to CPU 102 control in FIG. 1. The second control store is in the right hand portion of FIG. 2 an extension of sector 2 and is located internal to Interface 106 of FIG. 1. The arithmetical manipulator includes HSM 440 and combining apparatus ASC 114. The combining apparatus includes ASC 458, which comprises add, subtract, compare (or test) circuitry 744, 746 and 748 of FIG. 7A. HSM 440 includes product array 670 of FIG. 6C and apparatus 672, 674, 676, 678 for reducing number of bits by adding.

This comprises the interconnection discussion of the preferred embodiment. The following discussion is directed to operation of the system and the operation of the present invention within the system, as well as a description of cooperation between elements of the present invention and the system itself.

3. The operation (FIGS. 1–7A)

Operation of an array processor incorporating the present invention will now be described with the aid of FIGS. 1 through 7A. First, Array Processor System (APS) 100 will be described on a block diagram level. Central Processing Unit (CPU) 102, Main Memory (MEM) 104, and busses associated therewith will be described first, followed by description of Array Processor (AP) 108 and Interface 106. Certain features of an instruction set controlling the operation of APS 100 will then be described. Second, AP 108 will be discussed on a block diagram level, followed by individual discussions of the operation of Data Transfer Unit (DTU) 110, Multiplier Unit (MU) 112, and Add/Subtract/Compare Unit (ASC) 114. During these discussions, certain portions of AP 108, e.g., High Speed Multiplier 440, will be described in yet further detail. Further, certain features of APS 100 operation will be discussed and summarized.

A. Array Processor System (APS) 100 (FIGS. 1, 2, 3, & 3A)

Referring to FIG. 1, a block diagram of APS 100 is shown. In general, CPU 102 and MEM 104 comprise a digital computer system capable of performing all functions customarily performed by a digital computer. AP 108 comprises a hardware and firmware augmentation, including an array processing instruction set, of CPU 102 and MEM 104. As will be discussed further below, AP 108 is an integral part of CPU 102 and operates synchronously with CPU 102 to provide APS 100 with the capability of executing high speed array processing operations.

1. CPU 102 and MEM 104

Considering first the operation of CPU 102 and MEM 104, a user's program is stored in MEM 104. This program will include a series of macroinstructions specifying a sequence of operations to be executed by APS 100, and may include data to be operated on. Macroinstructions/data may be read from physical address locations in MEM 104 and transferred to CPU 102 through Memory Bus (MEM BUS) 118 in response to physical address signals placed on Physical Address Bus (PA BUS) 116 by CPU 102. CPU 102 may write into MEM 104 by placing macroinstructions/data on MEM BUS 118 and corresponding physical address signals on PA BUS 116.

CPU 102 may include Memory Allocation and Protection circuitry (MAP) allowing two or more users to have programs stored concurrently in MEM 104. In such cases, each user is allocated certain portions of MEM 104 physical address space. Within CPU 102, a user's program generates MEM 104 read/write addresses in terms of a logical address space defined by the user's program. Logical addresses do not necessarily have a direct relationship to MEM 104 physical address space. MAP then translates logical addresses into corresponding MEM 104 physical address locations allocated to that user.

Data/macroinstructions may be transmitted between APS 100 and external devices, e.g., Disc Drive Unit 132, Tape Transport 134, or Analog Device 130 and Data Converter 128, through Input/Output Bus (I/O BUS) 126. Data/macroinstructions may be exchanged directly between external devices and CPU 102, or between external devices and MEM 104 through CPU 102 in the manner just described.

Detailed control of APS 100 operation is performed through sequences of microinstructions stored in a microinstruction memory (discussed further below) internal to CPU 102. Microinstruction memory contains one or more sequences of microinstructions corresponding to each macroinstruction of a user's program. Microinstruction memory responds to each successive macroinstruction by providing a corresponding sequence of microinstructions which, in turn, are decoded to provide control signals to APS 100.

2. Array Processor 108 (FIGS. 1 and 2)

AP 108 was described above as being an integral part of CPU 102 and operating synchronously therewith to perform array processing functions, e.g., on data existing in a structured or organized form. Such data may include integers (e.g., 16 bit binary numbers in two's complement format), real scalars (e.g., 32 bit single precision normalized floating point numbers) and complex scalars (e.g., an ordered pair of real scalars wherein a first scalar is the real part and a second scalar is the imaginary part). AP 108 may also operate with arrays of data, i.e., ordered sequences of array elements wherein each element of the array is an individual scalar. Such arrays may be one dimensional, with sequentially organized elements, or multi-dimensional, wherein the elements are, in effect, organized into rows and columns. AP 108 may operate on arrays on an element by element basis.

AP 108, as will be described further below, may be a high speed, floating point arithmetic unit including a high speed, floating point multiplier (MU 112) and independent arithmetic circuitry (ASC 114) which are capable of simultaneous operation. These units may operate in hexidecimal format. MU 112 may provide a normalized result every 400 nanoseconds, and ASC 114 may provide a normalized result or compare output every 200 nanoseconds. AP 108 may further include a trignometric table providing trignometric functions with a resolution of 1,024 points on a unit circle, e.g., for use in calculating Fast Fourier Transforms (FFT).

AP 108 may further include a dual port memory (MEM 104' in DTU 110) having, e.g., a capacity of 4,096 16 bit words, for storing array data to be operated upon. A first memory port may be connected from MEM BUS 118 and PA BUS 116, so that MEM 104' is a part of MEM 104 physical address space. Data may thereby be read directly into or out of MEM 104' by CPU 102, so that MEM 104' appears as an integral part of MEM 104. A second memory port may be accessible by the remainder of AP 108, e.g., Multiplier Unit 112 or Add/Subtract/Compare Unit 114. This allows AP 108 to execute array processing functions on data stored therein while allowing CPU 102 concurrent access to MEM 104 and MEM 104'.

Detailed operation of AP 108 is, as is CPU 102, controlled by sequences of microinstructions corresponding to individual macroinstructions of a set of array processing macroinstructions. Referring to FIG. 2, a schematic representation of APS 100 Microinstruction Memory, previously referred to, is shown. As previously discussed, array processing macroinstructions are an integral part of APS 100 macroinstruction set. Similarly, microinstructions for controlling AP 108 in response to array processing macroinstructions are an integral part of an APS 100 microinstruction set. As indicated in FIG. 2, APS 108 Microinstruction Memory may be divided into four sectors; each sector may be 1,024 microinstructions long and divided into four pages of 256 microinstructions each. Sectors 0, 1, and 3 may be allocated to microinstruction sequences for executing non-array processing macroinstructions, i.e., computer functions customarily performed by digital computers. In these sectors, each microinstruction word may be 56 bits long. Sector 2 may be allocated to storing sequences of microinstructions for executing array processing macroinstructions. As shown, Sector 2 is extended in width so that each microinstruction word stored therein may contain 136 bits. Those portions of Sector 2 microinstruction words designated as CPU Structure may be 56 bits wide and may be used for controlling CPU 102 during the execution of array processing macroinstructions. Those portions of Sector 2 microinstruction words designated as Interface Structure may be 76 bits wide and may control the operation of AP 108 during the execution of array processing macroinstructions.

Referring again to FIG. 1, the Interface Structure portion of APS 100 Microinstruction Memory Sector 2 may be part of Interface 106. Control signals $\overline{RBUF35-37}$, $\overline{RAO-9}$, $\overline{XRAD-1}$, and $\overline{EXT.\ COND}$ are exchanged between CPU 102 and Interface 106 as described in Gruner, U.S. Pat. No. 4,104,720 and Pandeya, U.S. Pat. No. 4,071,890, incorporated herein by reference, to synchronize the operation of CPU 102 and AP 108. During the execution of array processing macroinstructions, 56 bit Sector 2 CPU Structure microinstruction words are provided to CPU 102 from the CPU 102 portion of the Microinstruction Memory. Corresponding 76 bit Sector 2 Interface Structure microinstruction words are provided to AP 108. AP 108 will thereby operate synchronously with and as an integral part of CPU 102 in executing array processing functions.

Discussion of APS 100 operation on a block diagram level is hereby included. FIG. 2 will be referred to again, and certain features of APS 100 operation shown in FIG. 2 discussed, in paragraph C. Certain features of a set of array processing macroinstructions which may be executed by the APS 100 will be discussed next.

3. Array Processor System Macroinstruction Set (FIGS. 3 and 3A)

As described above, certain macroinstructions of an APS 100 macroinstruction set control the APS 100 in executing array processing functions. Each macroinstruction is generally expressed by an acronym for convenience, e.g., a macroinstruction instructing the APS 100 to add each element of real array "X" to each corresponding element of real array "Y" and provide a resulting array "Z" may be expressed by acronym ARA (Add Real Arrays). Each such array processing macroinstruction may include two elements. The first element is, e.g., a 32 bit binary word (or two 16 bit words) representing the actual macroinstruction. The first element of macroinstruction ARA may, e.g., be 10000101011100010000010011000. This particular 32 bit word would then cause the APS 100 Microinstruction Memory to provide a corresponding sequence of 136 bit microinstruction words (i.e., 56 bit words to CPU 102 and corresponding 76 bit words to AP 108) for executing ARA.

a. Parameter Blocks (FIGS. 3 and 3A)

The second element of each array processing macroinstruction is a parameter block comprising, e.g., up to sixteen 16 bit words of information pertinent to execution of the array processing macroinstruction. Each 32 bit microinstruction is accompanied by a MEM 104 address of an associated parameter block. The associated parameter block may then be read from MEM 104 and the information contained therein used in the execution of the macroinstruction. In general, parameter blocks associated with the array processing macroinstructions of a user's program remain in MEM 104 and are not modified in executing array processing macroinstructions. As discussed further below, information from an associated parameter block is copied from MEM 104 to appropriate storage elements in CPU 102 and AP 108. The copied information is then used in executing the macroinstruction.

Referring to FIG. 3, a format of a 16 word parameter block is shown. Word 0, Error Mask, and Word 1, Error Trap Address, are not copied from MEM 104. Words 0 and 1 remain in MEM 104 and provide direction in event of an error occurring during execution of the array processing macroinstruction. In this regard, AP 108 generates status flags indicating the nature of a processing error if such an error should occur. AP 108 status flags are compared to Word 0, Error Mask. Concurrence of a status flag indicating an error and a bit in an Error Mask results in an error indication. Error indication is compared to Word 1, Error Trap Address, to indicate a MEM 104 address starting an appropriate error correction program.

Word 2, Element Count, identifies the number of data array elements to be operated upon during the execution of the associated array processing macroinstruction. In part, Word 2, Element Count, identifies the number of operational cycles to be executed by AP 108 in executing the array processing macroinstruction. Word 2, Element Count, is copied from MEM 104 to a general register in CPU 102 (not shown) and to a register (discussed further below) in AP 108.

Words 4 and 5 indicate, respectively, MEM 104' locations of the first elements of first (X) and second (Y) source arrays which, e.g., are to be multiplied together. Word 3 indicates the MEM 104' location of the first element of a destination (Z) array representing the result of, e.g., the multiplication of the X and Y arrays. Words 3, 4, and 5 are copied from MEM 104 to registers in AP 108. As will be discussed next below, MEM 104' locations represented by Words 3, 4, and 5 are successively incremented, as elements of the X and Y arrays are operated upon, to identify MEM 104' locations of successive elements of arrays X, Y, and Z.

Referring now to Words 9, 10, and 11 (Z, X, and Y step values), step values represented therein are used to select successive equally spaced elements of, respectively, Z, X, and Y arrays. These step values are copied from MEM 104 to storage elements in AP 108. As successive elements are called from X and Y arrays, and operated on to provide successive elements of Z array, these step values are added to X, Y, and Z MEM 104' addresses stored in AP 108 to generate successive MEM 104' addresses. Successive elements of the arrays are thereby selected from MEM 104'. E.g., an X array step value of 3 would result in every third element of array X being selected and operated upon. The 3 step values need not be equal and may be zero or negative. In the first case a single element of the respective array would be operated on repeatedly. In the second case operation on the respective array elements would be in reverse order. Step values may be used in executing row or column operations on multidimensional arrays, or for extraction of real or imaginary parts from a complex array.

Returning to Word 6, the Main Memory Pointer represents an MEM 104 location of the first element of an array stored in MEM 104 rather than in MEM 104'. This array, usually an integer array, may be a source or destination array. Word 6 is copied from MEM 104 to a register in CPU 102 where it is successively incremented to select successive elements of the array.

Word 7 usage depends upon the particular array processing macroinstruction being executed, as will be illustrated below in a discussion of certain array processing microinstructions which may be executed by APS 100.

Word 8, Continuation Register, controls AP 108's response to various error conditions. Normally, if AP 108 detects an error while processing an array, the operation is terminated and APS 100 proceeds immediately to an error correction routine. Word 8 specifies certain alternate responses to such errors; e.g., if an arithmetic operation results in an overflow or underflow result, Word 8 may direct AP 108 to substitute, respectively, the maximum possible value or zero for the erroneous result and to continue operation. APS 100 then proceeds to execute an appropriate error correction program after the array processing operation is completed.

Words 12 to 15 of the parameter block are used to specify either a real scalar (32 bits occupying Words 12 and 13) or a complex scalar (64 bits occupying Words 12 through 15). This scalar may be copied into an AP 108 storage element for use in, e.g., multiplying an array by the scalar.

As just discussed, each word in a parameter block serves a specific function. Further, as will become apparent in following discussions of array processing macroinstructions, any particular array processing macroinstruction may not use all words of its associated parameter block; unused words are generally ignored during the execution of a macroinstruction. As such, two or more array processing macroinstructions may be able to utilize the same parameter block, even though each macroinstruction requires a different set of parameters. This feature is illustrated in FIG. 3A, which shows the combination of a parameter block for macroinstruction Compare Real Arrays (CMA) with a parameter block for macroinstruction Create Real Array (CRE) to generate a single parameter block usable by both CMA and CRE. In this example, CMA finds those elements of array "X" which are equal to the corresponding elements of array "Y". The result of CMA is an array "M" which, as described above, is stored at address "M" in MEM 104. CRE is then used to extract the equal elements of arrays "X" and "Y" and forms these equal elements into a new array "Z". CRE uses array "M" as an input to select elements of array "X", and then orders the extracted elements from array "X" consecutively as new array "Z". As shown in FIG. 3A, parameter block Words 0, 1, and 6 are identical for CMA and CRE, and appear as Words 0, 1, and 6 of combined parameter block. Words 2, 4, 5, 10, and 11 of CMA are not used in CRE. Words 2, 4, 5, 10, and 11 of the CMA parameter block are thus used as Words 2, 4, 5, 10, and 11 of the combined parameter block. Similarly, Words 3 and 9 of the CRE parameter block are not used in CMA. Words 3 and 9 of the CRE parameter block thus appear as Words 3 and 9 of the combined parameter block.

Having described use of parameter blocks in executing array processing macroinstructions, examples of certain array processing macroinstructions which may be executed by APS 100 will be discussed next below.

b. Array Processing Macroinstructions

In general, array processing macroinstructions may fall into four general classes: scalar instructions, array instructions, signal processing instructions, and data movement/conversion instructions. Each of these classes of instructions will be described in the following discussion, in the order referred to, and examples provided of each class. In general, a description of each instruction will include instruction name, mnemonic, 32 bit macroinstruction word, parameter block, and a description of the operation performed.

Partial load alternatives exist for many of the following macroinstructions, as indicated by P added as the final letter of the mnemonic. In such cases, only a part of the associated parameter block is used in executing the macroinstruction. E.g., partial load version of Add Real Scalar, Partial (ARSP) uses a scalar value previously stored in AP 108 rather than loading a scalar value from ARS parameter block.

In certain classes of instructions, e.g., scalar and array instructions, source (X or Y) and result (Z) arrays may overlap; part of all of array Z may occupy the same AP 108 memory locations as arrays X or Y. This may be allowed because AP 108 operates on an element by element basis; no result (Z) array element is generated to be overwritten into a source array (X) memory location before the corresponding source array element is used. Thus, for example, elements 10 may be read from arrays X and Y and added to provide element 10 of array Z, which may then be written into a MEM 104′ location previously containing element 10 of array X.

Tables 1 and 2 below define certain terms and symbols used in the following discussion and are provided to enhance clarity of presentation.

TABLE 1

| OPERATIONS | |
|---|---|
| Symbol | Meaning |
| + | addition |
| − | subtraction |
| · | multiplication |
| / | division |
| ' | bit-reversal |
| \|\| | absolute value |
| Re | real part |
| Im | imaginary part |
| Σ | summation of terms |
| π | product of terms |
| < | less than |
| = | equal |
| > | greater than |
| ≦ | less or equal |
| ≠ | not equal |
| ≧ | greater or equal |
| ← | value asignment |

TABLE 2

| VARIABLES | |
|---|---|
| Symbol | Meaning |
| X | Source array. |
| Y | Source array. |
| Z | Destination array. |
| M | Main memory operand, may be source or destination, array or scalar depending on instruction. |
| W | Working register. |
| P | Scratchpad. |
| Q | Temporary intermediate array (transparent to the user). |
| $S_a$ | Step register for array "a" where "a" is any array (X,Y,Z, or M). |

Certain examples of each above named class of array processing macroinstructions are as follows:

1. Scalar Instructions

Scalar instructions perform arithmetic operations on one scalar and one array operand. Examples of this class of array processing macroinstruction are:

Add Real Scalar to Array
ARS

```
 1 1 1 0 0 0 0 1 1 0 1 1 1 1 1 1 0 0 0
 0 1 2 3 4 5 6 7 8 9 10 11 12 13 14 15
```
```
 1 1 1 1 0 0 0 0 0 0 1 1 1 1 0 0 0
 0 1 2 3 4 5 6 7 8 9 10 11 12 13 14 15
```
ARSP
```
 1 1 0 0 0 0 1 0 0 0 1 1 1 0 0 0
 0 1 2 3 4 5 6 7 8 9 10 11 12 13 14 15
```
```
 1 1 1 1 0 0 0 0 0 0 1 1 1 1 0 0 0
 0 1 2 3 4 5 6 7 8 9 10 11 12 13 14 15
```

$Z_{(nSz)} \leftarrow X_{(nSx)} + W$
$n = 0, 1, \ldots, N-1$

| WORD | NAME | CONTENTS |
|---|---|---|
| | PARAMETER BLOCK CONTENTS | |
| 0 | — | Error mask. |
| 1 | — | Trap address. |
| 2 | N | Element count. |
| 3 | $Z_0$ INDEX | Index of real array Z. |
| 4 | $X_0$ INDEX | Index of real array X. |
| 8* | — | Continuation register. |
| 9* | $S_z$ | Step value for array Z. |
| 10* | $S_x$ | Step value for array X. |
| 12,13* | W | Real scalar to be placed in working register. |

*ARS only.

FUNCTION—Places the real scaler specified in the parameter block in the working register. Then the instruction adds the contents of the working register to each element of the real source array X, and places the results in the destination array Z.

Subtract Real Scalar to Array
SRS
```
 1 1 0 0 0 0 1 0 1 1 1 1 1 0 0 0
 0 1 2 3 4 5 6 7 8 9 10 11 12 13 14 15
```
```
 1 1 1 1 0 0 1 0 0 0 0 1 1 1 1 0 0 0
 0 1 2 3 4 5 6 7 8 9 10 11 12 13 14 15
```
SRSP
```
 1 1 0 0 0 0 1 0 0 0 1 1 1 0 0 0
 0 1 2 3 4 5 6 7 8 9 10 11 12 13 14 15
```
```
 1 1 1 1 0 0 1 0 0 0 1 1 1 1 0 0 0
 0 1 2 3 4 5 6 7 8 9 10 11 12 13 14 15
```

$Z_{(nSz)} \leftarrow X_{(nSx)} - W$
$n = 0, 1, \ldots, N-1$

| WORD | NAME | CONTENTS |
|---|---|---|
| | PARAMETER BLOCK CONTENTS | |
| 0 | — | Error mask. |
| 1 | — | Trap address. |
| 2 | N | Element count. |
| 3 | $Z_0$ INDEX | Index of real array Z. |
| 4 | $X_0$ INDEX | Index of real array X. |
| 8* | — | Continuation register. |
| 9* | $S_z$ | Step value for array Z. |
| 10* | $S_x$ | Step value for array X. |
| 12,13* | W | Real scalar to be placed in working register. |

*SRS only.

FUNCTION—Places the real scalar from the parameter block in the working register. Then the instruction subtracts the contents of the working register from each element of the source array X, and places the results in the destination array Z.

Multiply Real Scalar by Array
MRS
```
 1 1 1 0 0 0 0 1 1 0 1 1 1 1 1 1 0 0 0
 0 1 2 3 4 5 6 7 8 9 10 11 12 13 14 15
```
```
 1 1 1 1 1 0 0 0 0 0 0 1 1 1 1 0 0 0
 0 1 2 3 4 5 6 7 8 9 10 11 12 13 14 15
```
MRSP
```
 1 1 1 0 0 0 0 1 0 0 0 1 1 1 0 0 0
 0 1 2 3 4 5 6 7 8 9 10 11 12 13 14 15
```
```
 1 1 1 1 1 0 0 0 0 0 0 1 1 1 1 0 0 0
 0 1 2 3 4 5 6 7 8 9 10 11 12 13 14 15
```

$Z_{(nSz)} \leftarrow W X_{(nSx)}$
$n = 0, 1, \ldots, N-1$

| WORD | NAME | CONTENTS |
|---|---|---|
| | PARAMETER BLOCK CONTENTS | |
| 0 | — | Error mask. |
| 1 | — | Trap address. |
| 2 | N | Element count. |
| 3 | $Z_0$ INDEX | Index of real array Z. |
| 4 | $X_0$ INDEX | Index of real array X. |
| 8* | — | Continuation register. |
| 9* | $S_z$ | Step value for array Z. |
| 10* | $S_x$ | Step value for array X. |
| 12,13* | W | Real Scalar to be placed in working register. |

*MRS only.

FUNCTION—Places the real scalar from the parameter block in the working register. Then the instruction multiplies the real scalar in the working register by each element of the source array X, and places the results in the destination array Z.

Multiply Complex Scalar by Array
MCS
```
 1 1 1 0 0 0 0 1 1 0 1 1 1 1 1 1 0 0 0
 0 1 2 3 4 5 6 7 8 9 10 11 12 13 14 15
```
```
 1 1 0 1 1 1 0 0 0 0 0 1 1 1 1 1 1 0 0 0
 0 1 2 3 4 5 6 7 8 9 10 11 12 13 14 15
```
MCSP
```
 1 1 1 0 0 0 0 1 1 0 0 0 1 1 1 0 0 0
 0 1 2 3 4 5 6 7 8 9 10 11 12 13 14 15
```
```
 1 1 0 1 1 1 0 0 0 0 0 1 1 1 1 1 1 0 0 0
 0 1 2 3 4 5 6 7 8 9 10 11 12 13 14 15
```

$Z_{(nSz)} \leftarrow W X_{(nSx)}$
$n = 0, 1, \ldots, N-1$

| WORD | NAME | CONTENTS |
|---|---|---|
| | PARAMETER BLOCK CONTENTS | |
| 0 | — | Error mask. |
| 1 | — | Trap address. |
| 2 | N | Element count. |
| 3 | $Z_0$ INDEX | Index of complex array Z. |
| 4 | $X_0$ INDEX | Index of complex array X. |
| 8* | — | Continuation register. |
| 9* | $S_z$ | Step value for array Z. |
| 10* | $S_x$ | Step value for array X. |
| 12-15* | W | Complex scalar to be placed in working register. |

*MCS only.

FUNCTION—Places the complex scalar in the parameter block in the working register. Then the instruction multiplies the contents of the working register by each element of the complex source array X, and places the results in the destination array Z.

---

Signed Product of Real Scalar and Array
SPS

```
|1|1|0|0|0|0|1|0|1|1|1|1|1|0|0|0|
 0 1 2 3 4 5 6 7 8 9 10 11 12 13 14 15
```

```
|1|0|1|0|1|0|0|1|0|0|1|1|1|1|0|0|0|
 0 1 2 3 4 5 6 7 8 9 10 11 12 13 14 15
```
SPSP

```
|1|1|0|0|0|0|1|0|0|0|1|1|1|1|0|0|0|
 0 1 2 3 4 5 6 7 8 9 10 11 12 13 14 15
```

```
|1|0|1|0|1|0|1|0|1|0|0|1|1|1|1|0|0|0|
 0 1 2 3 4 5 6 7 8 9 10 11 12 13 14 15
```

$Z_{(nSz)} \leftarrow |X_{(nSx)}| W$
$n = 0, 1, \ldots, N-1$

| PARAMETER BLOCK CONTENTS | | |
|---|---|---|
| WORD | NAME | CONTENTS |
| 0 | — | Error mask. |
| 1 | — | Trap address. |
| 2 | N | Element count. |
| 3 | $Z_0$ INDEX | Index of real array Z. |
| 4 | $X_0$ INDEX | Index of real array X. |
| 8* | — | Continuation register. |
| 9* | $S_z$ | Step value for array Z. |
| 10* | $S_x$ | Step value for array X. |
| 12,13* | W | Real scalar to be placed in working register. |

*SPS only.

FUNCTION—Places the real scalar from the parameter block in the working register. Then the instruction multiplies the absolute value of each element of the real source array X by the contents of the working register, and places the results in the destination array Z.

---

Compare Real Scalar to Array
CMS rel

```
|1|1|0|0|0|0|1|0|1|1|1|1|1|0|0|0|0|
 0 1 2 3 4 5 6 7 8 9 10 11 12 13 14 15
```

```
|1|RELATION|0|0|0|0|1|1|1|1|1|0|0|0|
 0 1   2 3  4 5 6 7 8 9 10 11 12 13 14 15
```
CMSP rel

```
|1|1|0|0|0|0|1|0|0|1|1|1|1|0|0|0|
 0 1 2 3 4 5 6 7 8 9 10 11 12 13 14 15
```

```
|1|RELATION|0|0|0|0|1|1|1|1|1|0|0|0|
 0 1   2 3  4 5 6 7 8 9 10 11 12 13 14 15
```

Evaluates, over n, the expression:
$X_{(nSx)}$ rel W
$n = 0, 1, \ldots, N-1$
Initially:

$i \leftarrow 1;$

For each n where the expression is true:

$M_0 \leftarrow i,$ $M_i \leftarrow nS_x$ and $i \leftarrow i + 1$

| Relational operators: | | |
|---|---|---|
| rel | Meaning | Bit field |
| LT | Less Than | 0000 |
| LE | Less or Equal | 0001 |
| EQ | Equal | 0010 |
| NE | Not Equal | 0011 |
| GT | Greater Than | 0100 |
| GE | Greater or Equal | 0101 |
| ALT | Absolute value Less Than | 0110 |
| ALE | Absolute value Less or Equal | 0111 |
| AEQ | Absolute value Equal | 1000 |
| ANE | Absolute value Not Equal | 1001 |
| AGT | Absolute value Greater Than | 1010 |
| AGE | Absolute value Greater or Equal | 1011 |

| PARAMETER BLOCK CONTENTS | | |
|---|---|---|
| WORD | NAME | CONTENTS |
| 0 | — | Error Mask. |
| 1 | — | Trap Address. |
| 2 | N | Element Count. |
| 4 | $X_0$ INDEX | Index of real array X. |
| 6 | $M_0$ ADDR | Main memory address of interger array M. |
| 10* | $S_x$ | Step value for array X. |
| 12,13* | W | Real Scalar to be placed in working register. |

*CMS only.

FUNCTION—Places the real scalar from the parameter block in the working register. Then the instruction compares the scalar in the working register to each element of the source array X. The 0th word of the integer result array M contains the number of elements for which the relation "rel" is true. Each subsequent work in M contains a number indicating one of the elements of X for which the relation was true. The numbers are relative to the start of the array, and are multiplied by the current value of the X step value.

2. Array Instructions

Array instructions include arithmetic operations on two arrays, and single array functions, such as sum of elements and search for maximum or minimum element. Examples of this class of array processing macroinstructions are:

---

Add Real Arrays
ARA

```
|1|1|0|0|0|0|1|0|1|0|1|1|1|1|0|0|0|
 0 1 2 3 4 5 6 7 8 9 10 11 12 13 14 15
```

```
|1|0|1|0|0|0|0|1|0|0|1|1|1|1|0|0|0|
 0 1 2 3 4 5 6 7 8 9 10 11 12 13 14 15
```
ARAP

```
|1|1|0|0|0|0|1|0|0|0|1|1|1|1|0|0|0|
 0 1 2 3 4 5 6 7 8 9 10 11 12 13 14 15
```

```
|1|0|1|0|0|0|0|1|0|0|1|1|1|1|0|0|0|
 0 1 2 3 4 5 6 7 8 9 10 11 12 13 14 15
```

$Z_{(nSz)} \leftarrow X_{(nSx)} + Y_{(nSy)}$
$n = 0, 1, \ldots, N-1$

| PARAMETER BLOCK CONTENTS | | |
|---|---|---|
| WORD | NAME | CONTENTS |
| 0 | — | Error mask. |
| 1 | — | Trap address. |
| 2 | N | Element count. |
| 3 | $Z_0$ INDEX | Index of real array Z. |
| 4 | $X_0$ INDEX | Index of real array X. |
| 5 | $Y_0$ INDEX | Index of real array Y. |
| 8* | — | Continuation register. |
| 9* | $S_z$ | Step value for array Z. |
| 10* | $S_x$ | Step value for array X. |

-continued

| 11* | $S_y$ | Step value for array Y. |

*ARA only.

FUNCTION—Adds each element of the source array X to the corresponding element of the source array Y and places the results in the destination array Z.

Subtract Real Arrays
SRA

|1|1|0|0|0|0|1|0|1|0|1|1|1|0|0|0|
|0|1|2|3|4|5|6|7|8|9|10|11|12|13|14|15|

|1|0|0|0|1|0|0|1|0|0|1|1|1|0|0|0|
|0|1|2|3|4|5|6|7|8|9|10|11|12|13|14|15|
SRAP

|1|1|0|0|0|0|1|0|0|0|1|1|1|0|0|0|
|0|1|2|3|4|5|6|7|8|9|10|11|12|13|14|15|

|1|0|0|0|1|0|0|1|0|0|1|1|1|0|0|0|
|0|1|2|3|4|5|6|7|8|9|10|11|12|13|14|15|

$Z_{(nSz)} \leftarrow X_{(nSx)} - Y_{(nSy)}$
$n = 0, 1, \ldots, N-1$

| | PARAMETER BLOCK CONTENTS | |
|---|---|---|
| WORD | NAME | CONTENTS |
| 0 | — | Error mask. |
| 1 | — | Trap address. |
| 2 | N | Element count. |
| 3 | $Z_0$ INDEX | Index of real array Z. |
| 4 | $X_0$ INDEX | Index of real array X. |
| 5 | $Y_0$ INDEX | Index of real array Y. |
| 8* | — | Continuation register. |
| 9* | $S_z$ | Step value for array Z. |
| 10* | $S_x$ | Step value for array X. |
| 11* | $S_y$ | Step value for array Y. |

*SRA only.

FUNCTION—Subtracts each element of the source array Y from the corresponding element of X, and places the results in the destination array Z.

Multiply Real Arrays
MRA

|1|1|0|0|0|0|1|0|1|0|1|1|1|0|0|0|
|0|1|2|3|4|5|6|7|8|9|10|11|12|13|14|15|

|1|0|0|1|0|0|0|1|0|0|1|1|1|0|0|0|
|0|1|2|3|4|5|6|7|8|9|10|11|12|13|14|15|
MRAP

|1|1|0|0|0|0|1|0|1|0|0|0|1|1|0|0|
|0|1|2|3|4|5|6|7|8|9|10|11|12|13|14|15|

|1|0|0|1|0|0|0|1|0|0|1|1|1|0|0|0|
|0|1|2|3|4|5|6|7|8|9|10|11|12|13|14|15|

$Z_{(nSz)} \leftarrow X_{(nSx)} Y_{(nSy)}$
$n = 0, 1, \ldots, N-1$

| | PARAMETER BLOCK CONTENTS | |
|---|---|---|
| WORD | NAME | CONTENTS |
| 0 | — | Error mask. |
| 1 | — | Trap address. |
| 2 | N | Element count. |
| 3 | $Z_0$ INDEX | Index of real array Z. |
| 4 | $X_0$ INDEX | Index of real array X. |
| 5 | $Y_0$ INDEX | Index of real array Y. |
| 8* | — | Continuation register. |
| 9* | $S_z$ | Step value for array Z. |
| 10* | $S_x$ | Step value for array X. |

-continued

| 11* | $S_y$ | Step value for array Y. |

*MRA only.

FUNCTION—Multiplies each element of the source array X by the corresponding element of the source array Y, and places the results in the destination array Z.

Multiply Complex Arrays
MCA

|1|1|0|0|0|0|1|0|1|0|1|1|1|0|0|0|
|0|1|2|3|4|5|6|7|8|9|10|11|12|13|14|15|

|1|0|0|1|1|0|0|1|0|0|1|1|1|0|0|0|
|0|1|2|3|4|5|6|7|8|9|10|11|12|13|14|15|
MCAP

|1|1|0|0|0|0|1|0|1|0|1|1|1|0|0|0|
|0|1|2|3|4|5|6|7|8|9|10|11|12|13|14|15|

|1|0|0|1|1|0|0|1|0|0|1|1|1|0|0|0|
|0|1|2|3|4|5|6|7|8|9|10|11|12|13|14|15|

$Z_{(nSz)} \leftarrow X_{(nSx)} Y_{(nSy)}$
$n = 0, 1, \ldots, N-1$

| | PARAMETER BLOCK CONTENTS | |
|---|---|---|
| WORD | NAME | CONTENTS |
| 0 | — | Error mask. |
| 1 | — | Trap address. |
| 2 | N | Element count. |
| 3 | $Z_0$ INDEX | Index of complete array Z. |
| 4 | $X_0$ INDEX | Index of complete array X. |
| 5 | $Y_0$ INDEX | Index of complete array Y. |
| 8* | — | Continuation register. |
| 9* | $S_z$ | Step value for array Z. |
| 10* | $S_x$ | Step value for array X. |
| 11* | $S_y$ | Step value for array Y. |

*MCA only.

FUNCTION—Multiplies each element of the source array X by the corresponding element of the source array Y, and places the results in the destination array Z.

Negate Real Array
NRA

|1|1|0|0|0|0|1|0|1|1|1|1|1|0|0|0|
|0|1|2|3|4|5|6|7|8|9|10|11|12|13|14|15|

|1|1|1|0|1|0|0|0|1|1|1|1|1|0|0|0|
|0|1|2|3|4|5|6|7|8|9|10|11|12|13|14|15|
NRAP

|1|1|1|0|0|0|1|0|0|0|1|1|1|0|0|0|
|0|1|2|3|4|5|6|7|8|9|10|11|12|13|14|15|

|1|1|1|1|0|1|0|0|0|1|1|1|1|0|0|0|
|0|1|2|3|4|5|6|7|8|9|10|11|12|13|14|15|

$Z_{(nSz)} \leftarrow W - X_{(nSx)}$
$n = 0, 1, \ldots, N-1$

| | PARAMETER BLOCK CONTENTS | |
|---|---|---|
| WORD | NAME | CONTENTS |
| 0 | — | Error mask. |
| 1 | — | Trap address. |
| 2 | N | Element count. |
| 3 | $Z_0$ INDEX | Index of real array Z. |
| 4 | $X_0$ INDEX | Index of real array X. |
| 8* | — | Continuation register. |
| 9* | $S_z$ | Step value for array Z. |
| 10* | $S_x$ | Step value for array X. |

| 12,13* | W | Real scalar to be placed in working register. |

*NRA only.

FUNCTION—Places the real scalar from the parameter block in the working register. Then the instruction subtracts each element of the real source array X from the contents of the working register, and places the results in the destination array Z. (The contents of the working register are not changed by the subtractions.)

Square Magnitudes of Complex Arrays
SMA

```
|1|1|0|0|0|0|1|0|1|0|1|1|1|0|0|0|
 0 1 2 3 4 5 6 7 8 9 10 11 12 13 14 15
```

```
|1|1|0|0|0|0|0|0|1|1|1|1|1|0|0|0|
 0 1 2 3 4 5 6 7 8 9 10 11 12 13 14 15
```

SMAP

```
|1|1|0|0|0|0|1|0|0|0|1|1|1|0|0|0|
 0 1 2 3 4 5 6 7 8 9 10 11 12 13 14 15
```

```
|1|1|0|0|0|0|0|0|1|1|1|1|1|0|0|0|
 0 1 2 3 4 5 6 7 8 9 10 11 12 13 14 15
```

$Z_{(nS_z)} \leftarrow [Re(X_{(nS_x)})]^2 + [Im(X_{(nS_x)})]^2$,
n = 0, 1, ..., N-1

| PARAMETER BLOCK CONTENTS | | |
|---|---|---|
| WORD | NAME | CONTENTS |
| 0 | — | Error mask. |
| 1 | — | Trap address. |
| 2 | N | Element count. |
| 3 | $Z_0$ INDEX | Element address of real array Z. |
| 4 | $X_0$ INDEX | Index of complex array X. |
| 8* | — | Continuation register. |
| 9* | $S_z$ | Step value for array Z. |
| 10* | $S_x$ | Step value for array X. |

*SMA only.

FUNCTION—Computes the square of the magnitude of each element of the source array X, and places the results in the destination array Z. Note that the source array is complex, but the destination array is real.

Signed Product of Real Arrays
SPR

```
|1|1|0|0|0|0|1|0|1|0|1|1|1|0|0|0|
 0 1 2 3 4 5 6 7 8 9 10 11 12 13 14 15
```

```
|1|0|1|0|0|0|0|1|0|0|1|1|1|0|0|0|
 0 1 2 3 4 5 6 7 8 9 10 11 12 13 14 15
```

SPRP

```
|1|1|0|0|0|0|1|0|0|0|1|1|1|0|0|0|
 0 1 2 3 4 5 6 7 8 9 10 11 12 13 14 15
```

```
|1|0|1|0|0|0|0|1|0|0|1|1|1|0|0|0|
 0 1 2 3 4 5 6 7 8 9 10 11 12 13 14 15
```

$Z_{(nS_z)} \leftarrow |X_{(nS_x)}| Y_{(nS_y)}$
n = 0,1, ..., N − 1

| PARAMETER BLOCK CONTENTS | | |
|---|---|---|
| WORD | NAME | CONTENTS |
| 0 | — | Error mask. |
| 1 | — | Trap address. |
| 2 | N | Element count. |
| 3 | $Z_0$ INDEX | Index of real array Z. |
| 4 | $X_0$ INDEX | Index of real array X. |
| 5 | $Y_0$ INDEX | Index of real array Y. |
| 8* | — | Continuation register. |
| 9* | $S_z$ | Step value for array Z. |
| 10* | $S_x$ | Step value for array X. |
| 11* | $S_y$ | Step value for array Y. |

*SPR only

FUNCTION—Multiplies the absolute value of each element of the source array X by the corresponding element of source array Y, and places the results in the destination array Z.

Sum of Elements of Real Array
SER

```
|1|1|0|0|0|0|1|0|1|0|1|1|1|0|0|0|
 0 1 2 3 4 5 6 7 8 9 10 11 12 13 14 15
```

```
|1|1|1|1|0|0|0|0|1|1|1|1|0|0|0|
 0 1 2 3 4 5 6 7 8 9 10 11 12 13 14 15
```

SERP

```
|1|1|0|0|0|0|1|0|0|0|1|1|1|0|0|0|
 0 1 2 3 4 5 6 7 8 9 10 11 12 13 14 15
```

```
|1|1|1|1|1|0|0|0|0|1|1|1|1|0|0|0|
 0 1 2 3 4 5 6 7 8 9 10 11 12 13 14 15
```

$W \leftarrow \sum_{n=0}^{N-1} X_{(nS_x)}$, and, if:
Address (M) $\neq$ 0
then
M $\leftarrow$ W

| PARAMETER BLOCK CONTENTS | | |
|---|---|---|
| WORD | NAME | CONTENTS |
| 0 | — | Error mask. |
| 1 | — | Trap address. |
| 2 | N | Element count. |
| 4 | $X_0$ INDEX | Index of real array X. |
| 6 | M ADDR | Address at which to store result. |
| 8* | — | Continuation register. |
| 10* | $S_x$ | Step value for array X. |

*SER only.

Adds the elements of the source array X together and places the result in the working register. If parameter word 6 is nonzero, the result is also stored at the specified address, which may be anywhere in main memory.

Product of Elements of Real Array
PER

```
|1|1|0|0|0|0|1|0|1|0|1|1|1|0|0|0|
 0 1 2 3 4 5 6 7 8 9 10 11 12 13 14 15
```

```
|1|0|1|1|0|0|0|1|0|0|1|1|1|0|0|0|
 0 1 2 3 4 5 6 7 8 9 10 11 12 13 14 15
```

PERP

```
|1|1|0|0|0|0|1|0|0|1|1|1|1|0|0|0|
 0 1 2 3 4 5 6 7 8 9 10 11 12 13 14 15
```

-continued

```
|1|0|1|1|0|0|0|1|0|0|1|1|1|0|0|0|
 0  1  2  3  4  5  6  7  8  9 10 11 12 13 14 15
```

$$W \leftarrow \pi_{n=0}^{N-1} X_{(nSx)},$$

and, if:
Address (M) ≠ 0
then
M ← W

| PARAMETER BLOCK CONTENTS | | |
|---|---|---|
| WORD | NAME | CONTENTS |
| 0 | — | Error mask. |
| 1 | — | Trap address. |
| 2 | N | Element count. |
| 4 | $X_0$ INDEX | Index of real array X. |
| 6 | M ADDR | Address at which to store result. |
| 8* | — | Continuation register. |
| 10* | $S_x$ | Step value for array X. |

*PER only.

FUNCTION—Multiplies the elements of the source array X and places the result in the working register. If parameter word 6 is nonzero, the result is also stored at the specific address, which may be anywhere in main memory. NOTE: The previous contents of the working register are destroyed by this instruction.

Product of Elements of Complex Array
PEC

```
|1|1|0|0|0|0|1|0|1|0|1|1|1|0|0|0|
 0  1  2  3  4  5  6  7  8  9 10 11 12 13 14 15
```

```
|1|1|0|1|1|0|0|0|0|1|1|1|1|0|0|0|
 0  1  2  3  4  5  6  7  8  9 10 11 12 13 14 15
```

PECP

```
|1|1|0|0|0|0|1|0|0|1|1|1|1|0|0|0|
 0  1  2  3  4  5  6  7  8  9 10 11 12 13 14 15
```

```
|1|1|0|1|1|0|0|0|0|1|1|1|1|0|0|0|
 0  1  2  3  4  5  6  7  8  9 10 11 12 13 14 15
```

$$W \leftarrow \pi_{n=0}^{N-1} X_{(nSx)}$$

and, if:
Address (M) ≠ 0
then
M ← W

| PARAMETER BLOCK CONTENTS | | |
|---|---|---|
| WORD | NAME | CONTENTS |
| 0 | — | Error mask. |
| 1 | — | Trap address. |
| 2 | N | Element count. |
| 4 | $X_0$ INDEX | Index of complex array X. |
| 6 | M ADDRESS | Address at which to store result. |
| 8* | — | Continuation register. |
| 10* | $S_x$ | Step value for array X. |

*PEC only.

FUNCTION—Multiplies the elements of the source array X and places the result in the working register. If parameter word 6 is nonzero, the result is also stored at the specific address, which may be anywhere in main memory. NOTE: The previous contents of the working register are destroyed by this instruction.

Inner Product of Real Arrays
IPR

```
|1|1|0|0|0|0|1|0|1|0|1|1|1|0|0|0|
 0  1  2  3  4  5  6  7  8  9 10 11 12 13 14 15
```

```
|1|1|1|0|0|0|0|0|1|0|1|1|1|0|0|0|
 0  1  2  3  4  5  6  7  8  9 10 11 12 13 14 15
```

IPRP

```
|1|1|0|0|0|0|1|0|0|1|1|1|1|0|0|0|
 0  1  2  3  4  5  6  7  8  9 10 11 12 13 14 15
```

```
|1|1|1|0|0|0|0|0|1|0|1|1|1|0|0|0|
 0  1  2  3  4  5  6  7  8  9 10 11 12 13 14 15
```

$$W \leftarrow \sum_{n=0}^{N-1} X_{(nSx)} Y_{(nSy)}$$

and, if:
Address (M) ≠ 0
then
M ← W

| PARAMETER BLOCK CONTENTS | | |
|---|---|---|
| WORD | NAME | CONTENTS |
| 0 | — | Error mask. |
| 1 | — | Trap address. |
| 2 | N | Element count. |
| 4 | $X_0$ INDEX | Index of real array X. |
| 5 | $Y_0$ INDEX | Index of real array Y. |
| 6 | M ADDR | Address at which to store result. |
| 8* | — | Continuation register. |
| 10* | $S_x$ | Step value for array X. |
| 11* | $S_y$ | Step value for array Y. |

*IPR only.

FUNCTION—Computes the inner ("dot") product of the two arrays X and Y, and places the result in the working register. If parameter word 6 is nonzero, the result is also stored at the specified address, which may be anywhere in main memory.

Inner Product of Complex Arrays
IPC

```
|1|1|0|0|0|0|1|0|1|0|1|1|1|0|0|0|
 0  1  2  3  4  5  6  7  8  9 10 11 12 13 14 15
```

```
|1|1|1|0|1|0|0|0|1|0|1|1|1|0|0|0|
 0  1  2  3  4  5  6  7  8  9 10 11 12 13 14 15
```

IPCP

```
|1|1|0|0|0|0|1|0|0|1|1|1|1|0|0|0|
 0  1  2  3  4  5  6  7  8  9 10 11 12 13 14 15
```

```
|1|1|1|0|1|0|0|0|1|0|1|1|1|0|0|0|
 0  1  2  3  4  5  6  7  8  9 10 11 12 13 14 15
```

$$W \leftarrow \sum_{n=0}^{N-1} X_{(nSx)} Y_{(nSy)}$$

and, if:
Address (M) ≠ 0
then
M ← W

| PARAMETER BLOCK CONTENTS | | |
|---|---|---|
| WORD | NAME | CONTENTS |
| 0 | — | Error mask. |
| 1 | — | Trap address. |
| 2 | N | Element count. |
| 3 | $X_0$ INDEX | Index of complex array X. |
| 5 | $Y_0$ INDEX | Index of complex array Y. |
| 6 | M | Address at which to store result. |

-continued

|  | ADDR |  |
|---|---|---|
| 8* | — | Continuation register. |
| 10* | $S_x$ | Step value for array X. |
| 11* | $S_y$ | Step value for array Y. |

*IPC only.

FUNCTION—Computes the inner ("dot") product of the two source arrays X and Y, and places the result in the working register. If parameter word 6 is nonzero, the result is also stored at the specified address, which may be anywhere in main memory.

Evaluate Polynominal for Real Array
EPR

```
|1|1|1|0|0|0|1|0|1|1|1|1|0|0|0|
 0  1  2  3  4  5  6  7  8  9 10 11 12 13 14 15
```

```
|1|0|0|1|0|0|0|0|0|0|1|1|1|0|0|0|
 0  1  2  3  4  5  6  7  8  9 10 11 12 13 14 15
```

EPRP

```
|1|1|1|0|0|0|1|0|0|1|1|1|1|0|0|0|
 0  1  2  3  4  5  6  7  8  9 10 11 12 13 14 15
```

```
|1|0|0|1|0|0|0|0|0|0|1|1|1|0|0|0|
 0  1  2  3  4  5  6  7  8  9 10 11 12 13 14 15
```

$$W \leftarrow \sum_{n=0}^{N-1} X_n W^n$$

and, if:
Address (M) ≠ 0
then
M ← W

| PARAMETER BLOCK CONTENTS | | |
|---|---|---|
| WORD | NAME | CONTENTS |
| 0 | — | Error mask. |
| 1 | — | Trap address. |
| 2 | N | Element count. |
| 4 | $X_0$ INDEX | Index of real array X. |
| 6 | M ADDR | Address at which to store result. |
| 8* | — | Continuation register. |
| 12,13* | W | Real scalar to be placed in working register. |

*EPR only.

FUNCTION—Places the real scalar from the parameter block in the working register. Then the instruction computes the value of the polynomial whose coefficients are stored in the source array X, and places the result back in the working register. If parameter word 6 is nonzero, the result is also stored at the specified address, which may be anywhere in main memory.

The working register is used as both input and output by this instruction. The result is not stored in the working register until the final value of the polynomial has been computed.

Evaluate Polynominal for Complex Array
EPC

```
|1|1|1|0|0|0|1|0|1|1|1|1|0|0|0|
 0  1  2  3  4  5  6  7  8  9 10 11 12 13 14 15
```

```
|1|0|0|1|1|0|0|0|0|0|1|1|1|0|0|0|
 0  1  2  3  4  5  6  7  8  9 10 11 12 13 14 15
```

EPCP

```
|1|1|1|0|0|0|1|0|0|1|1|1|1|0|0|0|
 0  1  2  3  4  5  6  7  8  9 10 11 12 13 14 15
```

```
|1|0|0|1|1|0|0|0|0|0|1|1|1|0|0|0|
 0  1  2  3  4  5  6  7  8  9 10 11 12 13 14 15
```

$$W \leftarrow \sum_{n=0}^{N-1} X_n W^n$$

and, if:
Address (M) ≠ 0
then
M ← W

| PARAMETER BLOCK CONTENTS | | |
|---|---|---|
| WORD | NAME | CONTENTS |
| 0 | — | Error mask. |
| 1 | — | Trap address. |
| 2 | N | Element count. |
| 4 | $X_0$ INDEX | Index of complex array X. |
| 6 | M ADDRESS | Address at which to store result. |
| 8* | — | Continuation register. |
| 12-15* | W | Complex scalar to be placed in working register. |

*EPC only.

FUNCTION—Places the complex scalar from the parameter block in the working register. Then the instruction computes the value of the polynomial whose terms are stored in the source array X, and places the result in the working register. If parameter word 6 is nonzero, the result is also stored at the specified address, which may be anywhere in main memory.

The working register is used as both input and output for this instruction. The result is not stored in the working register until the final value of the polynomial has been computed.

Maximum Element of Real Array
MXR

```
|1|1|0|0|0|0|1|0|1|0|1|1|1|0|0|0|
 0  1  2  3  4  5  6  7  8  9 10 11 12 13 14 15
```

```
|1|1|1|1|0|0|0|0|1|0|1|1|1|0|0|0|
 0  1  2  3  4  5  6  7  8  9 10 11 12 13 14 15
```

MXRP

```
|1|1|0|0|0|0|1|0|0|1|1|1|1|0|0|0|
 0  1  2  3  4  5  6  7  8  9 10 11 12 13 14 15
```

```
|1|1|1|1|0|0|0|0|1|0|1|1|1|0|0|0|
 0  1  2  3  4  5  6  7  8  9 10 11 12 13 14 15
```

$W \leftarrow \text{Max}(X_{(nS_x)})$
n = 0, 1, . . . , N-1
and $M_{Max} \leftarrow X_{(nS_x)}.$
and $M_{index} \leftarrow nS_x$
for the first maximum element

| PARAMETER BLOCK CONTENTS | | |
|---|---|---|
| WORD | NAME | CONTENTS |
| 0 | — | Error mask. |
| 1 | — | Trap address. |
| 2 | N | Element count. |
| 4 | $X_0$ INDEX | Index of real array X. |
| 6 | $M_{max}$ ADDR | Address at which to store value of geatest element. |
| 7 | $M_{index}$ | Address at which to store |

| | ADDR | index of greatest element. |
|---|---|---|
| 8* | — | Continuation register. |
| 10* | $S_x$ | Step value for array X. |

*MXR only.

FUNCTION—Searches the source array X for the element having the greatest value, and places this value in the working register. Then the instruction stores a number indicating the location of this element in main memory at the address specified by parameter word 7. The number is relative to the start of X, and is multiplied by the current value of the X step register. The value of the maximum element is placed in main memory at the address specified by parameter word 6.

If several elements of X are equal to the maximum value, the address returned by MXR will point to the first occurrence of the value.

Minimum Element of Real Array
MNR

```
|1|1|0|0|0|0|1|0|1|0|1|1|1|0|0|0|
 0 1 2 3 4 5 6 7 8 9 10 11 12 13 14 15
```

```
|1|1|1|1|1|0|0|0|1|0|1|1|1|0|0|0|
 0 1 2 3 4 5 6 7 8 9 10 11 12 13 14 15
```
MNRP

```
|1|1|0|0|0|0|1|0|0|1|1|1|1|0|0|0|
 0 1 2 3 4 5 6 7 8 9 10 11 12 13 14 15
```

```
|1|1|1|1|1|0|0|0|1|0|1|1|1|0|0|0|
 0 1 2 3 4 5 6 7 8 9 10 11 12 13 14 15
```

W ⟵ Min($X_{(nSx)}$)

n = 0, 1, ..., N-1 and $M_{Min}$ ⟵ $X_{(nSx)}$, and $M_{index}$ ⟵ $nS_x$ for the first minimum element.

| PARAMETER BLOCK CONTENTS | | |
|---|---|---|
| WORD | NAME | CONTENTS |
| 0 | — | Error mask. |
| 1 | — | Trap address. |
| 2 | N | Element count. |
| 4 | $X_0$ INDEX | Index of real array X. |
| 6 | $M_{min}$ ADDR | Address at which to store value of least element. |
| 7 | $M_{index}$ ADDR | Address at which to store index of least element. |
| 10* | $S_x$ | Step value for array X. |

*MNR only.

FUNCTION—Searches the source array X for the element having the lowest value, and places this value in the working register. Then the instruction stores a number indicating the location of this element in main memory at the address specified by parameter word 7. The number is relative to the start of X, and is multiplied by the current value of the X step register. The value of the minimum element is placed in main memory at the address specified by parameter word 6.

If several elements of X are equal to the minimum value, the address returned by MNR will point to the first occurrence of the value.

Compare Arrays
CMA rel

```
|1|1|0|0|0|0|1|0|1|0|1|1|1|0|0|0|
 0 1 2 3 4 5 6 7 8 9 10 11 12 13 14 15
```

```
|1|RELATION|0|0|0|1|0|1|1|1|0|0|0|
 0 1 2 3 4 5 6 7 8 9 10 11 12 13 14 15
```
CMAP rel

```
|1|1|0|0|0|0|1|0|0|1|1|1|0|0|0|
 0 1 2 3 4 5 6 7 8 9 10 11 12 13 14 15
```

```
|1|RELATION|0|0|0|1|0|1|1|1|0|0|0|
 0 1 2 3 4 5 6 7 8 9 10 11 12 13 14 15
```

| PARAMETER BLOCK CONTENTS | | |
|---|---|---|
| WORD | NAME | CONTENTS |
| 0 | — | Error Mask. |
| 1 | — | Trap Address. |
| 2 | N | Element count. |
| 4 | $X_0$ INDEX | Index of real array X. |
| 5 | $Y_0$ INDEX | Index of real array Y. |
| 6 | $M_0$ ADDR | Main memory address of integer array M. |
| 10* | $S_x$ | Step value for array X. |
| 11* | $S_y$ | Step value for array Y. |

Evaluates, over n, the expression:
$X_{(n\,Sx)}$ rel $Y_{(n\,Sy)}$
n = 0, 1, ..., N−1
Initially:
i ← 1;
For each n where the expression is true:
$M_0$ ← i,
$M_i$ ← n $S_x$
and
i ← i + 1

Relational operators:

| rel | Meaning | Bit field |
|---|---|---|
| LT | Less Than | 0000 |
| LE | Less or Equal | 0001 |
| EQ | Equal | 0010 |
| NE | Not Equal | 0011 |
| GT | Greater Than | 0100 |
| GE | Greater or Equal | 0101 |
| A LT | Absolute value Less Than | 0110 |
| A LE | Absolute value Less or Equal | 0111 |
| A EQ | Absolute value Equal | 1000 |
| A Ne | Absolute value Not Equal | 1001 |
| A GT | Absolute value Greater Than | 1010 |
| A GE | Absolute value Greater or Equal | 1011 |

FUNCTION—Compares corresponding elements of the two source arrays X and Y. The first word of the integer result array M contains the number of elements for which the relation specified by rel is true. Each subsequent word of M contains a number indicating one of the elements of X for which the relation was true. The numbers are relative to the start of X, and are multiplied by the current contents of the X step register. Note that M may be anywhere in main memory.

3. Signal Processing Instructions

Signal processing instructions may include convolution, correlation, and several types of digital filtering. Certain macroinstructions, e.g., FFTC and FFTR, must be used in combination in computing a transform of a real array. For example, FFTC would be used first to perform initial calculations. ERC would then follow to rearrange intermediate data resulting from FFTC. Finally, FFTR would be used to complete the Fourier Transform. In another example, an inverse real Fast Fourier Transform, FFTR would be used to perform initial calculations. FFTC would then be used to complete the transform, followed by BRC to reorganize the resultant array into final form. Examples of this class of array processing microinstruction are:

Convolution of Real Arrays
CONR

```
|1|1|1|0|0|0|1|0|1|0|1|1|1|0|0|0|
 0 1 2 3 4 5 6 7 8 9 10 11 12 13 14 15
```

```
|1|0|0|0|0|0|0|0|0|1|1|1|1|0|0|0|
 0 1 2 3 4 5 6 7 8 9 10 11 12 13 14 15
```

CONRZ

```
|1|1|1|0|0|0|1|0|1|0|1|1|1|0|0|0|
 0 1 2 3 4 5 6 7 8 9 10 11 12 13 14 15
```

```
|1|1|1|1|0|0|0|0|0|1|1|1|0|0|0|0|
 0 1 2 3 4 5 6 7 8 9 10 11 12 13 14 15
```

$$Z_n \leftarrow \sum_{m=0}^{M-1} X_{n-m} Y_m$$
$$n = 0, 1, \ldots < \cdot N - 1$$

PARAMETER BLOCK CONTENTS

| WORD | NAME | CONTENTS |
|---|---|---|
| 0 | — | Error mask. |
| 1 | — | Trap address. |
| 2 | N | Element count for source array X. |
| 3 | $Z_0$ INDEX | Index of real array Z. |
| 4 | $X_0$ INDEX | Index of real array X. |
| 5 | $Y_0$ INDEX | Index of real array Y. |
| 7 | M | Element count for source array Y. |
| 8 | — | Continuation register. |

FUNCTION—Computes the convolution product of the source arrays X and Y, and places the result in the destination array Z.

CONR assumes that X has length $N+M-1$. The first $M-1$ elements are the initial conditions. They are stored in elements with negative subscripts, $X(-M+1)$ through $X-1$.

CONRZ assumes that all initial conditions are zero. The number of elements in X is equal to N.

The sizes of the source arrays X and Y are limited by the condition that $2(M+N)-1$ must be less than or equal to 2048.

Convolution of Complex Arrays
CONC

```
|1|1|1|0|0|0|1|0|1|0|1|1|1|0|0|0|
 0 1 2 3 4 5 6 7 8 9 10 11 12 13 14 15
```

```
|1|0|0|0|1|0|0|0|0|1|1|1|1|0|0|0|
 0 1 2 3 4 5 6 7 8 9 10 11 12 13 14 15
```

CONCZ

```
|1|1|1|0|0|0|1|0|1|0|1|1|1|0|0|0|
 0 1 2 3 4 5 6 7 8 9 10 11 12 13 14 15
```

```
|1|1|1|1|0|0|0|0|0|1|1|1|0|0|0|0|
 0 1 2 3 4 5 6 7 8 9 10 11 12 13 14 15
```

$$Z_n \leftarrow \sum_{m=0}^{M-1} X_{n-m} Y_m$$
$$n = 0, 1, \ldots, N-1$$

PARAMETER BLOCK CONTENTS

| WORD | NAME | CONTENTS |
|---|---|---|
| 0 | — | Error mask. |
| 1 | — | Trap address. |
| 2 | N | Element count for source array X. |
| 3 | $Z_0$ INDEX | Index of complex array Z. |
| 4 | $X_0$ INDEX | Index of complex array X. |
| 5 | $Y_0$ INDEX | Index of complex array Y. |
| 7 | M | Element count for source array Y. |
| 8 | — | Continuation register. |

FUNCTION—Computes the convolution product of the source arrays X and Y, and places the result in the destination array Z.

CONC assumes that X has length $N+M-1$. The first $M-1$ elements are the initial conditions. They are stored in elements with negative subscripts, $X(-M+1)$ through $X-1$.

CONCZ assumes that all initial conditions are zero. The number of elements in X is equal to N.

The sizes of the source arrays are limited by the condition that $2(M+N)-1$ must be less than or equal to 1024.

Correlation of Real Arrays
CORR

```
|1|1|1|0|0|0|1|0|1|0|1|1|1|0|0|0|
 0 1 2 3 4 5 6 7 8 9 10 11 12 13 14 15
```

```
|1|0|0|1|0|0|0|0|0|1|1|1|1|0|0|0|
 0 1 2 3 4 5 6 7 8 9 10 11 12 13 14 15
```

$$Z_n \leftarrow \sum_{m=0}^{M-1} X_{n+m} Y_m$$
$$n = 0, 1, \ldots, N-1$$

PARAMETER BLOCK CONTENTS

| WORD | NAME | CONTENTS |
|---|---|---|
| 0 | — | Error mask. |
| 1 | — | Trap address. |
| 2 | N | Element count N used to compute length of source array X. |
| 3 | $Z_0$ INDEX | Index of real array Z. |
| 4 | $X_0$ INDEX | Index of real array X. |
| 5 | $Y_0$ INDEX | Index of real array Y. |
| 7 | M | Element count M for source array Y. |
| 8 | — | Continuation register. |

FUNCTION—Computes the correlation product of the source arrays X and Y, and places the result in the destination array Z. The length of X is assumed to be $N+M-1$.

Correlation of Complex Arrays
CORC

```
| 1 1 1 0 0 1 0 1 0 1 1 1 0 0 0 |
  0 1 2 3 4 5 6 7 8 9 10 11 12 13 14 15

| 1 0 0 1 1 0 0 0 0 1 1 1 1 0 0 0 |
  0 1 2 3 4 5 6 7 8 9 10 11 12 13 14 15
```

$$Z_n \leftarrow \sum_{m=0}^{M-1} X_{n+m} Y_m$$

$n = 0, 1, \ldots, N-1$

PARAMETER BLOCK CONTENTS

| WORD | NAME | CONTENTS |
|------|------|----------|
| 0 | — | Error mask. |
| 1 | — | Trap address. |
| 2 | N | Element count N used to compute length of source array X. |
| 3 | $Z_o$ INDEX | Index of complex o Z. |
| 4 | $X_0$ INDEX | Index of complex array X. |
| 5 | $Y_o$ INDEX | Index of complex array Y. |
| 7 | M | Element count M for source array Y. |
| 8 | — | Continuation register. |

FUNCTION—Computes the correlation product of the source arrays X and Y, and places the result in the destination array Z. The length of X is assumed to be $M+N-1$.

The sizes of the source arrays X and Y are limited by the condition that $2(M+N)-1$ is less than or equal to 1024.

Recursive Filter for Real Data
RFR $N_p, N_2$

```
| 1 1 1 0 0 0 1 0 1 0 1 1 1 0 0 0 |
  0 1 2 3 4 5 6 7 8 9 10 11 12 13 14 15

| 1 | $N_p$ | $N_z$ | 0 0 0 0 0 1 1 1 0 0 0 |
  0 1 2 3 4 5 6 7 8 9 10 11 12 13 14 15
```

$Z_n \leftarrow Q_{jD}$

For all j such that
$0 \leq jD \leq N-1$
given
$A_0 = 1$,
and $$Q_n = \sum_{k=0}^{N_p-1} A_k X_{n-k} - \sum_{l=1}^{N_z-1} B_l Q_{n-l}$$

$n = , 1, \ldots, N-1$

PARAMETER BLOCK CONTENTS

| WORD | NAME | CONTENTS |
|------|------|----------|
| 0 | — | Error mask. |
| 1 | — | Trap address. |
| 2 | N | Element count used to compute the length of source array X. |
| 3 | $Z_o$ INDEX | Index of real array Z. |
| 4 | $X_o$ INDEX | Index of real array X. |
| 7 | D | Desampling rate. |
| 8 | — | Continuation register. |

FUNCTION—Performs a filter function of the type specified by $N_p$ and $N_z$ on the input data in the source array X. $N_p$ is the number of poles of the filter, which must be 1 or 2. $N_z$ is the number of zeroes of the filter, which must be 0, 1, or 2. X must have $N + N_z$ elements. The output is placed in the destination array Z. The elements $Z-1$ and $Z-2$ must be available; thus Z actually contains $N+2$ elements. $Z-1$ and $Z-2$ may or may not be used as initial conditions, depending on the specified value of $N_p$ and $N_z$. However they must be allocated since they are used by the AP for temporary storage.

The sizes of the arrays are limited by the condition that $2N+N_z+N_p$ be less than or equal to 2048.

RFR destroys the contents of the step registers and the working registers. The equation above shows a temporary intermediate array Q. This array, included in the equation for clarity, has no physical representation in memory and is completely transparent to the user.

Several elements of AP scratchpad are used to store coefficients. The use of scratchpad is summarized in the table below.

The desampling rate D must be specified in the parameter block. D is a positive integer less than or equal to N.

| FILTER TYPE | | SCRATCHPAD ADDRESS | | | |
|---|---|---|---|---|---|
| $N_p$ | $N_z$ | 0 | 1 | 2 | 3 |
| 1 | 0 | $-B1$ | 0 | 0 | 0 |
| 1 | 1 | $-B1$ | 0 | A1 | 0 |
| 1 | 2 | $-B1$ | 0 | A1 | A2 |
| 2 | 0 | $-B1$ | $-B2$ | 0 | unused |
| 2 | 1 | $-B1$ | $-B2$ | A1 | unused |
| 2 | 2 | $-B1$ | $-B2$ | A1 | A2 |

Recursive Filter for Real Data
RFC $N_p, N_z$

```
| 1 1 1 0 0 0 1 0 1 0 1 1 1 0 0 0 |
  0 1 2 3 4 5 6 7 8 9 10 11 12 13 14 15

| 1 | $N_p$ | $N_z$ | 0 0 0 0 1 1 1 1 0 0 0 |
  0 1 2 3 4 5 6 7 8 9 10 11 12 13 14 15
```

$Z_n \leftarrow Q_{jD}$

For all j such that
$0 \leq jD \leq N-1$
given
$A_0 = 1$,
and $$Q_n = \sum_{k=0}^{N_p-1} A_k X_{n-k} - \sum_{l=1}^{N_z-1} B_l Q_{n-l}$$

$n = 0, 1, \ldots, N-1$

PARAMETER BLOCK CONTENTS

| WORD | NAME | CONTENTS |
|------|------|----------|
| 0 | — | Error mask. |
| 1 | — | Trap address. |
| 2 | N | Element count N used to compute the length of source array X. |
| 3 | $Z_o$ INDEX | Index of complex array Z. |

-continued

| | | |
|---|---|---|
| 4 | $X_o$ INDEX | Index of complex array X. |
| 7 | D | Desampling rate. |
| 8 | — | Continuation register. |

FUNCTION—Performs a filter function of the type specified by $N_9$ and $N_Z$ on the input data in the source array X. $N_p$ is the number of poles of the filter, which must be 1 or 2. $N_z$ is the number of zeroes of the filter, which must be 0,1, or 2. X must have $N+N_z$ elements. The output is placed in the destination array Z. The elements $Z-1$ and $Z-2$ must be available; thus Z actually contains $N+2$ elements. $Z-1$ and $Z-2$ may or may not be used as initial conditions, depending on the specified values of $N_p$ and $N_z$.
However they must be allocated since they are used by the AP for temporary storage.
Several elements of AP scratchpad are used to store coefficients. Each coefficient takes two elements of scratchpad, since they are complex numbers. The use of scratchpad is summarized in the table below.
The equation above shows a temporary array Q. This array, included in the equation for clarity, has no physical representation in memory and is completely transparent to the user.
The desampling rate D must be specified in the parameter block. D is a positive integer less than or equal to N.

The sizes of the arrays are limited by the condition that $2N+N_z+N_p$ be less than or equal to 1024.
RFC destroys the contents of the step registers and the working register.

| FILTER TYPE | | SCRATCHPAD ADDRESS | | | |
|---|---|---|---|---|---|
| $N_p$ | $N_z$ | 0,1 | 2,3 | 4,5 | 6,7 |
| 1 | 0 | $-B2$ | unused | unused | unused |
|   | 1 | A1 | $-B1$ | unused | unused |
|   | 2 | A1 | $-B1$ | A2 | unused |
| 2 | 0 | $-B2$ | $-B1$ | unused | unused |
|   | 1 | $-B2$ | $-B1$ | A1 | unused |
|   | 2 | $-B2$ | $-B1$ | A1 | A2 |

Integrate Real Array
INR

```
1 1 0 0 0 0 1 0 1 0 1 1 1 0 0 0
0 1 2 3 4 5 6 7 8 9 10 11 12 13 14 15
```

```
1 1 1 0 0 0 0 0 1 1 1 1 1 0 0 0
0 1 2 3 4 5 6 7 8 9 10 11 12 13 14 15
```

```
1 1 0 0 0 0 1 0 0 0 1 1 1 0 0 0
0 1 2 3 4 5 6 7 8 9 10 11 12 13 14 15
```

```
1 1 1 0 0 0 0 0 1 1 1 1 1 0 0 0
0 1 2 3 4 5 6 7 8 9 10 11 12 13 14 15
```

$$Z_{(n\ S_z)} \leftarrow \sum_{k=0}^{n} X_k S_x$$

$n = 0, 1, \ldots, N-1$

PARAMETER BLOCK CONTENTS

| WORD | NAME | CONTENTS |
|---|---|---|
| 0 | — | Error mask. |
| 1 | — | Trap address. |
| 2 | N | Element count. |
| 3 | $Z_o$ INDEX | Index of real array Z. |
| 4 | $X_o$ INDEX | Index of real array X. |
| 8* | — | Continuation register. |
| 9* | $S_z$ | Step value for array Z. |
| 10* | $S_x$ | Step value for array X. |

*INR only.

FUNCTION—Computes the integral of the source array X and places the result in destination array Z.

Fast Fourier Transform of Complex Array
FFTC

```
1 1 1 0 0 0 1 0 1 0 1 1 1 0 0 0
0 1 2 3 4 5 6 7 8 9 10 11 12 13 14 15
```

```
1 1 1 0 0 0 0 0 0 1 1 1 0 0 0
0 1 2 3 4 5 6 7 8 9 10 11 12 13 14 15
```

$$X_n \leftarrow \sum_{k=0}^{N-1} X_k \omega^{n-1}$$

$n = 0, 1, \ldots, N-1$
where
$\omega = e^{-2\pi i/N}$, for the foward transform,
$\omega = e^{2\pi i/N}$, for the inverse transform,
and
$i = \sqrt{-1}$

PARAMETER BLOCK CONTENTS

| WORD | NAME | CONTENTS |
|---|---|---|
| 0 | — | Error mask. |
| 1 | — | Trap address. |
| 2 | N | Element count: must be a power of 2 in the range [8, 1024]. |
| 4 | $X_o$ INDEX | Index of complex array X. |
| 8 | CONT REG | Continuation register: see table below. |

Continuation register:

| COV | CUD | 0 0 0 0 0 0 0 0 0 0 0 0 | TYPE |
|---|---|---|---|
| 0 | 1 | 2 3 4 5 6 7 8 9 10 11 12 13 | 14 15 |

| Bit | Name | Meaning when 1 |
|---|---|---|
| 0 | COV | Continue on overflow. |
| 1 | CUD | Continue on underflow. |
| 2-13 | | Reserved for future use. |
| 14,15 | FFT TYPE | Forward transform when bits = 01; Inverse transform when bits = 00. |

FUNCTION—Computes the discrete Fourier transform of the complex source array X. Either a forward or inverse transform may be calculated, depending on the value of bits 14 and 15 of the continuation register (parameter word 8). The result is returned to X in bit-reversed format. Thus the program will generally follow the FFTC with a bit-reversal instruction (SCB or BRC). The element count must be a power of 2.

Fast Fourier Transform of Real Array
FFTR

```
1 1 1 0 0 0 1 0 1 0 1 1 1 0 0 0
0 1 2 3 4 5 6 7 8 9 10 11 12 13 14 15
```

```
1 1 0 1 1 0 0 0 0 0 1 1 1 0 0 0
0 1 2 3 4 5 6 7 8 9 10 11 12 13 14 15
```

$X_n \leftarrow [*X_{N-n} + X_n + i\omega^n(*X_{N-n} - X_n)]$ $n = 0, 1, \ldots, N-1$ where $\omega = e^{-2\pi i/2N}$, for the forward transform,
$\omega = e^{2\pi i/2N}$, for the inverse transform,
$*X$ is the complex conjugate of X, and $i = \sqrt{-1}$

PARAMETER BLOCK CONTENTS

| WORD | NAME | CONTENTS |
|---|---|---|
| 0 | — | Error mask. |
| 1 | — | Trap address. |
| 2 | N | Element count: must be a power of 2 in the range [8, 1024]. |
| 4 | $X_o$ INDEX | Index of real array X. |
| 6 | TABLE ADDR | Address of cosine table (if N = 1024). |
| 8 | CONT REG | Continuation register: see table below. |

Continuation register:

| COV | CUD | 0 0 0 0 0 0 0 0 0 0 0 0 | TYPE |
|---|---|---|---|
| 0 | 1 | 2 3 4 5 6 7 8 9 10 11 12 13 | 14 15 |

| Bit | Name | Meaning when 1 |
|---|---|---|
| 0 | COV | Continue on overflow. |
| 1 | CUD | Continue on underflow. |
| 2-13 | | Reserved for future use. |
| 14,15 | FFT TYPE | For forward transform, bits = 01; For inverse transform, bits = 11. |

FUNCTION—Computes the discrete Fourier transform of the source data. For a forward transform, the source data must be the result of an FFTC instruction. For an inverse transform, the result data of FFTR must be processed by an FFTC instruction. The direction of the transform (forward or inverse) is determined by bits in the continuation register as described below.
This instruction takes advantage of a short cut in calculating the real FFT 2N real elements are interpreted as N complex elements and used in a complex FFT.
The element count in the parameter block must be N, the number of complex elements.
If a 2048 (real) point transform is to be performed, the program must supply a pointer (in parameter word 6) to a table of real scalars. The table may be anywhere in main memory. Each of the 511 scalars must have a value equal to $$\text{Cos}(2\pi n/2048)$$
$$n = 0, 1, \ldots, 511$$

Bit-reserve Indices of Complex Array
BRC

```
1 1 0 0 0 0 1 0 0 0 1 1 1 0 0 0
0 1 2 3 4 5 6 7 8 9 10 11 12 13 14 15
```

```
1 1 0 0 1 0 0 0 1 1 1 1 0 0 0
0 1 2 3 4 5 6 7 8 9 10 11 12 13 14 15
```

$X_{n'} \leftarrow X_n$ $n = 0, 1, \ldots, N-1$ where $n'$ = Bit reverse of n within $\log_2 N$ bits.

PARAMETER BLOCK CONTENTS

| WORD | NAME | CONTENTS |
|---|---|---|
| 0 | — | Error mask. |
| 1 | — | Trap address. |
| 2 | N | Element count: must be a power of 2 less than or equal to 1024. |
| 4 | $X_0$ INDEX | Index of complex array X. |

FUNCTION—Rearranges the elements of the array X such that their indices are bit-reversed with respect to their original contents. For example, if BRC were executed on a 16-element array, $X_1$, would be exchanged with $X_8$, since 1 ($0001_2$) is the bit-reverse of 8 ($1000_2$). Similarly, $X_2$ would be exchanged with $X_4$, etc.

Store Complex Array Bit-reversed
SCB

```
1 1 0 0 0 0 1 0 0 1 1 1 1 0 0 0
0 1 2 3 4 5 6 7 8 9 10 11 12 13 14 15
```

```
1 0 1 1 1 0 0 0 1 1 1 1 0 0 0
0 1 2 3 4 5 6 7 8 9 10 11 12 13 14 15
```

$M_{(n\ S_m)} \leftarrow X_{n'}$ $n = 0, 1, \ldots, N-1$ where $n'$ = Bit reverse of n within $\log_2 N$ bits.

PARAMETER BLOCK CONTENTS

| WORD | NAME | CONTENTS |
|---|---|---|
| 0 | — | Error mask. |
| 1 | — | Trap address. |
| 2 | N | Element count; must be a power of two less than or equal to 1024. |
| 3 | $X_o$ INDEX | Index of complex array X. |
| 6 | $M_o$ ADDR ADDR | Main memory address of complex array M. |
| 7 | $S_M$ | Step value for array M. |

FUNCTION—Copies the elements of the source array X to the destination array M with bit-reversed indexing. For example, with an element count of 16, $X_1$ would be moved to $M_8$, since 8 ($1000_2$) is the bit-reverse of 1 ($0001_2$). Similarly, $X_2$ would be moved to $M_4$. M may be anywhere in main memory.

4. Data Movement/Conversion Instructions

Data Movement/Conversion instructions may be used to move data from one memory location to another, or to convert data from one form to another. Examples of these instructions are:

Float and Load (Convert Integer to Real)
FLL

| 1 | 1 | 0 | 0 | 0 | 0 | 1 | 0 | 1 | 0 | 1 | 1 | 0 | 0 | 0 |
|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

| 1 | 1 | 1 | 1 | 0 | 0 | 0 | 0 | 1 | 1 | 1 | 1 | 0 | 0 | 0 |
|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

FLLP

| 1 | 1 | 0 | 0 | 0 | 0 | 1 | 0 | 0 | 1 | 1 | 1 | 0 | 0 | 0 |
|---|---|---|---|---|---|---|---|---|---|---|---|---|---|---|

| 1 | 1 | 1 | 1 | 0 | 0 | 0 | 0 | 1 | 1 | 1 | 1 | 0 | 0 | 0 |
|---|---|---|---|---|---|---|---|---|---|---|---|---|---|---|

$Z_{(n\ Sz)} \leftarrow M_{(n\ Sm)}$ n = 0, 1, ..., N−1

PARAMETER BLOCK CONTENTS

| WORD | NAME | CONTENTS |
|---|---|---|
| 0 | — | Error mask. |
| 1 | — | Trap address. |
| 2 | N | Element count. |
| 4 | $Z_o$ INDEX | Index of real array Z. |
| 6 | $M_o$ ADDR | Main memory address of integer array M. |
| 7 | $S_M$ | Step value for array M. |
| 10* | $S_Z$ | Step value for array Z. |

*FLL only.

FUNCTION—Converts the integers in the source array M to floating-point format, and places the results in the destination array Z. Note that Z will occupy twice as many words of memory as M. M may be anywhere in main memory.

Fix and Store (Convert Real to Integer)
FXS

| 1 | 1 | 0 | 0 | 0 | 0 | 1 | 0 | 1 | 0 | 1 | 1 | 1 | 0 | 0 | 0 |
|---|---|---|---|---|---|---|---|---|---|---|---|---|---|---|---|

| 1 | 1 | 1 | 1 | 0 | 0 | 0 | 0 | 1 | 1 | 1 | 1 | 0 | 0 | 0 |
|---|---|---|---|---|---|---|---|---|---|---|---|---|---|---|

FXSP

| 1 | 1 | 0 | 0 | 0 | 0 | 1 | 0 | 0 | 1 | 1 | 1 | 0 | 0 | 0 |
|---|---|---|---|---|---|---|---|---|---|---|---|---|---|---|

| 1 | 1 | 1 | 1 | 0 | 0 | 0 | 0 | 1 | 1 | 1 | 1 | 0 | 0 | 0 |
|---|---|---|---|---|---|---|---|---|---|---|---|---|---|---|

$M_{(n\ Sm)} \leftarrow X_{(n\ Sx)}$ n = 0, 1, ..., N−1

PARAMETER BLOCK CONTENTS

| WORD | NAME | CONTENTS |
|---|---|---|
| 0 | — | Error mask. |
| 1 | — | Trap address. |
| 2 | N | Element count. |
| 3 | $X_o$ INDEX | Index of real array X. |
| 6 | $M_o$ ADDR | Main memory address of integer array M. |
| 7 | $S_M$ | Step value for array M. |
| 9* | $S_X$ | Step value for array X. |

*FXS only.

FUNCTION—Converts the elements of the real source array X to integers, and stores them in the destination array M. Note that M may be anywhere in main memory.

Load Scratchpad Registers
LSR

| 1 | 1 | 0 | 0 | 0 | 1 | 0 | 0 | 1 | 1 | 1 | 1 | 0 | 0 | 0 |
|---|---|---|---|---|---|---|---|---|---|---|---|---|---|---|

| 1 | 0 | 0 | 1 | 0 | 0 | 0 | 0 | 1 | 1 | 1 | 1 | 0 | 0 | 0 |
|---|---|---|---|---|---|---|---|---|---|---|---|---|---|---|

$P_{i+n} \leftarrow M_{(n\ Sm)}$ n = 0, 1, ..., N−1

PARAMETER BLOCK CONTENTS

| WORD | NAME | CONTENTS |
|---|---|---|
| 0 | — | Error mask. |
| 1 | — | Trap address. |
| 2 | N | Element count. |
| 3 | $P_i$ ADDR | Scratchpad address of first element to load. |
| 6 | $M_o$ ADDR | Main memory address of integer array M. |
| 7 | $S_M$ | Step value for array M. |

FUNCTION—Loads the specified group of scratchpad registers from the source array M. M may be anywhere in main memory. Note that two words of memory are required for each scratchpad register.

This instruction destroys the contents of the working register. Locations $34_8$–$37_8$ of scratchpad are reserved by hardware for use during interrupts.

Store Scratchpad Registers
SSR

| 1 | 1 | 0 | 0 | 0 | 0 | 1 | 0 | 0 | 1 | 1 | 1 | 0 | 0 | 0 |
|---|---|---|---|---|---|---|---|---|---|---|---|---|---|---|

| 1 | 0 | 0 | 1 | 1 | 0 | 0 | 0 | 1 | 1 | 1 | 1 | 0 | 0 | 0 |
|---|---|---|---|---|---|---|---|---|---|---|---|---|---|---|

$M_{(n\ Sm)} \leftarrow P_{i+n}$ n = 0, 1, ..., N−1

PARAMETER BLOCK CONTENTS

-continued

| WORD | NAME | CONTENTS |
|------|------|----------|
| 0 | — | Error mask. |
| 1 | — | Trap address. |
| 2 | N | Element count. |
| 3 | $P_i$ ADDR | Scratchpad address of first register to store. |
| 6 | $M_o$ ADDR | Main memory address of integer array M. |

FUNCTION—Stores the specified group of scratchpad registers into the destination array M. M may be anywhere in main memory. Note that two words of memory are required for each scratchpad register.

Store Real Scalar from Working Register
SRW

```
1 1 0 0 0 0 1 0 0 1 1 1 1 0 0 0
0 1 2 3 4 5 6 7 8 9 10 11 12 13 14 15
```

```
1 0 1 0 0 0 0 0 1 1 1 1 1 0 0 0
0 1 2 3 4 5 6 7 8 9 10 11 12 13 14 15
```

M ⟵ W

| PARAMETER BLOCK CONTENTS | | |
|------|------|----------|
| WORD | NAME | CONTENTS |
| 6 | W ADDR | Address at which to store scalar. |

FUNCTION—Places the real scalar contained in the working register in two words of main memory at the specified address.

Store Complex Scalar from Working Register
SCW

```
1 1 0 0 0 0 1 0 0 1 1 1 1 0 0 0
0 1 2 3 4 5 6 7 8 9 10 11 12 13 14 15
```

```
1 0 1 0 1 0 0 0 1 1 1 1 1 0 0 0
0 1 2 3 4 5 6 7 8 9 10 11 12 13 14 15
```

M ⟵ W

| PARAMETER BLOCK CONTENTS | | |
|------|------|----------|
| WORD | NAME | CONTENTS |
| 6 | W ADDR | Address at which to store scalar. |

FUNCTION—Places the complex scalar contained in the working register in four words of main memory starting at the specified address.

Load Real Array
LDR

```
1 1 0 0 0 0 0 1 0 1 0 1 1 1 0 0 0
0 1 2 3 4 5 6 7 8 9 10 11 12 13 14 15
```

```
1 0 0 0 0 0 0 1 1 1 1 1 0 0 0
0 1 2 3 4 5 6 7 8 9 10 11 12 13 14 15
```

LDRP

```
1 1 0 0 0 0 1 0 0 1 1 1 1 0 0 0
0 1 2 3 4 5 6 7 8 9 10 11 12 13 14 15
```

```
1 0 0 0 0 0 0 1 1 1 1 1 0 0 0
0 1 2 3 4 5 6 7 8 9 10 11 12 13 14 15
```

$Z_{(n\,Sz)} \longleftarrow M_{(n\,Sm)}$ $n = 0, 1, \ldots, N-1$

| PARAMETER BLOCK CONTENTS | | |
|------|------|----------|
| WORD | NAME | CONTENTS |
| 0 | — | Error mask. |
| 1 | — | Trap address. |
| 2 | N | Element count. |
| 4 | $Z_o$ INDEX | Index of real array Z. |
| 6 | $M_o$ ADDR | Main memory address of real array Z. |
| 7 | $S_M$ | Step value for array M. |
| 10* | $S_Z$ | Step value for array Z. |

*LDR only.

FUNCTION—Copies the source array X to the destination array Z. X may be anywhere in main memory.

Load Complex Array
LDC

```
1 1 0 0 0 1 0 1 0 1 1 1 0 0 0
0 1 2 3 4 5 6 7 8 9 10 11 12 13 14 15
```

```
1 0 0 0 0 0 0 0 0 1 1 1 0 0 0
0 1 2 3 4 5 6 7 8 9 10 11 12 13 14 15
```

LDCP

```
1 1 0 0 0 1 0 0 1 1 1 0 0 0
0 1 2 3 4 5 6 7 8 9 10 11 12 13 14 15
```

```
1 0 0 0 0 0 0 0 0 1 1 1 0 0 0
0 1 2 3 4 5 6 7 8 9 10 11 12 13 14 15
```

$Z_{(n\,Sz)} \longleftarrow M_{(n\,Sm)}$ $n = 0, 1, \ldots, N-1$

| PARAMETER BLOCK CONTENTS | | |
|------|------|----------|
| WORD | NAME | CONTENTS |
| 0 | — | Error mask. |
| 1 | — | Trap address. |
| 2 | N | Element count. |
| 4 | $Z_o$ INDEX | Index of real array Z. |
| 6 | $M_o$ ADDR | Main memory address of complex array M. |
| 7 | $S_M$ | Step value for array M. |

FUNCTION—Copies the source array M to the destination array Z. M may be anywhere in main memory.

Store Real Array
STR

| 1 | 1 | 0 | 0 | 0 | 0 | 1 | 0 | 1 | 0 | 1 | 1 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

| 1 | 0 | 0 | 0 | 1 | 0 | 0 | 0 | 1 | 1 | 1 | 1 | 0 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

STRP

| 1 | 1 | 0 | 0 | 0 | 0 | 1 | 0 | 0 | 1 | 1 | 1 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

| 1 | 0 | 0 | 0 | 1 | 0 | 0 | 0 | 1 | 1 | 1 | 1 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

$M_{(n\ Sm)} \leftarrow X_{(n\ Sx)}$ $n = 0, 1, \ldots, N-1$

| PARAMETER BLOCK CONTENTS | | |
|---|---|---|
| WORD | NAME | CONTENTS |
| 0 | — | Error mask. |
| 1 | — | Trap address. |
| 2 | N | Element count. |
| 3 | $X_0$ INDEX | Index of real array X. |
| 6 | $M_0$ ADDR | Main memory address of real array M. |
| 7 | $S_M$ | Step value for array M. |
| 9* | $S_X$ | Step value for array X. |

*STR only.

FUNCTION—Copies the source array X to the destination array M. M may be anywhere in main memory.

Store Complex Array
STC

| 1 | 1 | 1 | 0 | 0 | 0 | 1 | 0 | 1 | 0 | 1 | 1 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

| 1 | 0 | 0 | 0 | 1 | 0 | 0 | 0 | 0 | 0 | 1 | 1 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

STCP

| 1 | 1 | 1 | 0 | 0 | 0 | 1 | 0 | 0 | 1 | 1 | 1 | 0 | 0 | 0 |
|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 |

| 1 | 0 | 0 | 0 | 1 | 0 | 0 | 0 | 0 | 1 | 1 | 1 | 0 | 0 | 0 |
|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 |

$M_{(n\ Sm)} \leftarrow X_{(n\ Sx)}$ $n = 0, 1, \ldots, N-1$

| PARAMETER BLOCK CONTENTS | | |
|---|---|---|
| WORD | NAME | CONTENTS |
| 0 | — | Error mask. |
| 1 | — | Trap address. |
| 2 | N | Element count. |
| 3 | $X_0$ INDEX | Index of real array X. |
| 6 | $M_0$ ADDR | Main memory address of complex array M. |
| 7 | $S_M$ | Step value for array M. |
| 9* | $S_X$ | Step value for array X. |

*STC only.

FUNCTION—Copies the source array X to the destination array M. M may be anywhere in main memory.

Create a Real Array
CRE

| 1 | 1 | 0 | 0 | 0 | 0 | 1 | 0 | 1 | 0 | 1 | 1 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

| 1 | 1 | 0 | 1 | 0 | 0 | 0 | 0 | 1 | 1 | 1 | 1 | 0 | 0 | 0 |
|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 |

CREP

| 1 | 1 | 0 | 0 | 0 | 0 | 1 | 0 | 0 | 1 | 1 | 1 | 0 | 0 | 0 |
|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 |

$Z_{(n-1)Sz} \leftarrow X_{(Mn)}$ $n = 1, 2, \ldots, N$ where $N = M_0$

| PARAMETER BLOCK CONTENTS | | |
|---|---|---|
| WORD | NAME | CONTENTS |
| 0 | — | Error mask. |
| 1 | — | Trap address. |
| 3 | $Z_0$ INDEX | Index of real array Z. |
| 4 | $X_0$ INDEX | Index of real array X. |
| 6 | $M_0$ ADDR | Main memory address of integer array M. |
| 9* | $S_Z$ | Step value for array Z. |

*CRE only.

FUNCTION—creates a real array Z by loading it with elements of the source array X as selected by the indices in the integer array M. The 0th word of M contains its length. Note that M may be anywhere in main memory.

Modify Real Array
MOD

| 1 | 1 | 0 | 0 | 0 | 0 | 1 | 0 | 1 | 0 | 1 | 1 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

```
 1 1 0 1 1 0 0 0 1 1 1 1 1 0 0 0
 0  1  2  3  4  5  6  7  8  9 10 11 12 13 14 15
```
MODP

```
 1 1 0 0 0 0 1 0 0 1 1 1 1 0 0 0
 0  1  2  3  4  5  6  7  8  9 10 11 12 13 14 15
```

```
 1 1 0 1 1 0 0 0 1 1 1 1 1 0 0 0
 0  1  2  3  4  5  6  7  8  9 10 11 12 13 14 15
```

$Z_{(Mn)} \leftarrow X_{(n-1)Sx}$ $n = 1, 2, \ldots N$ where $N = M_o$

PARAMETER BLOCK CONTENTS

| WORD | NAME | CONTENTS |
|------|------|----------|
| 0 | — | Error mask. |
| 1 | — | Trap address. |
| 3 | $Z_o$ INDEX | Index of real array Z. |
| 4 | $X_o$ INDEX | Index of real array X. |
| 6 | $M_o$ ADDR | Main memory address of integer array M. |
| 10* | $S_X$ | Step value for array X. |

*MOD only.

FUNCTION—Modifies the real array Z by taking elements of the source array X and placing them in Z at locations selected by elements of the integer array M. The 0th word of M contains its length. M may be anywhere in main memory.

In summary, the four classes of ASP 100 array processing macroinstructions described above allow APS 100 to efficiently execute array processing operations. Scalar macroinstructions are used to execute operations involving a scalar and an array, while array macroinstructions are used to execute operations involving two arrays and certain operations (e.g., search for maximum element) on one array. Signal prpocessing macroinstructions are provided to execute signal processing operations such as convolution, correlation, digital filtering, and Fast Fourier Transforms. Finally, data movement/conversion macroinstructions allow data to be transferred from one memory location to another (e.g., within MEM 104' or between MEM 104' and MEM 104) or to be converted from one form to another. The above set of macroinstructions is intended to be illustrative and not restrictive. Other embodiments may employ more, fewer, or different macroinstructions, depending upon functional requirements (e.g., in a special purpose processor). Similarly, a single macroinstruction function may be divided into two or more macroinstructions or two or more macroinstructions may be combined and their functions executed by a single macroinstruction.

Having described operation of APS 100, including CPU 102 and AP 108, use of parameter blocks in executing array processing macroinstructions, and presented examples of certain array processing macroinstructions, operation of AP 108 will be described next on a block diagram level.

B. Array Processor 108 (FIGS. 4–7A)

Array Processor (AP) 108 has been described above as part of Array Processor System (APS) 100. The following discussion will present a more detailed discussion of AP 108. AP 108 will be described first on block diagram basis. Data Transfer Unit (DTU) 110, Multiplier Unit (MU) 112, and Add/Subtract/Compare (ASC) 114 will then be described individually, again on block diagram level. During these individual descriptions, certain portions of DTU 110, MU 112, and ASC 114 will be described in yet greater detail.

1. AP 108 (FIG. 4)

Referring to FIG. 4, a block diagram of AP 108 is shown. Major units of AP 108 are DTU 110, MU 112, and ASC 114, whose operation will be described in the order named.

Referring first to DTU 110, the primary function of DTU 110 is to store array data to be operated upon by AP 108 and to provide a path for exchange of data between AP 108 and CPU 102 or MEM 104. In this regard, DATA RAM 422 (e.g., a Random Access Memory having a capacity of 4,096 16 bit words) comprises dual port memory MEM 104' previously referred to.

As previously discussed, data may be exchanged between MEM 104' and, e.g., MEM 104 or CPU 102, through MEM BUS 118 and PA BUS 116 (i.e., first MEM 104' port). Array data is written into DATA RAM 422 by placing a 20 bit memory write address, referring to a physical address in DATA RAM 422, on PA BUS 116. The physical address is transferred into Data Addressing and Transfer Control device (DATC) 420 through Physical Address Transfer Control (PATC) Bus 418. DATC 420 decodes physical address to provide both a 10 bit address into the DATA RAM 422 through BUS 4521, and data transfer control signals to Data Transfer Logic (DTL) 402 through BUS 406. DTL 402 is effectively a multiplexer for routing the flow of data between MEM BUS 118, DATA RAM 422 data input, DATA RAM 422 data output, and Array Processor Data Bus (APDB) BUS 124 (described further below). Array data to be written into DATA RAM 422 is then transferred, 16 bits at a time, from MEM BUS 118 to the data input port of DATA RAM 422 through Memory Bus Data Transfer (MBDT) BUS 404, DTL 402, and Data RAM Input (DRI) BUS 412.

Data may be read from DATA RAM 422 to MEM BUS 118 by placing a DATA RAM 422 read address on PA BUS 116. DATC 420 decodes the read address for DATA RAM 422 and provides a corresponding read address input to DATA RAM 422. 64 bits of data are read from DATA RAM 422 data output to Memory Output Multiplexer (MOM) 426 through Memory Output (MO) BUS 424. MOM 426, which is provided with control signals from DATC 420 through BUS 432, in part controls the transfer of data between the data output of DATA RAM 422 and APDB BUS 124 (discussed below) or DTL 402. In the present case, MOM 426 transfers data, 16 bits at a time, from MO BUS 424 to an input of DTL 402 through BUS 410. DTL 402, directed by control signals from DATC 420, transfers data read from DATA RAM 422 to MEM BUS 118 through MBDT BUS 404.

Having described the transfer of data between MEM 104' and MEM BUS 118 (i.e., first MEM 104' port), the transfer of data between MEM 104' and APDB BUS 124 (i.e, second MEM 104' port) will be discussed next. As previously described, each array processing macroinstruction is accompanied by a parameter block containing information pertinent to execution of that macroinstruction. Portions of parameter block information are read from MEM 104 through MEM BUS 118 and stored in AP 108, e.g., for use in reading and writing array element data from and to DATA RAM 422 during execution of a macroinstruction. In general, parameter block information used in AP 108 is read from MEM BUS 118 through Memory Bus/Parameter Block (MBPB) BUS 436 and stored in Parameter Block Logic (PBL) 438 (in MU112). Parameter block information stored in PBL 438 is then manipulated during macroinstruction execution to generate DATA RAM 422 read/write addresses for reading and writing array elements from and to DATA RAM 422 during macroinstruction execution. This operation is generally controlled by microinstruction control signals (discussed further below) derived from sequences of 76 bit microinstruction words provided to AP 108 from Interface 106 during macroinstruction execution.

Array element read/write addresses are provided to DATC 420 from PBL 438 through 12 bit Address Register Input (ARI) BUS 434. Array elements read from DATA RAM 422 are transferred to MU 112 and ASC 114 for processing, and resulting array elements transferred from MU 112 and ASC 114 to DATA RAM 422, through APDB BUS 124 (e.g., a 4×16 bit bus). Transfer of array element data to and from DATA RAM 422 through APDB BUS 124 is controlled through read/write addresses provided to DATC 420 from PBL 438, as described above. In reading information from DATA RAM 422, DATC 420 decodes read addresses appearing on ARI BUS 434 to provide corresponding read addresses to DATA RAM 422 and control signals to MOM 426 through BUS 432. Requested data is provided, 64 bits (four 16 bit words) at a time, to MOM 426 from DATA RAM 422 data output through MO BUS 424. MOM 426 then transfers requested data through Memory Output Multiplexer Output (MOMO) BUS 429 to APDB BUS 124, where the data is available to MU 112 and ASC 114. This transfer may occur 64 bits (four 16 bit words) at a time, e.g., for complex array elements, or 32 bits (two 16 bit words) at a time, e.g., for real array elements.

As discussed further below, data to be written into DATA RAM 422 is placed on APDB BUS 124 through ASC 114 and provided to an input of DTL 402 through APDB Output (APDBO) BUS 408. Again, this data may comprise 32 bits for a real array element or 64 bits for a complex array element. Concurrently, a DATA RAM 422 write address is provided to DATC 420 by PBL 438. DATC 420 then provides write address inputs to DATA RAM 422 and control signals to DTL 402.

Data is transferred through DTL 402 to the data input of DATA RAM 422, 16 bits at a time, through DRI BUS 412.

PBL 438 may also provide MEM 104' read/write addresses for the transfer of data between DATA RAM 422 and MEM BUS 118. With the exception of the source of read/write address, such data transfer operation is similar to that described above occurring under control of CPU 102.

In summary, as previously described, MEM 104' in DTU 110 comprises a dual port memory having a first port to CPU 102 and MEM 104 and a second port to MU 112 and ASC 114. In this regard, MEM 104' may operate in any of four different modes. In first mode, operating under control of CPU 102, DATA RAM 422 operates as a 4,096 word by 16 bit memory. Data is transferred between DATA RAM 422 and MEM BUS 118 16 bits (or one word) at a time. Thus, the transfer of a real array element requires two memory cycles to transfer 32 bits (or two words) comprising a real array element. Four memory cycles are required to transfer 64 bits (four words) comprising a complex array element. In the second, third, and fourth modes of operation, MEM 104' operates under microinstruction word control, i.e., read and write addresses are provided from PBL 438. In the second mode, 64 bits of data (four 16 bit words) are transferred between DATA RAM 422 and APDB BUS 124 during each memory cycle. In the second mode, DATA RAM 422 operates in a 1,024 word by 64 bit configuration. Mode 2 is used, e.g., for transfer of complex scalar elements. In the third mode, 32 bits of data are transferred between DATA RAM 422 and APDB BUS 124 during each memory cycle. In the third mode, DATA RAM 422 operates in a 2,048 word by 32 bit configuration. The third mode is used, e.g., for the transfer of real array elements. In the fourth mode, 16 bits of data (one word) are transferred between DATA RAM 422 and MEM BUS 118 during each memory cycle. In the fourth mode, DATA RAM 422 operates in a 4,096 word by 16 bit configuration. The fourth mode is used to transfer data between MEM 104' and CPU 102 or MEM 104 under control of microinstructions provided to AP 108 from Interface 106.

Data may be written into or read from DATA RAM 422 by MEM 104 or CPU 102 during the execution of a microinstruction, when data is being transferred between DATA RAM 422 and Mu 112 or ASC 114. Similarly, MU 112 and ASC 114 may read data from or write data into DATA RAM 422 (e.g., while executing a microinstruction) while data is being transferred between DATA RAM 422 and CPU 102 or MEM 104. The sole restriction on data transfer through MEM 104', other than ensuring data integrity, is that CPU 102 or MEM 104 cannot access DATA RAM 422 simultaneously with MU 112 or ASC 114. A MEM 104' data transfer initiated by CPU 102 (Mode 1) takes precedence over a microinstruction initiated transfer (Modes 2, 3, and 4.) In such cases, the microinstruction is extended until completion of the CPU 102 initiated data transfer.

Data may also be written into or read from Working Register (WREG) 414 (e.g., a 64 bit storage register) through MEM BUS 118 or APDB BUS 124. In writing data into WREG 414 from MEM BUS 118, a physical address on the PA BUS 116 identifies WREG 414 to receive array data. DATC 420 decodes the WREG 414 physical address from PA BUS 116 and provides corresponding control signals to DTL 402. Data is then transferred, again 16 bits at a time, from MEM BUS 118 to WREG 414 through MBDT BUS 404, DTL 402, and DRI BUS 412.

Data stored in WREG 414 may be similarly read onto MEM BUS 118 when a WREG 414 read address appears on PA BUS 116. The 64 bits of data stored in WREG 414 are provided to MOM 426 through Wording Register Output (WRO) BUS 416. MOM 426 and DTL 402, under direction of control signals from DATC 420, then transfer the WREG 414 contents, 16 bits at a time, to MEM BUS 118.

In a like manner, data stored in WREG 414 may be provided to MU 112 and ASC 114 through APDB BUS 124, or data may be transferred into WREG 414 from ASC 114. In this case, addresses provided to DATC 420 from PBL 438 indicate WREG 414 as the data source or destination.

WREG 414 thereby provides an alternate data path between MEM BUS 118 and APDB BUS 124, i.e., in addition to the data path through DATA RAM 422. WREG 414 may also be used to store, e.g., real or complex scalars for use in multiplying an array by a scalar.

In addition to the above data storage operations, MEM 104' may include COS/SINE TABLE 428, containing, as previously described, trignometric tables for use, i.e., in performing Fast Fourier Transforms. COS/SINE TABLE 428 may be a Read Only Memory (ROM). Trignometric functions are read from COS/SINE TABLE 428 through TABLE OUTPUT (TO) BUS 430 and transferred onto APDB BUS 124. under control of COS/SINE TABLE 428 read addresses provided to DATC 420 from PBL 438. DATC 420 provides read addresses to COS/SINE TABLE 428 through BUS 427 and control signals to MOM 426 through BUS 432.

Referring to MU 112, the operation of PBL 438 has been discussed above with regard to the operation of MEM 104', and will be discussed further below with regard to ASC 114. High Speed Multiplier (HSM) 440 may be a floating point hexadecimal multiplier. A multiplier and a multiplicand are read from DATA RAM 422 and provided to the HSM 440 input through APDB BUS 124 and Mulitiplier Input (MI) BUS 442. Each multiplier or multiplicand may be a hexadecimal number containing either 32 bits (a real scalar array element) or 64 bits (a complex scalar array element). HSM 440 may then provide a 32 bit normalized, hexadecimal result output on Multiply Result (MR) BUS 444. The output of HSM 440 may be transferred directly onto APDB BUS 424 through ASC Multiplexer (MUX) 464. This allows a multiply result to be transferred directly back into DATA RAM 422, e.g., when multiplying an array by a scalar. The HSM 440 multiply result output may also be transferred into ASC Register (ASCR) 454 for subsequent add/subtract/compare operations, discussed further below.

Referring to ASC 114, data to be used in add, subtract, or compare operations may be transferred into ASCR 454 through APDB BUS 124 and ASC Register Input (ASCRI) BUS 452. As described above, HSM 440 multiply result outputs may be transferred into ASCR 454 through MR BUS 444. Data stored in ASCR 454 is then transferred into ASC Arithmetic Logic (ASCAL) 458 through Arithmetic Logic Input (ALI) BUS 456. ASCAL 458 then executes an add, subtract, or compare operation. The result appears as a 32 bit normalized hexadecimal number on Arithmetic Logic Output (ALO) BUS 460. ASCAL 458 result output may then be transferred into DATA RAM 422 through ASC MUX 464 and APDB BUS 124. Alternately, when reiterative arithmetic operations are to be executed, ASCAL 458 result output may be transferred into ASCR 454 through Reiterative Arithmetic Feedback (RAF) BUS 462.

ASC 114 may also contain high speed Constant Random Access Memory (CRAM) 448. CRAM 448 may have a capacity of thirty-two 32 bit words. CRAM 448 may be used to store, e.g., constants, the state of AP 108 during an interrupt, or the intermediate results of array processing operations. Data is transferred into CRAM 448 from APDB BUS 124 through CRAM Input (CRAMI) BUS 446, and is transferred from CRAM 448 to APDB BUS 124 through CRAM Output (CRAMO) BUS 450 and ASC MUX 464. Storage read/write locations within CRAM 448 are selected by addresses provided from PBL 438 through ARI BUS 434.

Turning to microinstruction control of AP 108, as previously discussed, Interface 106 contains the Interface Structure portion of Sector 2 of APS 100 Microinstruction Memory. Interface 106, operating under direction of control signals exchanged between Interface 106 and CPU 102, provides microinstruction control signals to AP 108 to control the operation of AP 108. Referring to FIG. 1, signals $\overline{\text{RBUF 35-37}}$, $\overline{\text{RA 0-9}}$, $\overline{\text{XRAD-1}}$ and $\overline{\text{EXT.COND}}$ represent control signals interchanged between CPU 102 and Interface 106. These control signals and their operation are discussed in Gruner, U.S. Pat. No. 4,104,720 and Pandeya, U.S. Pat. No. 4,071,890 (previously incorporated herein by reference). As described in the above incorporated patents, Interface 106 may be physically located in CPU 102, or in AP 108, or may be physically separate from either. In the present embodiment, referring to FIG. 4, Interface 106 is incorporated into AP 108 as MEM 104' Control Store (MEMCS) 106b, MU Control Store (MUCS) 106c, ASC Control Store (ASCCS) 106d, and AP 108 Clock Generator (APCG) 106a. MEMCS 106b, MUCS 106c, and ASCCS 106d, respectively, contain those portions of APS 100 Microinstruction Memory Sector 2 Interface Structure pertaining, respectively, to the control of MEM 104', MU 112, and ASC 114. Turning first to APCG 106a, clock signals are provided to APCG 106a from CPU 102. These signals, as described in the above incorporated patents, may include System Clock (SYSCLK), MSIN, and STOP CPU, APCG 106a derives clock signals MEMCLK, MUCLK, and ASCCLK to, respectively, MEM 104′, MU 112, and ASC 114, from SYSCLK. The three AP 108 clocks are synchronous with each other and with SYSCLK, so that AP 108 operates synchronously with CPU 102 and the remainder of APS 100.

Control signals previously referred to as exchanged between CPU 102 and Interface 106, indicated in FIG. 4 as CPU/INT CNTL SIGNALS, are provided to and from inputs and outputs of MEMCS 106b. MEMCS 106b, in part, utilizes these control signals from CPU 102 as address selection signals to the portion of Microinstruction Memory Sector 2 Interface Structure contained therein. The portion of interface structure microinstruction memory contained in MEMCS 106b then provides, as discussed further below, micro-instruction control signals to MEM 104′ to control the operation thereof. MEMCS 106b also provides array processor microinstruction control signals (APMS), e.g., enable and address signals, to MUCS 106c and ASCCS 106d. MUCS 106c and ASCCS 106d in turn provide microinstruction control signals to MU 112 and ASC 114. The MEMCS 106b, MUCS 106c, and ASCCS 106d portions of Microinstruction Memory Sector 2 Interface Structure may each be 1,024 words long (length of Sector 2 of APS 100 Microinstruction Memory). The width of microinstruction memory contained in MEMCS 106b, MUCS 106c, and ASCCS 106d is dependent upon the functions performed in the respective portions of AP 108.

The overall block diagram description of AP 108 operation is hereby concluded. Next, the operation of MEM 104′, MU 112, and ASC 114 will be described individually on a more detailed block diagram level. These individual descriptions will not repeat the AP 108 overall operational features described above, but will concern further more detailed operational features of these portions of AP 108. During these discussions, certain portions of AP 108, e.g., HMS 440, will be described in yet further detail (e.g., to the schematic diagram level) to aid in understanding the operation of the present invention.

2. Data Transfer Unit 110 (FIG. 5)

Referring to FIG. 5, a block diagram of DTU 110 is shown. Referring first to DTL 402, as previously discussed, 16 bit words may be written into DATA RAM 422 from MEM BUS 118 through MBDT BUS 404 and DTL 402. Memory Bus Words (MEMWORD) written under the control of CPU 102 are transferred directly into CPU Word Store (CPU WS) 520. MEMWORDs written under microinstruction control are written into PLB Word Store PLB (WS) 522 through Gated Driver 519 when Driver 519 is enabled by microinstruction control. As previously discussed, a DATA RAM 422 read/write operation initiated by CPU 102 takes precedence over a read/write operation initiated by microinstruction control. In such cases, microinstruction operation is extended until completion of the CPU 102 read/write operation. PLB WS 522 is provided to temporarily store MEMWORDs to be written under microinstruction control when a microinstruction control read/write operation is interrupted by a CPU 102 read/write operation. MEMWORDs are selectively transferred, depending on whether a DATA RAM 422 write operation is controlled from CPU 102 or from microinstruction control, to an input of DTL D MUX 524. Depending upon a DATA RAM 422 write address selected by DATC 420, and control signals provided to DTL 402, a MEMWORD may then be transferred into DATA RAM 422 16 bit Data Input Z. Alternately, a MEMWORD may be transferred from The DTL B MUX 524 output to inputs of DTL B MUX 528 or DTL C MUX 526. From these MUXs, a MEMWORD may be transferred into DATA RAM 422 16 bit Data Inputs X or Y. If the MEMWORD is to be written into DATA RAM 422 16 bit Data Input W, the MEMWORD is transferred from the DTL D MUX 524 output, through DTL C MUX 526, to an input of DTL A MUX 530; the MEMWORD is then transferred through DTL A MUX 530 to DATA RAM 422 Data Input W.

Also as previously described, 32 or 64 bit words may be written into DATA RAM 422 from APDB 124. APDB 124 is shown in FIG. 5 as four parallel 16 bit busses (124A, 124B, 124C, and 124D). When 64 bit words are being transferred between DTU 110 and MU 112 or ASC 114, all four APDB 16 bit busses are required to execute the transfer. During the following discussions, a 64 bit word will be referred to as consisting of four 16 bit words (A, B, C, and D). Word A will comprise Bits 0 to 15 of the 64 bit word and will appear on APDB BUS 124A. Similarly, Words B, C, and D will comprise, respectively, Bits 16 to 31, 32 to 47, and 48 to 63, and will appear, respectively, on busses APDB 124B, 124C, and 124D. When a 32 bit data word is exchanged between DTU 110 and MU 112 or ASC 114, only two of four 16 bit APDB busses are required to execute the transfer. Thirty-two bit words are written from ASC 114 to DATA RAM 422 through APDB busses 124C and 124D. In the following discussions, a 32 bit word written into DATA RAM 422 will be referred to as consisting of Word E (Bits 0 to 15) and Word F (Bits 16 to 31) appearing, respectively, on APDB busses 124C and 124D. Thirty-two bit words are read from DATA RAM 422 to MU 112 or ASC 114 on busses APDB 124A and 124B. In the following discussions, a 32 bit word read from DATA RAM 422 will be referred to as consisting of Word G (Bits 0 to 15) and Word H (Bits 16 to 31) appearing, respectively, on APDB busses 124A and 124B.

In writing a 64 bit word into DATA RAM 422, Words A to D from ASC 114 appear in parallel on APDB busses 124A to 124D. Words A to D are transferred to inputs of, respectively, DTL A MUX 530, DTL B MUX 528, DTL C MUX 526, and DTL D MUX 524. Words A to D are then transferred in parallel through DTL MUXs 530, 528, 526, and 524 to, respectively, Data Inputs W, X, Y, and Z of Data RAM 422.

In writing a 32 bit word into DATA RAM 422, Words E and F from ASC 114 appear in parallel on APDB busses 124C and 124D. Words E and F are transferred, respectively, to inputs of DTL C MUX 526 and DTL D MUX 524. Depending upon control signals provided from DATC 420, Words E and F may then be transferred to Data Inputs Y and Z of DATA RAM 422. Alternately, Word E may be routed through DTL C MUX 526 to an input of DTL A MUX 530 and Word F may be routed through DTL D MUX 524 to an input of DTL B MUX 528. Words E and F may then be transferred through DTL A MUX 530 and DTL B MUX 528, respectively, to Data Inputs W and X of DATA RAM 422.

Having described writing of data words from MEM BUS 118 and APDB BUS 124 into DATA RAM 422, the reading of data from DATA RAM 422 to MEM BUS 118 or APDB BUS 124 will be described next. In this regard, a DATA RAM 422 read operation results in four 16 bit words (64 bits of data) appearing at DATA RAM 422 Data Outputs W, X, Y, and Z. In the following discussions, DATA RAM 422 output will be considered as consisting of four 16 bits words W, X, Y, and Z appearing, respectively, at Data Outputs W, X, Y, and Z. Word W consists of Bits 0 to 15 of the 64 bit word. Likewise, Words X, Y, and Z consist of, respectively, Bits 16 to 31, Bits 32 to 47, and Bits 48 to 63.

As previously discussed, 16 bit words may be read from DATA RAM 422 to MEM BUS 118. Words W, X, Y, and Z appearing at DATA RAM 422 Data Outputs are transferred through MO BUS 424 to inputs of MOMA 536. Control signals from DATC 420 then enable MOMA 536 to select one of Words W, X, Y, Z and transfer the selected word through BUS 410, Driver 518, and MBDT BUS 404 to MEM BUS 118. A 32 bit word may be read onto MEM BUS 118 by executing two successive single word transfers, e.g., Word W followed by Word X or Word Y followed by Word Z. Similarly, a 64 bit word may be transferred by executing four successive single word transfers, e.g., Words W, X, Y, and Z.

As also discussed previously, data may also be read from DATA RAM 422 to APDB BUS 124. In transferring a 64 bit word, Words W, X, Y, and Z from DATA RAM 422 are read, respectively, onto APDB busses 124A to 124D to become Words A, B, C, and D. Words W, X, Y and Z are transferred to inputs of MOMA 536 and Words X and Z to MOMB 534. MOMA 536 and MOMB 534 are enabled by control signals from DATC 420 so that Words W and X are transferred onto APDB busses 124A and 124B by, respectively, MOMA 536 and MOMB 534. Words Y and Z are provided, respectively, to inputs of Data Drivers 529 and 531. Drivers 529 and 531 are enabled by control signal inputs from DATC 420 and transfer Words Y and Z to APDB busses 124C and 124D.

As previously discussed, a 32 bit word read from DATA RAM 422 to MU 122 or ASC 114 appears, respectively, on APDB busses 124A and 124B as Words G and H. Depending upon control signals provided to MOMA 536 from DATC 420, either Word W or Word Y is transferred through MOMA 536 to appear as Word G on APDB BUS 124A. Similarly, either Word X or Word Z is transferred through MOMB 534 to appear as Word H on APDB BUS 124B.

Referring to WREG 414, data may be transferred between WREG 414 and MEM BUS 118 or APDB BUS 124 in the same manner as just described with reference to DATA RAM 422. Sixteen bit MEM-WORDs from MEM BUS 118 and 32 or 64 bit words from APDB 124 are written into Data Inputs W, X, Y, and Z of WREG 414 in the same manner as into Data Inputs W, X, Y, and Z of DATA RAM 422; the sole difference in operation is that WREG 414 rather than DATA RAM 422 receives a write/enable control signal from DATC 420. Similarly, one 16 bit word at a time may be read from WREG 414 Data Outputs W, X, Y, and Z to MEM BUS 118. Thirty-two or 64 bit words from WREG 414 Data Outputs are transferred to APDB BUS 124 through MOMA 536, MOMB 534, and Gated Drivers 529 and 531 in the same manner as DATA RAM 422 outputs. In executing a read operation from WREG 414, DATC 420 provides a read/enable control signal to WREG 414 rather than to DATA RAM 422.

Referring finally to COS/SINE TABLE 428, COS/SINE TABLE 428 is a read only memory having Data Outputs W, X, Y, and Z. Single 16 bit words may be read from TABLE 428 to MEM BUS 118 through MOMA 536 in the same manner as just described with regard to DATA RAM 422 and WREG 414. Similarly, 32 and 64 bit words may be read from TABLE 428 to APDB 124. When reading from TABLE 428, DATC 420 provides write/enable control signals to TABLE 428.

Having described data transfer between MEM BUS 118, APDB 124, DATA RAM 422, WREG 414, and COS/SINE TABLE 428, DATC 420 will be described next. In particular, the following discussion will describe generation of read/write addresses to DATA RAM 422 and COS/SINE TABLE 428 by DATC 420.

Referring first to CPU 1002 initiated read/write operations (Mode1) 20 bits of physical address appear on PA BUS 116. The eight most significant bits of the physical address are provided to MEM 104 Interface Logic (MEMIL) 502 and are decoded to indicate when the physical address refers to a location within MEM 104' physical address space, including WREG 414. If this condition is true, MEMIL 502 interrupts any current microinstruction controlled read/write operations and enables DATC 420 to execute a CPU 102 controlled read/write. The twelve least significant bits of physical address are transferred into Memory Address Register (MAR) 504. The two least significant bits of MAR 504 contents are provided to MOM/DTL/RAM CONTROL (MDRC) 532. These two bits specify whether data is to be written into or read from DATA RAM 422 Inputs/Outputs W, X, Y, or Z. MDRC 532 decodes these two bits to provide appropriate control signals to, e.g., MOMA 536, MOMB 534, and DTL MUXs 524, 526, 528 and 530, as described above.

Referring now to microinstruction controlled read/write operations, 12 bit read/write addresses from PBL 438 appear on ARI BUS 434 and are transferred into Shifter 506. Twelve bits of ARI address are sufficient to select one of 4,096 16 bit (one word) memory locations in DATA RAM 422, e.g., for transfer of data between DATA RAM 422 and MEM BUS 118 (Mode 4). If such a transfer is to be executed, the 12 bit ARI address is transferred from Shifter 506 to RAM Address Register (RAR) 508. The two least significant bits of ARI address in RAR 508 are again provided to MDRC 532 and decoded to provide control signals as described above. The ten most significant bits of ARI address in RAR 508 are provided to DATA RAM 422 address input. Where the data transfer is to be between DATA RAM 422 and APDB 124, as described above, 32 bits (two words) (Mode 2) or 64 bits (four words) (Mode 3) are transferred with each DATA RAM 422 read/write. In a two word transfer, 11 bits of ARI address are sufficient to select four of 4,096 DATA RAM 422 memory locations. In these cases, Shifter 506 converts a 12 bit (one word) ARI address to either an 11 bit (two words) or a 10 bit (four words) ARI address. Shifter 506 accomplishes this conversion by shifting the 12 bit ARI address so that either the least significant bit is 0 (for an 11 bit address) or the two least significant bits are 0 (for a 10 bit address). The ten or 11 bit converted ARI address is then transferred into RAR 508 where, again, two bits are provided to MDRC 532 to generate multiplexer control signals and ten bits are provided to the DATA RAM 422 address input.

COS/SINE TABLE 428 is addressed by ARI addresses provided from PBL 438 in the same manner as just described with reference to DATA RAM 422. In this case, a 10, 11, or 12 bit ARI address is transferred from Shifter 506 to Trignometric Address Register (TAR) 510. Again, the two least significant bits are provided to MDRC 532 and the ten most significant bits are provided to COS/SINE TABLE 428 address inputs. In this regard, it should be noted that TABLE 428 provides plus and minus cosine and plus and minus sine outputs with a resolution of 1,024 points on a unit circle. TABLE 428, however, is a 512 word by 64 bit ROM, i.e., providing simultaneous 32 bit cosine and sine outputs.

512 cosine/sine values are sufficient for 1,024 point resolution on a unit circle because of the symmetry of cosine/sine values around a unit circle, e.g., cosine $\theta$ is equal to A sine $\theta + 180°$. Addressing of TABLE 428 may therefore be regarded as a first addressing operation to select the value (magnitude) of a trignometric function, e.g., selecting the absolute value of cosine $\theta$, and a second addressing function to determine sine (plus/minus) of the trignometric function. To accomplish this, 8 bits of address from TAR 510 are provided as the TABLE 428 trignometric magnitude address input. Two remaining bits of TAR 510 address are used to select the signs (plus/minus) of the cosine and sine functions. In this regard, 2 bits of sign information are provided as a data input from MEM BUS 118 through MBDT BUS 404 and are stored in Sine Of Trignometric (SOT) Register 512. Sine/cosine bits from TAR 510 and corresponding sign bits from SOT 512 are provided as address inputs to a sign PROM portion of TABLE 428. The TABLE 428 sign PROM then provides outputs representing sign values of the sine and cosine functions.

The description of DTU 110 is hereby concluded, and MU 112 will be described next below. In the following discussions, High Speed Multiplier 440 will be described first, including a discussion down to schematic diagram level of Multiplier 620, and then PBL 438 will be described.

Figure 6H:
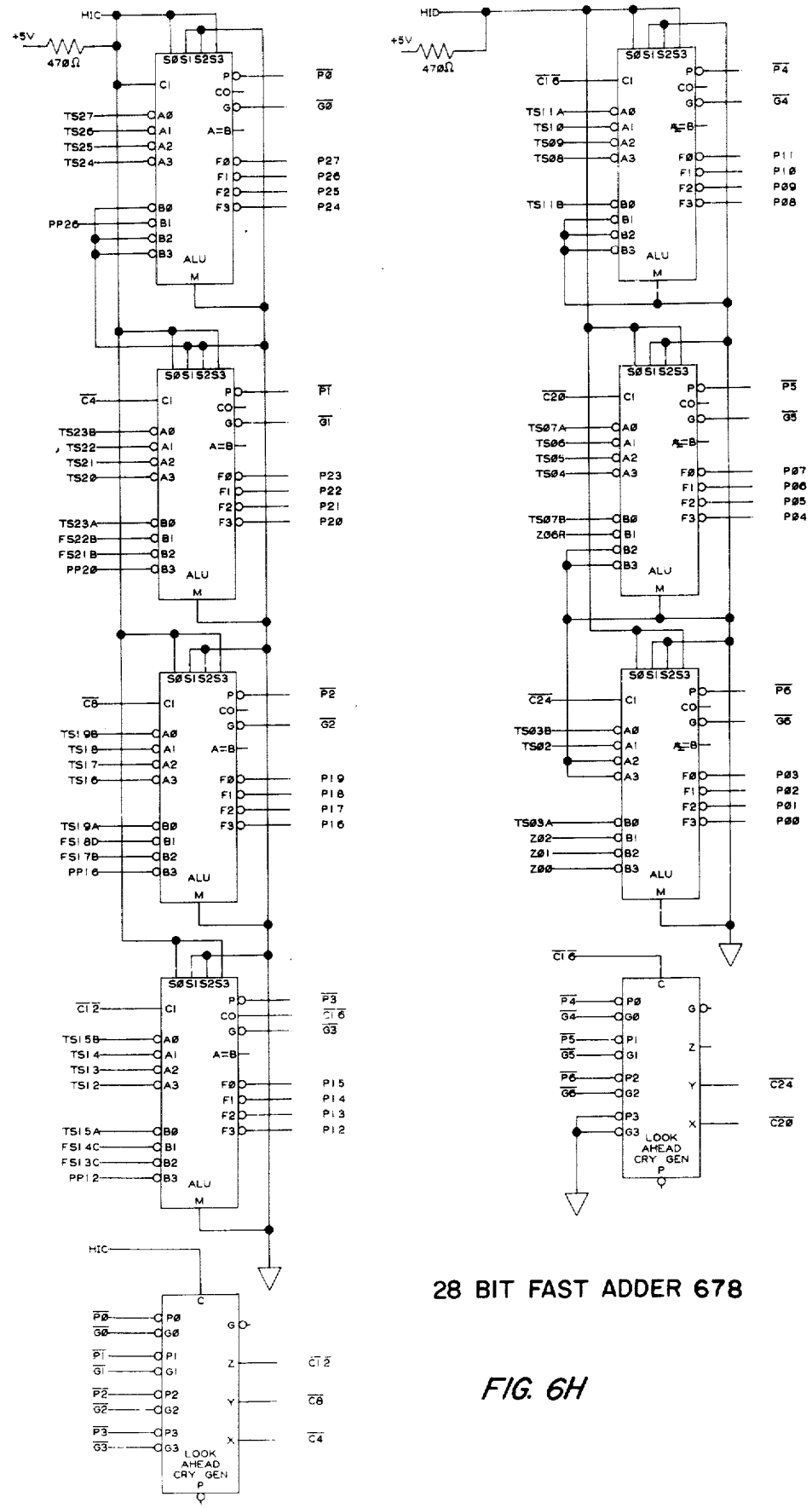
FIG. 6H is a schematic diagram showing interconnection of components of Fast Adder 678 of FIG. 6C.

3. Multiplier Unit (MU) 112 (FIGS. 6–6H)

Referring to FIG. 6, block diagrams of HSM 440 and PBL 438 are shown. HSM 440 will be described first, with the aid of FIGS. 6 to 6H. PBL 438 will be described after discussion of HSM 440 is completed.

a. HSM 440 (FIGS. 6–6H)

As previously discussed, HSM 440 is a high speed hexadecimal multiplier capable of operating with both real and complex array elements or scalars. Real elements or scalars are expressed as a single 32 bit floating point number in excess 64 notation. 24 bits represent mantissa, 7 bits represent exponent, and 1 bit represents sign. Complex elements are expressed as two such 32 bit words; one 32 bit word represents the real part and the other 32 bit word the imaginary part. To aid in understanding the operation of the present invention, a discussion of "excess 64 notation" will be presented first, followed by a description of HSM 440 operation.

Referring to FIG. 6A, a representation of a 32 bit floating point number in excess 64 notation is presented. As is known in the art, floating point processor Mantissa's are fractional values, and the exponent associated with that Mantissa is either positive or negative depending upon whether the floating point word (the Mantissa and the exponent taken together) is supposed to be greater than or less than zero. In this manner, large numbers and small numbers can be efficiently expressed. For example, referring to FIG. 6B, where the Mantissa is known to be able to employ 64 binary bits (in 16 hex digits) the maximum number is a Mantissa of all one's times $16^{63}$; by contrast, the smallest number expressable is all zero's in the Mantissa but for the last position which contains a one times $16^{-64}$. However, in order to accurately characterize the number, the positive or negative nature, the sign, of the exponent is crucial. In order to maintain information relative to sign of the exponent locations would be inefficiently employed. The excess 64 notation scheme is used to save the requirement of carrying the sign of the exponent around during calculations. Essentially, the value 64 is added to the absolute value in the exponent and interpreted as follows. Referring to FIG. 6B, if the exponent contains the value 64, this is interpreted as being a zero. If the exponent contains the value 127, this is interpreted as 63. If the exponent contains a zero, this is interpreted as $-64$. As shown in FIG. 9, negative exponents are values that are greater than or equal to zero or less than 64. Positive exponents are 64 through 127.

Referring again to FIG. 6, operation of HSM 440 will now be described. In general, the multiplier (e.g., an element from Array X or a scalar) is stored in Registers M0 606 and M1 608 while the multiplicand is stored in Registers M2 610 and M3 612. No restriction is placed upon the arrangement in which multiplier and multiplicand are stored in Registers M0, 1, 2, and 3 as HSM 440 can multiply M0 times M2, M0 times M3, M1 times M2, and M1 times M3. Up to four multiplication products can thus be generated from a single multiplier and a single multiplicand. The following discussion will describe multiplication of Register M0 contents with Register M2 contents. The other three possible multiplication operations are executed in the same manner, the only difference being the identities of the registers providing multiplier and MULTIPLICAND.

Turning to the multiplication of Register M0 contents with Register M2 contents, separate, parallel operations are performed with the mantissas, exponents, and signs. These operations will be discussed in the order referred to.

First, multiplication of mantissas is executed in two stages. In first stage, the 24 bits of the M0 mantissa are transferred to Multiplier 620 Y Input. At same time, the 12 least significant M2 mantissa bits are transferred into Multiplier 620 X Input and the 12 most significant M2 mantissa bits are transferred into Most Significant Bit Register (MB) 618. Multiplier 620 then executes function $R=(X \cdot Y)+Z$, where X, Y, and Z are Multiplier 620 Inputs. Inputs X and Y have just been defined as, respectively, 12 and 24 bits of mantissa information from Registers M2 and M0. Input Z, discussed further below, is 0 during first stage of multiplication operation. Multiplier 620 then provides a 24 bit partial product output, $R=X \cdot Y$, on Multiplier Un-normalized Result BUS (MUR) 621 and a partial product result of first stage of multiplication is transferred into Partial Product Register (PP) 622.

In second stage of multiplication, 24 bits of M0 mantissa are again transferred into Multiplier 620 Y Input. The 12 most significant bits of M2 mantissa are transferred into Multiplier 620 X Input from MB 618. The partial product result of first stage of multiplication is transferred into Multiplier 620 Z Input through BUS 623 from PP 622. Multiplier 620 then again executes the function $R=(X \cdot Y)+Z$ and provides a 28 bit final multiplier result output on MUR BUS 621. The final multiplier result output is transferred into Multiplier Unnormalized Result Mantissa Register (MURM) 624.

Turning to multiplier exponent operation, M0 exponent (7 bits) and M2 exponent (7 bits) are transferred from Registers M0 and M2 to Adder 614. Adder 614 adds M0 and M2 exponents to provide a multiplier result exponent output on Multiplier Result Exponent (MRE) BUS 615. The multiplier result exponent is transferred into Multiplier Exponent Register (ME) 628.

Finally, referring to multiplier sign operation, M2 sign bit is transferred into Delayed Sign Register (DS) 616 at the start of the first stage of multiplier operation, and transferred from DS 616 to a first input of Multiplier Sign Logic (MSL) 626. M0 sign bit is transferred to a second input of MSL 626. MSL 626 performs an exclusive or function on M0 and M2 sign bits if a full signed multiply operation is being performed. HSM 440 is also capable of executing absolute value multiplications, e.g., signed M0 times the absolute value of M2 or the absolute value of M0 times absolute value of M2. In such cases, MSL 626 generates a multiply result sign bit according to the multiply operation being executed. Multiply Result Sign bit is transferred from the MSL 626 to the bit to Multiply Result Sign Register (MS) 630.

In summary, the result of the above described operations is to provide a 28 bit unnormalized result mantissa (in MURM 624), a multiply result sign bit (in MS 630) and an 8 bit multiply result exponent (in ME 628). Multiply result unnormalized mantissa, multiply result exponent, and multiply result sign are then transferred into Multiplier Result Normalize Circuitry (MRN) 632 to provide a normalized floating point word output on Multiply Result (MR) BUS 444. This operation increases the effective capacity of the result mantissa to, in turn, enhance the precision of the multiplier result output, as will be next described.

Referring to FIG. 6B, a normalized and unnormalized floating point word is shown. In the unnormalized word, the exponent is equal to 71 minus 64 or equal to 7. The three one's to the right of the exponent word are equal to 7, and the one in the next to the leftmost position is equal to 64, using ordinary binary conversion techniques. By contrast, in the normalized word, the exponent is equal to 68 minus 64 or 4. However, the point of FIG. 6B is not to particularly highlight the exponent values but to explain the difference between normalized and unnormalized words as follows.

Normalization is used to increase the precision of the of floating point number residing in a limited number of hex digits (each group of four binary bits shown is a single hex digit) in the floating point unit. In FIG. 6B, an unnormalized number represented by 3/65,536 times $16^7$ is examined for leading hex zero's and it is determined that there are three in this particular case. In other words, there are twelve zero's associated with the first three hex digits, plus another two zero's before the first non-zero binary digit occurs, and this can be considered to be equal to $1/2^{15}$ plus $1/2^{16}$, or $2/2^{16}$ and $1/2^{16}$, or $3/2^{16}$, and $2^{16}$ equals 65,536. Normalization occurs when the leading hex digit is a non-zero value, as shown in FIG. 6B "normalized". Since the first non-zero hex digit is moved three places to the left, the exponent is reduced by a value of 3, therefore, the exponent is now equal to 68–64 equals 4. Also, the mantissa is now equal to $1/2^3$ and $1/2^4$ which is equal to 3/16. The important point is that 3/16 times $16^4$ which is the value of the normalized number is precisely equal to 3/65,536 times $16^7$; this can be verified by simple arithmetic.

Normalization is defined as the high-order hex digit containing a non-zero number, or in other words, normalization is that condition where at least one bit which is a non-zero bit is contained in the most significant hex digit. The purpose of normalizing is to increase the capacity of the Mantissa to assume more precision by having the capacity to accept more bits.

Finally, as was previously described, HSM 440 includes the capability of examining the multiply result to determine whether an underflow or overflow condition has resulted. When such a condition occurs, the condition may be treated as an error and APS 100 may immediately execute an error correction routine. Alternately, as directed by the parameter block continuation word, HSM 440 may force the multiply result to the maximum expressable value or to zero, for, respectively, overflow or underflow condition and continue operation. This function is performed by portions of MRN 632 circuitry. This circuitry examines unnormalized result mantissa output of MURM 624 and provides an output to Multiplier Result Overflow Flip-Flop (MROVFF)/Multiply Result Underflow Flip-Flop (MRUNFF) 634 if an overflow or underflow has occurred. MROVFF/MRUNFF 634 then provides error indicating outputs to Latch Logic 636 where the error indication signals are sampled by input signal TEST. Results of this test operation are provided to APS 100 through Latch Logic 636 output LATCH. In addition, MRN 632 circuitry examines unnormalized result mantissa output from MURM 624 to detect whether the multiply result is zero (e.g., the multiplier or multiplicand was zero) or the multiplier result was an infinitesimally small number (e.g., the multiplier or multiplicand was an infinitesimal number). If such a condition has occurred, MRN 632 provides an output indicating this occurrence directly to Latch Logic 636; these conditions are treated as being equivalent to an overflow or underflow condition.

In summary, HSM 440 provides a 32 bit, normalized, floating point multiply result output, including a forced result for underflow or overflow conditions. It should be noted that HSM 440, as described above, is capable of providing multiply result outputs as rapidly as data (multipliers and multiplicands) may be transferred to HSM 440 from DTU 110. As described above, the multiply operation is executed in two stages. The contents of Registers M0 606 and M1 608 must remain constant during both first and second stages of multiply operation. The contents of Registers M2 610 and M3 612, however, may be replaced with new values at the end of the first multiply cycle. This is allowed because the contents of Registers M2 and M3 are either used immediately in the first stage of multiplication or are transferred into Registers DS 616 and MB 618 for use in second stage of multiplication. Thus, a new multiplicand may be loaded into Registers M2 and M3 at end of first stage of a current multiply operation. Since the transfer of a multiplicand and a multiplier to HSM 440 from DTU 110 requires two DTU 110 read cycles, this operation allows HSM 440 to accept successive multiplicands and multipliers as rapidly as data can be provided from DTU 110.

Having described operation of HSM 440 on a detailed block diagram level, Multiplier 620 will next be described in greater detail. Referring to FIG. 6C, a block diagram of Multiplier 620 is shown. Referring first to 4 bit Multiplier Array 670, Multiplier 620 Input X (12 bits of data) is divided 4 bit words A, B, and C containing, respectively, Bits 0-3, 4-7, and 8-11. Multiplier 620 Input X Word A is transferred into first inputs of all 4 bit multipliers in Column A of 4 bit Multiplier Array 670. Likewise, Word B and Word C are transferred into first inputs of all 4 bit multipliers in Columns B and C. Multiplier 620 Input Y (24 bits of data) is divided into 4 bit words D through I (respectively, Bits 0-3, 4-7, 8-11, 12-15, 16-19, and 20-23). Word D of Multiplier 620 Input Y is transferred to second inputs of all multipliers in Row D of 4 bit Multiplier Array 670. The remaining five 4 bit words of Multiplier 620 Input Y are similarly connected to second inputs of all multipliers of corresponding rows of Multiplier Array 670. Each 4 bit multiplier of Array 670 multiplies together its first and second inputs to provide an 8 bit multiply result output. E.g., 4 bit multiplier at Column B in Row F of Array 670 receives X Input Word B as first input and Y Input Word F as second input and generates an 8 bit number representing product of $B \times F$. Multiplier Array 670 Output therefore comprises eighteen 8 bit Partial Multiply Product (PMP) words, i.e., one PMP word from each 4 bit multiplier of Multiplier Array 670.

The eighteen PMB words from Multiplier Array 670 must then be arithmetically combined and added together with Multiplier 620 Input Z (i.e., 24 bit partial product input from PP 622) to generate Multiplier 620 multiply result output $(X \cdot Y) + Z$. As will be discussed further below, this is accomplished by a multiple stage addition. This addition will be described first on block diagram level with reference to FIG. 6C, and then will be described in greater detail. The eighteen 8 bit PMB words from Multiplier Array 670 are transferred into a first input of First Stage Adder (FSA) 672 through MUR BUS 671. The 24 bits of partial product from Multiplier 620 Z Input are transferred into a second input of FSA 672 through BUS 669. FSA 672 therefore receives a total of 168 bits of input data. FSA 672 performs a partial addition operation to generate a First Stage (FS) output containing a substantially reduced number of bits. FS outputs are transferred to Second Stage Adder (SSA) 674 through BUS 673. SSA 674 performs a second partial addition to generate Second Stage (SS) outputs containing a still further reduced number of bits. SS outputs are transferred to Third Stage Adder (TSA) 676 through BUS 675. TSA 676 performs a third partial addition which results in two Third Stage (TS) outputs, each TS output containing 28 bits of information. The two 28 bit TS outputs are transferred to 28 bit Fast Adder 678 through BUS 677. Twenty-eight bit Fast Adder 678 then performs a final addition to provide multiplier result output $(X \cdot Y) + Z$ on MUR BUS 621. Having discussed operation of Multiplier 620 on a block diagram level, operation of Multiplier 620 will be described next with aid of FIGS. 6D and 6E. Finally, circuitry used in a preferred embodiment of Multiplier 620 will be presented.

Referring to FIG. 6D, a schematic representation of Multiplier 620 operation is shown. At top of FIG. 6D, multiply operation $(CBA) \times (IHGFED)$ is indicated. Letters C, B and A represent the three 4 bit words comprising Multiplier 620 X Input. Similarly, numbers I to D represent the six 4 bit input words of Multiplier 620 X Input. In each of words A to I, and throughout the following discussion, binary words are arranged with the most significant bit the leftmost bit and least significant bit the rightmost bit.

Referring further to FIG. 6D, the eighteen 8 bit PMP outputs (AD to CI) of Multiplier Array 670 are shown. To enhance clarity of presentation, these eighteen partial multiplier products are arranged in FIG. 6D as if resulting from, e.g., a pencil and paper multiplication of Multiplier Number CBA and Multiplicand Number IFGFED. PMPs AD to CI are positioned horizontally so that corresponding bits of PMPs having same binary (power of 2) value weight are aligned vertically. As indicated by power of 2 weight scale shown above the PMPs, power of 2 weight of bits increases from right to left, i.e., $2^0$ bit appears on the extreme right, $2^{35}$ bit appears at the left. Partial product Z Input (PP) is shown similarly aligned with the eighteen PMPs according to ascending powers of 2 weight of the 24 bits therein.

As previously discussed, Multiplier 620 executes function $R=(X \cdot Y)+Z$. This operation requires that Multiplier 620 perform a columnwise addition of corresponding bits of PMPs AD to CI and PP. Referring, e.g., to the fifth column of FIG. 6D (i.e., Bits $2^{15}$ to $2^{19}$), and in particular to the vertical column of bits indicated by a dashed line (the $2^{17}$ bits of AG, AH, BF, BG, CE, CF, and PP), Multiplier 620 must add the seven indicated bits and a carry from the next less significant bit column to generate the corresponding bit of the 28 bit multiplier result. As discussed further below, this addition is performed by FSA 672, SSA 674, TSA 676, and 28 bit Fast Adder 678. As indicated in FIG. 6D, a straight forward addition would provide a 36 bit result with an additional carry bit; the adder chain comprising FSA 672, SSA 674, TSA 676, and Fast Adder 678 is designed to provide a compressed 28 bit output. In particular, FSA 672, SSA 674, and TSA 676 are designed to perform successive compressive additions wherein the number of data bits is progressively reduced from 168 bits (at FSA 672 inputs) to two 28 bit numbers (at TSA 676 output). To accomplish this, each successive adder stage must generate an output containing fewer fits than it receives as input.

Referring to FIG. 6E, a schematic representation of a portion of FSA 672 is shown. FIG. 6E illustrates the principle of operation of FSA 672, SSA 674, and TSA 676.

These principles, although illustrated with reference to a presently preferred embodiment of the present invention, may be generally used in creating other embodiments of sequential compression adders. Referring to top of FIG. 6E, the fifth column of PMPs from FIG. 6D is shown. The following illustration will demonstrate addition of seven 4 bit numbers, comprising AG 4 most significant bits (MSB) AH 4 least significant bits (LSB), BF 4 MSB, BG 4 LSB, CE 4 MSB, CF 4 LSB, and the 4 corresponding bits of PP. Also indicated is a section of FSA 672 comprising a vertical slice therethrough containing four 4 bit Adders (672A, 672B, and 672C). Each 4 bit Adder is capable of adding two 4 bit numbers plus a carry input bit, which is internally added to the two least significant input bits. Each Adder, as shown in FIG. 6E, may then be regarded as having one three bit input A (the two LSBs and one carry bit) and four higher order 2 bit inputs B, C, and D. Each Adder generates four single output bits, indicated as Outputs W, X, Y, and Z, representing, respectively, the arithmetic sums of the three bit LSB Input and the three higher order 2 bit Inputs. Each Adder also generates a carry output (not discussed herein) which may be used in a succeeding higher order Adder.

Operation of circuitry schematically represented in FIG. 6E will be described first, followed by a description of principles by which the circuitry was designed. Regarding first the addition of the seven least significant bits of Column 5 from FIG. 6D (the $2^{16}$ bits), three of these bits are connected to LSB Input A of Adder 672A, which then generates a single Output W bit. Three other bits are connected to LSB Input A of Adder 672B, which then generates a single Output W bit. The two single Output Bits from Adders 672A and 672B, and the single remaining bit of the seven $2^{16}$ bit inputs are carried forward as a 3 bit input to SSA 674. Now regarding addition of the $2^{17}$ bit inputs, two of these bits are connected to Adder 672A Input B, which generates a single Output X Bit. Two more bits are connected to Adder 672B Input B, which then generates a single Output X Bit. The last three $2^{16}$ bits are connected to LSB Input A of Adder 672C, which generates a single Output W Bit. The three $2^{16}$ bit outputs from Adders 672A, 672B, and 672C are carried forward as a 3 bit input to SSA 674. Turning to addition of the seven $2^{18}$ bit input to FSA 672, two of these bits are connected to Adder 672A C Input, which generates single Output Bit Y. Two more bits are connected to Adder 672B C Input, which generates a single Y Output Bit. Two more bits are connected to Adder 672C B Input, which then generates a single Output X Bit. The three $2^{16}$ Outputs of Adder 672A, 672B, and 672C, plus the single remaining $2^{16}$ Input Bit to FSA 672, are carried forward as a 4 bit input to SSA 674. Addition of the seven $2^{19}$ bits to FSA 672 is similar to addition of the $2^{18}$ bits. The Adder circuitry shown in FIG. 6E is therefore capable of accepting four 7 bit inputs (i.e., 28 bits of input) and generating two 4 bit outputs and two 3 bit outputs (i.e., 14 bits) to the next stage of addition, i.e., SSA 674. The example shown herein for illustrative purposes is therefore capable of compressively adding a 28 bit input to provide a 14 bit output. In practice, as may be seen in the following schematic diagrams of FSA 672, SSA 674, and TSA 676, generation of carry bits will result in an actual compression reduction of less than two to one.

Turning to principle by which the above example was designed, the maximum number of input bits in any group of bits having the same power of 2 value is divided by 2, with the remainder ignored, to determine the number of 2 bit adders required for optimum compressive addition in a vertical slice of adder stage. E.g., in the above example the maximum number of bits is seven and when divided by 2 indicates that a tier of 3 adders is required. Assignment of input data bits to adder inputs is begun with the least significant bit inputs. The LSBs are divided into groups of three and each group of three connected to a corresponding 3 bit LSB input (A) of an adder in a corresponding tier of the adder array. There may be either one or two unassigned LSB bits. If two unassigned bits remain, they are assigned to a 2 bit input of an adder in the last tier of the array. A single remaining bit is carried forward to the next stage of addition, as are the single bit outputs of the adders. Assignment of successive groups of input bits to corresponding adder inputs continues in a similar fashion for successive groups of input bits. Bits of each succeeding group of inputs are assigned to remaining available 3 and 2 bit adder inputs in such a manner that no more than a single bit of the group of input bits to that adder stage is carried forward to the next adder stage. This principle is applied across the entire array of input bits.

Having described operation of Multiplier 620 on a detailed block diagram level, including the principle of operation of the compressive adder comprising FSA 672, SSA 674, and TSA 676, circuitry used in a presently preferred embodiment of the present invention will be described next. Operation of this circuitry will not be described in detail as being apparent to one familiar in the art.

Referring to FIG. 6F, circuitry of FSA 672 is shown. In this circuit diagram, and in the following circuit diagrams, the most significant bit is designated as the 0th bit and the most significant bit, e.g., as the 12th bit. The eighteen 8 bit PMP inputs from Multiplier Array 670 are designated as, e.g., Z30B; Z represents an input from Multiplier Array 670, 30 represents the particular bit number, and B represents which of eighteen PMPs the bit belongs to. Z00 to Z03 and Z32 to Z35 are the 4 MSBs and 4 LSBs of Multiplier Array 670 output but otherwise do not differ from other Multiplier Array 670 Outputs. Partial product inputs are indicated by the prefix PP. FSA 672 outputs are indicated by, e.g., FS13C; FS indicates a First Stage Adder output, C indicates a particular group of bits, and 13 represents the number of a bit within that group.

Referring to FIG. 6G, circuitry of SSA 674 and TSA 676 is shown. Nomenclature of inputs from FSA 672, and partial product input PP, have been previously described. Nomenclature of SSA 674 and TSA 676 outputs is similar to that described with respect to FSA 672 except that, respectively, the outputs are indicated by first letters SS and TS.

Referring finally to FIG. 6H, circuitry of 28 bit Fast Adder 678 is shown. Nomenclature of all inputs has been previously described or is apparent from nomenclature shown in FIG. 6H itself. Twenty-eight bit Fast Adder 678 outputs to BUS 621 are indicated as P00 through P27. It should be noted, in FIGS. 6F, 6G, and 6H, that certain inputs of FSA 672 from Multiplier Array 670, and certain partial product inputs from Multiplier 620 Input Z, are carried forward as inputs to SSA 674 and TSA 676. Similarly, certain FSA 672 outputs to SSA 674 are carried forward as inputs to TSA 676. Detailed examination of FIGS. 6F, 6G, and 6H will provide further practical demonstration of principles of sequential compressive addition described above with reference to FIGS. 6C, 6D, and 6E.

Description of HSM 440 and Multiplier 620 is hereby concluded, and Parameter Block Logic (PBL) 438 will be described next below.

b. Parameter Block Logic (PBL) 438 (FIG. 6)

Referring to FIG. 6, PBL 438 is shown therein. As previously discussed, certain parameter block information, e.g., Array X, Y, and Z addresses and Array X, Y, and Z step values, are transferred into AP 108 at start of each macroinstruction. This information is used, e.g., to generate MEM 104' read/write addresses to read and write array element data in and out of MEM 104' during execution of the macroinstruction. In this regard, primary purpose of PBL 438 is to receive and store this parameter block information, and to generate MEM 104' read/write addresses. PBL 438 also generates read/write addresses to WREG 414 and read addresses to COS/SINE TABLE 428.

Parameter block information is transferred from MEM 104 to AP 108 on MEM BUS 118. Certain parameter block information, as just described, is transferred through Memory Bus Parameter Block (MBPB) BUS 436 and Receiver 644 to Register File 638 B Input. During execution of a macroinstruction, array element address information and step value information is read from Register File 638 and appears on Register File B Output. Register File 638 B Output information is then transferred into Bit Reversal Multiplexer (BRMUX) 640. BRMUX 640 may either transfer its input directly to its output, or may provide an output wherein bits of the input are reversed. Such bit reversal, as is known to those familiar in the art, is useful for generating bit reverse addresses of array elements when executing certain Fast Fourier Transform operations. BRMUX 640 output is transferred to a first input of ALU 642. A second input of ALU 642 receives data from Register File 638 A Output. ALU 642 then performs a selected arithmetic operation, e.g., an addition of first and second inputs. ALU 642 provides a result output to Register File 638 A Input, BUS Driver 646, and a first input of ARI Multiplexer (ARI MUX) 652. Primary purpose of the circuitry just described is to generate successive read/write addresses to MEM 104'. These addresses are used to select successive array elements to be operated upon by MU 112 and ASC 114, and to select Array Z locations in MEM 104' to store results of such operations. E.g., at start of execution of a macroinstruction Array X first element address is read from Register File 638 B Output and transferred into ALU 642, where it is added to zero from Register File 638 A Output. The result, Array X first element address, is then transferred through ARI MUX 652 to ARI BUS 434. Array X first element address is then transferred into DTU 110 and Array X first element transferred onto APDB BUS 124 for subsequent use by MU 112 and ASC 114. Array X first element address is also transferred into Register File 638 A Input where it is stored for subsequent use. In a subsequent microinstruction step, Array X first element address is read from Register File 638 A Output while Array X step value is read from B Output. First element address and step value are added in ALU 642 to generate Array X second element address. Array X second element address is then transferred through ARI MUX 652 to ARI BUS 434 to read Array X second element from MEM 104'. Array X second element address is also transferred into Register File 638 A Input for still later use. Addresses generated by ALU 642 may also be transferred onto MEM BUS 118, through BUS Driver 646 and MBPB BUS 436, e.g., to store selected array element addresses in MEM 104 or to transfer such addresses to CPU 102 (e.g., to identify result array elements resulting from overflow or underflow conditions).

Referring to AREG 656, BREG 658, and CREG 660, these three Registers comprise a three stage shift register memory. This shift register memory is useful, e.g., for storing addresses of successive array elements during pipeline type operations. In such operations, e.g., a first element of Array X may be undergoing an arithmetic operation in ASC 114, a second element of Array X may be in second multiplication stage in MU 112, and a third Array X element may be in first multiplication stage in MU 112. In such a case, Array X first element address would be transferred into AREG 656 when Array X first element is called from MEM 104'. When Array X second element is called from MEM 104', Array X first element address is transferred into BREG 658 and second element address is transferred into AREG 656. When Array X third element is called from MEM 104+, first element address is transferred into CREG 660, second element address is transferred into BREG 658, and third element address is transferred into AREG 656. At any time during the pipeline operation, the MEM 104' address of first, second, or third Array X elements may be quickly obtained by reading the address from its present register through D Multiplexer (DMUX) 654. DMUX 654 output may then be transferred through Adder 650 and ARI MUX 652 to ARI BUS 434.

Referring to EREG 648 and Adder 650, these elements allow generation of offset MEM 104' addresses. E.g., during execution of Fast Fourier Transforms it is useful to be able to select corresponding elements from various blocks of elements in an Array. In such cases, an address may be read from Register File 638 B Output and transferred through DMUX 654 to first input of Adder 650. An address offset may be transferred through MEM BUS 118, MBPB BUS 436, and Receiver 644 to EREG 648. Address offsets stored in EREG 648 may then be transferred into Adder 650 second input and added to the address provided at Adder 650 input to generate an address correspondingly offset from the address selected through DMUX 654. Adder 650 output is then transferred through ARI MUX 652 to ARI BUS 434.

Description of MU 112, including HSM 440 and PBL 438 is hereby concluded, and ASC 114 will be described next below.

4. Add/Subtract/Compare (ASC) 114 (FIGS. 7, 7A)

ASC 117 performs add, subtract, and compare operations, including reiterative operations, on data provided from MEM 104' through APDB 124 and multiply operation results provided from MU 112 through MR BUS 444. In the following discussion, ASC 114 will be described first on block diagram level with the aid of FIG. 7; ASCAL 458 will then be described in greater detail with the aid of FIG. 7A.

Referring to FIG. 7, a block diagram of ASC 114 is shown. ASC REG 454 contains eight 32 bit registers arranged in two banks of registers. Bank A contains Registers A0 to A3 and Bank B contains Registers B0 to B3. Registers A0–A3 and B0–B3 are used to store, e.g., array element data, to be arithmetically operated upon by ASCAL 458. Thirty-two and 64 bit words appearing on APDB 124 from DTU 110 are selectively transferred through ASC Register Input (ASCRI) BUS 452 and Receiver 708 to either Registers A1 and A2 or Registers B1 and B2. In general, Registers A1 and B1 are used to store 32 bit words while Registers A1 and A2 and B1 and B2 are used together to store 64 bit words. Thirty-two bit multiply result output of HSM 440 is transferred through MR BUS 444 and selectively stored in either Register A0 or Register B0. As previously discussed, multiply result output may be directly transferred from MR 444 to APDB 124, and thus to DTU 110 through Multiply Destination (MD) 736 and ASC MUX 464. Arithmetic operation result output of ASCAL 458 may be selectively transferred through ALO BUS 460 and RAF BUS 462 to either Register A3 or Register B3, e.g., when reiterative operations are being executed.

Referring to ASCAL 458, ASCAL 458 has a first input from Register Bank A and a second input from Register Bank B. Contents of a selected Bank A Register are transferred to a first input of Add/Subtract/Compare Unit (A/S/C) 726, described further below. Contents of a selected Bank B Register are similarly transferred to a second input of A/S/C 726. Designating input from Register Bank A as A and input from Register Bank B as B, A/S/C 726 is capable, as discussed further below, of executing four arithmetic operations and sixteen test operations on A and B inputs. These operations may include:

| Arithmetic | Test | | | |
|---|---|---|---|---|
| $+A+B$ | $A > B$ | $A \geq B$ | $\|A\| = \|B\|$ | $A = 0$ |
| $+A-B$ | $A < B$ | $A \leq B$ | $\|A\| \neq \|B\|$ | $A < 0$ |
| $-A+B$ | $A = B$ | $\|A\| > \|B\|$ | $\|A\| \geq \|B\|$ | $B = 0$ |
| $-A-B$ | $A \neq B$ | $\|A\| < \|B\|$ | $\|A\| \leq \|B\|$ | $B < 0$ |

Test operations to be executed upon A and B inputs are specified by a test command stored in Test Command Register (TCR) 738, also discussed further below.

A/S/C 726 arithmetic result output is transferred into Arithmetic Intermediate Result Register (AIR) 728. Arithmetic operation results are then transferred from AIR 728 to Normalize Circuit 730. Normalize Circuit 730 operates in same manner as Multiplier Result Normalize Circuit 632 in MU 112, discussed previously. Normalize Circuit 730 includes circuitry, as described previously with regard to Multiplier Result Normalize Circuit 632 operation, for detecting overflow and underflow conditions. Normalize Circuit 730 operates in a manner similar to that previously discussed, generating error result signals through Arithmetic Result Overflow Flip-Flop (AROVFF)/Arithmetic Result Underrun Flip-Flop (ARUNFF) Logic 732 and generating maximum value or zero outputs when so directed.

ASCAL 458 arithmetic result output appears (from Normalize Circuit 730) on ALO BUS 460 and, as previously described, may be transferred back into Register A3 or B3 through RAF BUS 462. ASCAL 458 arithmetic output may also be transferred directly onto APDB 124 through Arithmetic Destination (AD) MUX 734 in ASC MUX 464.

As discussed previously, ASC 114 also contains a scratchpad memory referred to as Constant RAM (CRAM) 448. CRAM 448 receives read/write addresses from ARI BUS 434. These read/write addresses are stored in CRAM Address Register (CAR) 706 and transferred to address input of CRAM Memory (CRAM MEM) 702. CRAM MEM 702 may comprise a 32 word by 32 bit memory divided into two 16 word by 32 bit storage areas. A first storage area may be connected from APDB 124A and 124B and the second storage area may be connected from APDB 124C and 124D. Second storage area would then be used to receive and store 32 bit words from DTU 110 while first and second storage areas would be used together to receive and store 64 bit words. Contents of CRAM MEM 702 may be selectively transferred, upon receiving a read address from CAR 706, to APDB 124. In this regard, outputs of CRAM MEM 702, AD 734, and MD 736 are connected to inputs of Gated Drivers 740 and 742. Driver 740 outputs are connected to APDB 124C and 124D while outputs of Driver 742 are connected to APDB 124A and 124B. Drivers 740 and 742 thereby allow contents of CRAM MEM 702, AD 734, and MD 736 to be selectively transferred onto either APDB 124A and 124B, APDB 124C and 124D, or APDB 124A, B, C, and D together.

Block diagram description of ASC 114 is hereby concluded, and operation of Add/Subtract/Compare Unit 726 will be described next below in greater detail.

Referring to FIG. 7A, a block diagram of Add/Subtract/Compare (A/S/C) 726 is shown. Before discussing operation of A/S/C 726 in detail, certain operational features of A/S/C 726 will be summarized to enhance clarity of the following presentation. As described above, A/S/C 726 may be capable of executing any of the above discussed four arithmetic operations or sixteen test operations on two input numbers, A and B. Input number A is selected from Register Bank A and input number B selected from Register Bank B. Also as previously discussed, with reference to MU 112, input numbers A and B are each hexadecimal floating point numbers. In each number, 24 bits represent the mantissa (six 4 bit hexadecimal digits), 7 bits represent the exponent, and 1 bit represents the sign. A/S/C 726 arithmetic result output to AIR 728 is an unnormalized hexadecimal floating point number having a 28 bit mantissa, a 7 bit exponent, and a single bit sign. Considering first A/S/C 726 arithmetic operations, all arithmetic operations are executed as three parallel, concurrent processes. In first process, A/S/C 726 manipulates the absolute values of the mantissas of input numbers A and B to generate an unsigned, absolute value arithmetic result output mantissa. This process is executed in three steps. In first step, mantissas and exponents of input numbers A and B are compared to determine whether one input number is smaller, in exponent or mantissa, than the other. Mantissa of the larger input number is then transferred to a first input (C) of an adder/subtractor. If exponent of larger number is greater than exponent of smaller number, mantissa of the smaller number is, in second step, right shifted to effectively equalize the exponents of the two input numbers. Right shifted mantissa of the smaller input number is then transferred to a second (D) input of an adder/subtractor. In third step, adder/subtractor executes the operation $C \pm D$ where C is always absolute value of larger input number mantissa and D is absolute value of smaller number mantissa. Adder/subtractor then provides an absolute value number representing arithmetic operation result mantissa. In second process, A/S/C 726 manipulates signs of input numbers, relative magnitudes of input numbers, and the operation to be performed on input numbers (e.g., $-A+B$) to generate an output representing sign of arithmetic operation result. In third process, A/S/C 726 selects the larger exponent of the two input numbers and transfers this exponent to an A/S/C 726 output as arithmetic operation result exponent.

Referring to A/S/C 726 test operations, A/S/C 726, as described further below, receives an address input representing a test or test to be executed on input numbers A and B from TCR 738. A/S/C 726 manipulates these test condition inputs and certain signals (discussed below) generated by A/S/C 726 arithmetic circuitry to execute the specified test operations and provides a test result output.

Having summarized certain operating features of A/S/C 726, operation of A/S/C 726 will now be described with aid of FIG. 7A. A/B Comparison Logic (ABCL) 744 will be described first, followed by Mantissa Arithmetic Logic (MAL) 748. Then Exponent Selection Logic (EXP SEL) 746 will be described, and finally Sign/Test Logic (S/T) 750 will be described.

Referring to FIG. 7A, input numbers A and B are provided to ABCL 744 from ASC REG 454. Exponent of input number A (EA(1–7), or EA) and exponent of input number B (EB(1–7), or EB) are transferred to inputs of Subtractor (SUB) 752 and Subtractor (SUB) 754. SUB 752 subtracts EB from EA to provide a first output, EA–EB, representing numeric difference between EA and EB. SUB 752 provides a second, single bit output EA>EB representing whether EA is greater than EB. SUB 754 subtracts EA from EB to provide a first output, EB–EA, representing numeric difference between EB and EA. SUB 754 also provides a second, single bit output EA<EB representing whether EA is less than EB. Mantissa of input number A (MA(0–23), or MA) and mantissa of input number B (MB(0–23), or MB) are transferred to inputs of Comparator (COM) 756. It should be noted that, in the following discussion, most significant bit of a binary number is referred to as bit 0 and least significant bit is referred to as, e.g., bit 23. COM 756 compares MA and MB and provides three outputs. First output, MA>MB indicates whether MA is greater than MB. Second output, MA=MB, indicates whether MA is equal to MB. Third output, MA<MB, indicates whether MA is less than MB. Referring to Mantissa Multiplexer (MMUX) 758, MMUX 758 utilizes outputs of SUB 752, SUB 754, and COM 756 to provide outputs representing whether the absolute value of input number A is greater than, equal to, or less than the absolute value of input number B at respectively, outputs Z1, Z2, and Z3. Depending upon whether MMUX 758 input SEL is 0 or 1, output Z1 will equal, respectively, input W0 or input W1. Similarly, output Z2 will equal input X0 or input X1 and output Z3 will equal input Y0 or input Y1. MMUX 758 input SEL is provided from EA≠EB Logic (EA≠EB) 760. Inputs to EA≠EB 760 are EA>EB from SUB 752 and EA<EB from SUB 754. EA≠B 760 then generates output EA≠EB, which is Logic 0 when EA≠EB and is Logic 1 when EA is not equal to EB. Inputs W0 and W1 are, respectively, MA>MB from COM 756 and EA>EB from SUB 752. Inputs X0 and X1 are, respectively, MA=MB from COM 756 and EA=EB from Inverter 762 (i.e., the inverted output of EA=EB 760). Inputs Y0 and Y1 are, respectively, MA<MB from COM 756 and EA<EB from SUB 754. If the exponents of input numbers A and B are not equal, then EA and EB must be examined to determine whether input number A is greater than or less than input number B. In such case, EA≠EB from EB 760 to MMUX 758 input SEL will be Logic 1. Accordingly, MMUX 758 output Z1 (|A|>|B|) will equal Input W1 (EA>EB), Output Z2 (|A|=|B|) will equal Input X1 (EA=EB), and Output Z3 (|A|<|B|) will equal Input Y1 (EA<EB). One of Outputs Z1, Z2, and Z3 will then be Logic 1, indicating, respectively, whether absolute value A is greater than, equal to, or less than absolute value B. If input number A exponent equals input number B exponent, the mantissas of input numbers A and B must be examined to determine whether absolute value of input number A is greater than, equal to, or less than absolute value input number B. In such case, EA≠EB from EA≠EB 760 to MMUX 758 Input SEL will be Logic 0. MMUX 758 Outputs Z1, Z2, and Z3 will accordingly be equal to, respectively, Inputs W0 (MA>MB), X0 (MA=MB), and Y0 (MA<MB). Again, one of Outputs Z1, Z2, Z3 will indicate whether absolute value of A is greater than, less than, or equal to absolute value of B. ABCL 744 thereby executes first step of first process described above by comparing mantissas and exponents of Input Numbers A and B to determine which number is larger than the other.

MAL 748 executes second and third steps of first process described above. Mantissa of Input Number A (MA) is transmitted to Input W0 of Unshifted Mantissa Multiplexer (USM MUX) 764 and to Input W1 of Mantissa To Be Shifted Multiplexer (MTS MUX) 766. Mantissa of Input Number B (MB) is transmitted to Input W1 of USM MUX 764 and Input W0 of MTS MUX 766. |A|<|B| is connected to Inputs SEL of USM MUX 764 and MTS MUX 766. The output Z of USM MUX 764 is Unshifted Mantissa (USM(0–23)) and is mantissa of larger of Input Numbers A and B. Output of MTS MUX 766 is Mantissa To Be Shifted (MTS(0–23)) and is mantissa of smaller of Input Numbers A and B. If Input Number A is greater than Input Number B, |A|<|B| from MMUX 758 will be Logic 0. USM(0–23) will then be MA(0–23) which is transmitted to Arithmetic and Logic Unit (ALU) 772 Input C as absolute value of largest input number. Similarly, if Input Number B is greater than Input Number A, USM(0–23) to ALU 772 C Input will be MB(0–23). Referring to MTS MUX 766, If Input Number A is greater than Input Number B, MTS(0–23), representing absolute value of smaller of Input Numbers A and B, will be MB(0–23) If Input Number B is greater than Input Number A, MTS(0–23) will be MA(0–23). MTS(0–23) is transferred into Shifter 768, a 28 bit shift register. As described above, if EA and EB are not equal, mantissa of the smaller number is right shifted by the number of digits (each hexadecimal digit being 4 bits) necessaary to make exponential of smaller number equal to exponential of larger number. Referring to Exponential Difference Logic (EXP DIF) 770, EXP DIF 770 receives EA−EB from SUB 752 and EB−EA from SUB 754. EA−EB and EB−EA represent the difference between EA and EB; only one of these numbers will be a positive number for one pair of Input Numbers A and B. EXP DIF 770 also receives EA>EB from SUB 752 and EA<EB from SUB 754. These inputs indicate whether EA is greater or less than EB and are used by EXP DIF 770 to select either EA−EB or EB−EA as representing difference between EA and EB. EXP DIF then uses either EA−EB or EB−EA to determine the number of digits (4 bit groups) by which MTS (0–23) must be right shifted to equalize exponents of Input Numbers A and B. Output Right Shift (RS) from EXP DIF 770 represents the required right shift and is provided to Shift Control Input (SCI) of Shifter 768 to control shift operation thereof. Shifter 768 output, The Shifted Mantissa (0–27) (TSM(0–27)) represents MTS (0–23) right shifted by number of digits selected by RS input from EXP DIF 770. TSM(0–27) is transmitted to ALU 772 D input as absolute value of mantissa of the smaller of Input Numbers A and B. As previously discussed, MTS(0–23) is either MA(0–23) or MB(0–23) and is thus a 6 digit hexadecimal number. As such, a right shift of 6 digits or greater resulting from a difference between EA and EB of 6 or greater would result in TSM(0–27) being equal to 0. In a preferred embodiment of EXP DIF 770, a difference between exponents of 7 or greater automatically forces a right shift of 7 bits. An exponential difference of 6 will also result in a 0 TSM(0–27) but this is allowed to occur as part of normal operation; right shift truncation for values of 7 or greater being chosen as providing easier hardware implementation than values of 6 or greater. MAL 748 circuitry including USM MUX 764, MTS MUX 766, EXP DIF 770, and Shifter 768 therefore execute second step of first process discussed above.

Referring to ALU 772, ALU 772 then executes third step of first process described above. This operation is C+D or C−D where either add or subtract operation is selected by ALU 772 input ALU Select (ALUS), as will be discussed further below. ALU 772 then provides output ALU(0–27), representing the 28 bit unnormalized, absolute value arithmetic operation mantissa result outpt described above with reference to third stage of first process.

Second arithmetic process described above, generation of arithmetic operation sign result, is performed, in part, by S/T 750. As discussed above, A/S/C 726 may perform the operations $+A+B$, $+A-B$, $-A+B$, and $-A-B$. In each of these operations, the sign appearing before Input Number A or Input Number B is referred to, respectively, as Function of A (FA) or Function of B (FB). E.g., in operation $-A+B$, FA is minus and FB is plus. In addition, Input Numbers A and B may each be either positive or negative numbers. As previously discussed, sign of Input Number A and sign of Input Number B are single bits of the 32 bit words representing Input Numbers A and B. SA and SB are transmitted from the selected A Bank and B Bank Registers to inputs of Operation Logic (OP) 774. FA and FB are provided to inputs of OP 774 from Microinstruction Control Logic 106D (previously discussed). OP 774 first compares FA, SA, FB, and SB to determine whether, in effect, Input Numbers A and B are positive or negative. E.g., if A/S/C 726 is executing operation $-A+B$ where A and B are both negative numbers, the operation may be expressed as $-(-A)+(-B)$, so that actual operation executed by A/S/C 726 is $+A-B$. These actual signs of Input Numbers A and B are referred to, respectively, as OPA and OPB and are provided as outputs by OP 774. OPA and OPB are transmitted to C−D Sign Logic 776. C−D Sign Logic 776 also receives inputs $|A|<|B|$ and $|A|>|B|$. C−D Sign Logic 776 manipulates these inputs to determine, first, whether Input Number A is greater or less than Input Number B, and to, second, determine whether the sign of the arithmetic operation mantissa result provided by ALU 772 will be positive or negative for the particular combination of OPA and OPB. C−D Sign Logic 776 then provides Output SIGN indicating sign of arithmetic operation result.

Returning to OP 774, as previously discussed, Input ALUS to ALU 772 determines whether ALU 772 will execute operation $C+D$ or $C-D$. OP 774 manipulates OPA and OPB internally to determine whether A/S/C 726 is to execute an add or a subtract operation, as defined by OPA and OPB, and generates Output ALU Select (ALUS) accordingly. If A/S/C 726 is to execute an add operation, ALU 772 is directed to perform the operation $C+D$; if A/S/C 726 is to execute a subtract, ALU 772 is directed to perform operation $C-D$. In summary, MAL 748 always executes operation $C+D$ or $C-D$ where C is absolute value of mantissa of larger of two input numbers and D is absolute value of mantissa of smaller of two input numbers. Whether $C+D$ or $C-D$ is executed is determined by FA, SA, FB, and SB. Result of $C+D$ or $C-D$, however, is always a positive, i.e., absolute value, number. Actual sign of arithmetic operation result is determined separately by examination of OPA, OPB, and whether Input Number A is greater than or less than Input Number B.

In addition to the above described arithmetic operation mantissa and sign result outputs, S/T 750 generates a separate output indicating when result of arithmetic operation is 0. Zero Logic (ZERO) 778 receives inputs OPA and OPB from OP 774 and input $|A|=|B|$ from MMUX 758. ZERO 778 then generates Output Z, indicating result of arithmetic operation is 0, when $|A|=|B|$ indicates Input Numbers A and B are equal and OPA and OPB indicate a subtraction operation is being executed. ZERO 778 also individually examines Input Numbers A and B to determine whether either Input Number A or Input Number B is 0. ZERO 778 generates Outputs A0 and B0 (discussed further below), indicating whether Input Numbers A or B are 0.

Referring finally to third process of arithmetic operation, generation of arithmetic operation exponential result, this process is performed by Exponent Select Logic (EXP SEL) 746. EXP SEL 746 includes Exponent Multiplexer (EXP MUX) 780. EXP MUX 780 receives Inputs EA(1-7) and EB(1-7). EXP MUX 780 Select (SEL) input receives EA>EB from SUM 752. Depending upon whether EA<EB indicates Exponent A to be greater or less than Exponent B, EXP MUX 780 selects the larger of EA(1-7) and EB(1-7) to be arithmetic operation exponent result.

Discussion of A/S/C 726 arithmetic operation is hereby concluded and A/S/C 726 test operation will be described next. As previously discussed, A/S/C 726 may be capable of executing 16 test operations on Input Numbers A and B. Referring to S/T 750, TEST ROM 782 is a read only memory storing each possible test result which may arise from each possible combination of conditions to be tested and each possible combination of Input Numbers A and B conditions which may be tested. TEST ROM 782 receives Test Condition Word (TEST COND) as address inputs from TCR 738, previously discussed. TEST ROM 782 is also provided with address inputs A0 and B0 from ZERO 778, SA and SB from ASC REG 454, and $|A|>|B|$, $|A|=|B|$, and $|A|<|B|$ from MMUX 758. For any particular combination of these address inputs, TEST ROM 782 will provide output TEST RESULT (TR) indicating results of the test performed.

Description of ASC 114 operation, including A/S/C 726 arithmetic and test operation, is hereby concluded. Operation of AP 108 and APS 100 will be concluded below with a discussion and summary of certain features of APS 100 operation, e.g., execution of an interrupt procedure during execution of an array processing macroinstruction.

C. APS 100 Macroinstruction Execution (FIG. 2)

The previous discussions have presented operation of APS 100 and AP 108 on block diagram level, have presented operation of AP 108 in detail, and have described macroinstructions which may be executed by APS 100. The following discussion will summarize certain features of APS 100 operation by illustrating execution of a macroinstruction by APS 100, including, e.g., execution of an error correction routine.

Referring again to FIG. 2, a schematic representation of APS 100 microinstruction memory is shown and has been previously discussed. Considering execution of an array processing macroinstruction, first microinstruction of such a macroinstruction may be located at Points 210 and 210' of Sector 2, Page 1 of APS 100 Microinstruction Memory. During the following discussion, microinstruction memory locations in CPU Structure are indicated by, e.g., Point 210, while corresponding Points in microinstruction memory Interface Structure are indicated by, e.g., Point 210'. APS 100 begins execution of the microinstruction sequence by entering microinstruction memory at Points 210 and 210'. Thereafter, APS 100 sequentially executes microinstructions stored sequentially in microinstruction memory with 56 bit microinstruction words being provided to CPU 102 from microinstruction memory CPU Structure and corresponding 76 bit microinstruction words being provided to AP 108 from microinstruction memory Interface Structure. At Points 212/212', however, an error occurs in AP 108. As discussed previously, such an error may, e.g., be a multiplier result overflow or underflow condition. Parameter Block Continuation Register may indicate the error is to be corrected immediately, rather than forcing a result and correcting error at end of macroinstruction execution. In this case, APS 100 jumps from Points 212/212' to Points 214/214' where a microinstruction sequence initiating error handling procedure is stored. Microinstruction words will be provided from CPU Structure to CPU 102 to, e.g., cause CPU 102 to store its operating state in CPU Registers in preparation for execution of error correction procedure. Similarly, microinstruction words provided to AP 108 from Interface Structure will direct AP 108 to store its status in CRAM 448 in preparation for the following error correction sequence. Upon completion of microinstruction sequence at Points 214/214', APS 100 jumps to Point 216 in, e.g., Page 0 of Sector 1. Point 216 is start of a microinstruction sequence directing APS 100 to execute an error correction software routine. APS 100 control exits from microinstruction memory at this point and APS 100 control is assumed by the error correction software routine. At completion of software routine, a software instruction directs APS 100 control to return to Point 218 at, e.g., Sector 1, Page 1 of APS 100 microinstruction memory. A microinstruction sequence beginning at Point 218 directs APS 100 to return to execution of the interrupted array processing macroinstruction. Accordingly, APS 100 jumps to Points 220/220' in Sector 2, Page 1. A microinstruction sequence beginning at Points 220/220' restores CPU 102 and AP 108 to their status at the point where macroinstruction execution was interrupted to perform the error correction routine. During this microinstruction sequence, status of CPU 102 and AP 108 stored, respectively, in CPU 102 Registers and CRAM 448 will be returned to the appropriate registers in CPU 102 and AP 108. At conclusion of this microinstruction sequence, APS 100 jumps again to Points 212/212' and resumes execution of the macroinstruction.

Description of a preferred embodiment of the present invention is hereby concluded. The invention may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a digital data processing system including a CPU and a main memory consisting of a first memory portion and a second memory portion, a parallel processor, first bus means for connecting said parallel processor between said CPU and said first memory portion, said parallel processor comprising:

comprising means for permitting to connect said second memory portion to said first memory portion;

first means for transferring data over said first bus means from said first memory portion to said second memory portion for storage therein;

means for arithmetically manipulating said data stored in said second memory portion to achieve arithmetically manipulated data; second bus means connected between said manipulating means and said second memory portion for transferring said data stored in said second memory portion to said manipulating means and for transferring said arithmetically manipulated data to said second memory portion; and said first transferring means including other means for transferring certain of said arithmetically manipulated data over said first bus means and from said second memory portion to said first memory portion for storage therein, whereby said CPU may operate on data stored data in said first memory portion without interference from said arithmetic manipulating means and whereby said arithmetic manipulating means may operate on data stored in said second memory portion without competing intereference from said CPU, said CPU and arithmetic manipulating means operating on said main memory in parallel.

2. In the digital data processing system of claim 1, said data manipulating means comprising means for performing multiplication on certain of said data stored in said second memory to achieve said arithmetially manipulated data.

3. In the digital data processing system of claim 2 and wherein said multiplication performing means comprises:

first register means, second register means, third register means, and fourth register means for receiving from said second bus means said certain said data including sign, exponent and mantissa data components;

means for selecting between said first register means and said second register means for a multiplier sign, exponent, and mantissa data component and for selecting between said third register means and said fourth register means for a multiplicand sign, exponent, and mantissa data component, each said component being selected exclusively from one of said register means;

product means for (1) multiplying said multiplier mantissa component with a portion of said multiplicand mantissa component to obtain and store a first partial product, (2) multiplying said multiplier mantissa component with the remaining portion of said multiplicand mantissa component to obtain a second partial product, (3) adding said first and second partial products to obtain a total product and (4) storing said total product;

means for receiving and operating upon said multiplier sign component and said multiplicand sign component to produce a sign result;

means for adding said multiplier exponent component and said multiplicand exponent component to produce an exponent result and normalizing means including means for receiving said exponent result, said sign result, and said total product, for generating a normalized multiplication result.

4. In the digital data processing system of claims 3 and wherein said product means comprises:

a product array consisting of a first predetermined number of individual multipliers each having two input ports of n-bits per port, where n is a positive integer greater than 1, one of said ports arranged to receive said multiplier mantissa component, and the other of said ports arranged to receive said multiplicand mantissa component, and each of said multipliers having one output port of 2n bits;

means for combining each said one output port of 2n bits into a total output port having a second predetermined number of output bits equal to 2n multiplied by said first predetermined number, said total output port providing an output signal representing the product of said multiplier mantissa component and said multiplicand mantissa component;

means for reducing said second predetermined number of output bits by adding bits of said output signal to each other.

5. In the digital data processing system of claim 1 and wherein said CPU includes means for generating system control signals and includes a first control memory having microinstructions stored therein employed in controlling operation of said CPU, and wherein said CPU includes an interface having a second control store memory being an extension of a portion of said first control store memory having other microinstructions stored therein employed in controlling the operation of said parallel processor to aid said CPU in processing said data simultaneously and synchronously with operation of said CPU, said parallel processor further comprising:

control means including first means for receiving said other microinstructions from said second control store memory and second means for receiving said system control signals from said first control store memory, for controlling operations of said parallel processor by said other microinstructions in the absence of receiving certain said system control signals by said second receiving means and for ignoring other microinstructions and inhibiting operation of said parallel processor when said second receiving means receives said certain said system controls signals.

6. In the digital data processing system of claim 5 and wherein said first memory portion stores parallel processor instructions each having stored therewith no greater than a predetermined number of control words, said parallel processor further comprising:

addressing means connected from said first bus means for receiving certain of said control words from said first memory portion;

third bus means for connecting said addressing means to said second memory portion;

said addressing means including logic means for operating upon said certain of said control words and for generating second memory portion addresses therefrom on said third bus means.

7. In the digital data processing system of claim 5, said control means further including additional control means for controlling both said first transferring means and said other transferring means to operate mutually exclusively before, during, and after operation of said data manipulating means.

8. In the digital data processing system of claim 5, said data manipulating means comprising:

means for multiplying certain said data stored in said second memory portion to achieve multiplied data; and, means for combining said multiplied data and other said data stored in said second memory portion to achieve said arithmetially manipulated data.

9. In the digital data processing system of claim 8 and wherein:

said combining means comprises means for performing operations of adding, subtracting and comparing said multiplied data and said other said data; and said control means further includes means for sequentially selecting each successive one of said operations performed by said means for performing operations.

10. In the digital data processing system of claim 5, said data manipulating means comprising means for combining certain of said data stored in said second memory portion and other said data stored in said second memory portion to achieve said arithmetically manipulated data.

11. In the digital data processing system of claim 10 and wherein:

said combining means comprises means for performing operations of adding, subtracting and comparing said certain of said data and said other said data; and said control means further includes means for sequentially selecting each successive one of said operations performed by said combining means.

12. In the digital data processing system of claim 11 and wherein said combining means comprises:

register means for receiving from said second bus means and storing said certain of said data and said other said data, means for adding, subtracting and comparing said certain said data and said other data to provide add, subtract and compare results, and means responsive to said control means for transferring said add, subtract and compare results onto said second bus means.

13. In the digital data processing system of claim 12 and wherein said combining means further comprises CRAM memory means for receiving from said second bus means second certain of said certain said data and third certain of said other said data, said CRAM memory means including means responsive to said control means for transferring said second certain of said certain said data and said third certain of said other said data stored therein onto said second bus means.

14. In the digital data processing system of claim 12 and wherein:
said certain of said data includes sign, exponent and mantissa data components,
said other certain of said data includes sign, exponent and mantissa data components, and
wherein said means for adding, subtracting and comparing comprises:
comparison means for comparing said exponent components and said mantissa components of said certain said data and said other said data to determine which of said certain said data and said other said data has a greater numeric value,
means responsive to operation of said comparison means for shifting said mantissa component of the smaller of said certain said data and said other said data so that said exponent components of said certain said data and said other said data are equal,
means responsive to operation of said comparison means and responsive to said control means for adding and subtracting said mantissa component of said smaller of said certain said data and said other said data respectively to and from said mantissa of the larger of said certain said data and said other said data to provide a mantissa result,
means responsive to operation of said comparison means for selecting one of said exponent components of said certain said data and said other said data to provide an exponent result, and
means responsive to operation of said comparison means, to said control means, and to said sign components of said certain said data and said other data to provide a signal result.

15. In the digital data processing system of claims 12 or 14 and wherein said register means comprises:

first register means for receiving from said second bus means and storing said certain of said data, and
second register means for receiving from said second bus means and storing said other of said data.

16. In the digital data processing system of claim 14 and wherein said means for adding, subtracting and comparing means further comprises testing means comprising:
test ROM means having address inputs responsive to said comparison means, said control means, and said sign components and said mantissa components of said certain of said data for providing compare results indicating results of at least one test to be performed on said certain said data and said other said data.

17. In the digital data processing system of claim 14 and wherein said means for adding, subtracting and comparing further comprises normalizing means including means for receiving said mantissa result, said exponent result, and said sign result, for providing a normalized addition and subtraction result.

18. In the digital data processing system of claim 14 and wherein said means for adding, subtracting and comparing further comprises means for detecting overflow and underflow of said addition and subtraction result.

19. In the digital data processing system of claim 14 and wherein said detection means further comprises means responsive to said control means for forcing a maximum value for said addition and subtraction result when said overflow is detected and for forcing a minimum value for said addition and subtraction result when said underflow is detected.

* * * * *